US006898931B2

(12) United States Patent
Iwao et al.

(10) Patent No.: US 6,898,931 B2
(45) Date of Patent: May 31, 2005

(54) FLUID COUPLING

(75) Inventors: Nobuyuki Iwao, Kanagawa (JP); Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 192 days.

(21) Appl. No.: 10/288,537

(22) Filed: Nov. 6, 2002

(65) Prior Publication Data

US 2003/0106312 A1 Jun. 12, 2003

(30) Foreign Application Priority Data

Nov. 16, 2001 (JP) .................................. 2001-352423
Nov. 16, 2001 (JP) .................................. 2001-352424

(51) Int. Cl.$^7$ .............................................. F16D 33/18
(52) U.S. Cl. .......................................... 60/352; 60/367
(58) Field of Search ........................ 60/352, 353, 354, 60/355, 356, 367

(56) References Cited

U.S. PATENT DOCUMENTS

| 2,096,070 A | * | 10/1937 | Sinclair | 60/352 |
| 2,347,121 A | | 4/1944 | Patterson | |
| 2,358,473 A | * | 9/1944 | Patterson | 60/352 |
| 2,862,362 A | * | 12/1958 | Parshall | 60/352 |
| 3,003,318 A | * | 10/1961 | Heyer | 60/352 |
| 3,045,431 A | * | 7/1962 | Galaniuk | 60/352 |
| 6,334,307 B1 | * | 1/2002 | Iwao et al. | 60/367 |

FOREIGN PATENT DOCUMENTS

| DE | 11 12 411 | 8/1961 |
| GB | 384 022 | 12/1932 |

* cited by examiner

Primary Examiner—Thomas E. Lazo
(74) Attorney, Agent, or Firm—James N. Dresser, Esq.

(57) ABSTRACT

A fluid coupling comprising:
  a pump having a pump shell and a plurality of impellers arranged in the pump shell; and
  a turbine disposed opposite said pump and having a turbine shell and a plurality of runners arranged in said turbine shell; wherein
  provision is made of a baffle mechanism which retractably protrudes into a fluid circulatory passage formed by the pump shell and the turbine shell, the baffle mechanism greatly protruding into the fluid circulatory passage in a state where the rotational speed is low and protruding little into the fluid circulatory passage in a state where the rotational speed is high.

59 Claims, 40 Drawing Sheets

FLUID COUPLING

FIELD OF THE INVENTION

The present invention relates to improvements on a fluid coupling for transmitting a rotational torque of a prime mover.

DESCRIPTION OF THE RELATED ART

A fluid coupling has heretofore been used as a power transmission coupling for ships, industrial machinery and automobiles. The fluid coupling comprises a pump having an annular pump shell and a plurality of impellers radially arranged in the pump shell, and a turbine which has an annular turbine shell and a plurality of runners radially arranged in the turbine shell and which is arranged opposite the pump. The pump and the turbine are filled with an operation fluid. In the thus constituted fluid coupling, the pump is connected to the crankshaft (an input shaft serving as the fluid coupling) of, for example, a diesel engine as a prime mover and the turbine is mounted on the output shaft arranged in concentric with the input shaft.

There is also used a fluid coupling in which the pump shell and the turbine shell are provided with annular core rings for guiding the flow of the operation fluid.

FIG. 40 is a graph illustrating the characteristics of a general fluid coupling, wherein the abscissa represents the speed ratio (e) of the pump and the turbine, and the ordinate represents the coefficient ($\tau$) of input capacity of the fluid coupling. In the fluid coupling as will be understood from FIG. 40, the coefficient ($\tau$) of input capacity becomes a maximum when the speed ratio (e) of the pump and the turbine is zero (0), i.e., in a state where the pump rotates but the turbine is at rest. When a driving device of a vehicle is furnished with the fluid coupling having such characteristics, a drag torque is produced due to its nature in a state where the vehicle is at rest, the engine is driven and a speed change gear of the transmission is in mesh, i.e., in a state where the input shaft is rotated, while the output shaft is at rest. The drag torque generally refers to a transmission torque in a state where the engine is operated at an idling rotational speed (e.g., 500 rpm). The drag torque increases to a considerable degree if a design point of the fluid coupling is set at a rotational speed ratio giving a maximum efficiency, i.e., the rotational speed ratio (e) of the pump and the turbine in a range of from about 0.95 to about 0.98. At a high drag torque, the idling operation of the engine becomes very unstable, and this unstable rotation becomes a cause of generating abnormal vibration in the driving system. Besides, a high drag torque is also a cause of deterioration of the fuel efficiency at the idling operation.

As a measure for reducing the above-mentioned drag torque, a technology has been known according to which baffle plates are arranged between the pump and the turbine.

A measure for reducing the drag torque by using the baffle plates will be described with reference to FIGS. 41 and 42. A fluid coupling shown in FIGS. 41(a) and 41(b) is the one in which annular baffle plates BP are mounted on an output shaft OS and are arranged between the pump P and the turbine T. A fluid coupling shown in FIG. 42 is the one in which annular baffle plates BP are arranged in an outer peripheral portion of the pump P.

In the fluid coupling shown in FIGS. 41(a) and 41(b), the operation fluid to which the rotational force is imparted by the rotation of the pump P at a low-speed rotation flows into the turbine T from the outer peripheral side due to the centrifugal force, as shown in FIG. 41(a). The operation fluid that has driven the turbine T diminishes in the centrifugal force, is shifted toward the core ring side and flows into the pump P. At the low-speed rotation, therefore, the effect of the baffle plates BP arranged between the pump and the turbine is small, and the drag torque cannot be decreased. At the high-speed rotation, the operation fluid to which the rotational force is imparted due to the rotation of the pump P shown in FIG. 41(b) flows into the turbine T from the outer peripheral side due to the centrifugal force. Here, the operation fluid flowing into the turbine T has a strong centrifugal force and flows along the inner surfaces of the turbine shell and hence, the operation fluid comes in contact with the baffle plates BP as it flows into the pump P. At the high-speed rotation, therefore, the baffle plates BP exert a large action to lower the transmission of torque (to lower the coupling efficiency). As described above, the fluid coupling shown in FIGS. 41(a) and 41(b) is a poor efficiency coupling which not only is unable to reduce the drag torque that should be lowered at the low-speed operation such as at the idling operation, but also lowers the transmission torque (coupling efficiency) at the high-speed rotation.

The fluid coupling shown in FIG. 42 has annular baffle plates BP arranged on the outer peripheral portion of the pump P and hence, can reduce the drag torque at the low-speed rotation, but causes a great drop in the transmission of torque at the high-speed rotation. That is, the operation fluid given a rotational force by the rotation of the pump P flows toward the outer peripheral side due to the centrifugal force but as it flows out from the pump P at a maximum flow speed, it comes into collision with the baffle plates BP to diminish in the flow speed before it flows into the turbine T, leaving a problem in that the transmission of torque (coupling efficiency) greatly decreases at the high-speed rotation.

In order to solve the above-mentioned problems, the present applicant has proposed in JP-A 2001-50309 a fluid coupling comprising a pump shell having an annular core ring and a turbine shell having an annular core ring, the inner periphery or outer periphery of one core ring being furnished with annular baffle plates.

In the fluid coupling proposed in JP-A 2001-50309, too, though the drag torque can be effectively lowered since the baffle plates are existing in the circulatory passage at all times, the transmission of torque is inevitably lowered at the high-speed rotation.

SUMMARY OF THE INVENTION

It is therefore an object of the present invention to provide a fluid coupling capable of effectively reducing the drag torque without lowering the transmission of torque at the high-speed rotation.

In order to accomplish the above-mentioned object according to the present invention, there is provided a fluid coupling comprising:

a pump having a pump shell with an annular core ring, and a plurality of impellers arranged in the pump shell; and a turbine disposed opposite the pump and having a turbine shell with an annular core ring and a plurality of runners arranged in the turbine shell; wherein provision is made of a baffle mechanism which is so constituted as to retractably protrude into a fluid circulatory passage formed by the pump shell and the turbine shell, the baffle mechanism greatly protruding into the fluid circulatory passage in a state where a rotational speed is low and protruding little into the fluid circulatory passage in a state where a rotational speed is high.

The baffle mechanism comprises baffle plates arranged between the core ring of the pump shell and the core ring of the turbine shell so as to move in the radial direction, a guide means mounted on the core ring of the turbine shell so as to guide the movement of the baffle plates, and a limiting means for limiting the movement of the plurality of baffle plates until the rotational speed of the turbine reaches a predetermined value. It is desired that the baffle plates are arranged in a plural number along the core ring of the turbine shell and that the baffle plates are fitted with weight members.

The baffle mechanism comprises baffle plates arranged between the core ring of the pump shell and the core ring of the turbine shell so as to move in the radial direction, a guide means mounted on the core ring of the pump shell so as to guide the movement of the baffle plates, and a limiting means for limiting the movement of the baffle plates until the rotational speed of the pump reaches a predetermined value. It is desired that the baffle plates are arranged in a plural number along the core ring of the pump shell and that the plurality of baffle plates are fitted with weight members.

The baffle mechanism comprises baffle plates which are arranged between the core ring of the pump shell and the core ring of the turbine shell and are turnably supported, at the ends on one side thereof, by a support shaft mounted on the core ring of the turbine shell, and a limiting means for limiting the movement of the baffle plates until the rotational speed of the turbine reaches a predetermined value. It is desired that the baffle plates are arranged in a plural number along the core ring of the turbine shell and that the baffle plates are fitted with weight members.

The baffle mechanism comprises baffle plates which are arranged between the core ring of the pump shell and the core ring of the turbine shell and are turnably supported, at the ends on one side thereof, by a support shaft mounted on the core ring of the pump shell, and a limiting means for limiting the movement of the baffle plates until the rotational speed of the pump reaches a predetermined value. It is desired that the baffle plates are arranged in a plural number along the core ring of the pump shell and that the baffle plates are fitted with weight members.

The baffle mechanism comprises baffle plates which are arranged between the core ring of the pump shell and the core ring of the turbine shell and are turnably supported, at the ends on one side thereof, by a support shaft mounted on the inner periphery of the turbine shell, and a limiting means for limiting the movement of the baffle plates until the rotational speed of the turbine reaches a predetermined value. It is desired that the baffle plates are arranged in a plural number along the core ring of the turbine shell and that the baffle plates are fitted with weight members.

The baffle mechanism comprises baffle plates which are arranged between the core ring of the pump shell and the core ring of the turbine shell and are turnably supported, at the ends on one side thereof, by a support shaft mounted on the inner periphery of the pump shell, and a limiting means for limiting the movement of the baffle plates until the rotational speed of the pump reaches a predetermined value. It is desired that the baffle plates are arranged in a plural number along the core ring of the pump shell and that the baffle plates are fitted with weight members.

According to the present invention, there is further provided a fluid coupling comprising:

a pump having an annular pump shell and a plurality of impellers arranged in said pump shell; and a turbine disposed opposite said pump, and having an annular turbine shell and a plurality of runners arranged in said turbine shell; wherein provision is made of a baffle mechanism which is so arranged as to move in the radial direction between the inner peripheral portion and the central portion in the radial direction of a fluid circulatory passage formed by said pump shell and said turbine shell, the baffle mechanism being positioned on the inner peripheral side of said fluid circulatory passage in a state where the rotational speed is low and moving toward the central portion of said fluid circulatory passage in a state where the rotational speed is high.

The baffle mechanism comprises baffle plates arranged between the pump and the turbine, a guide means mounted on the turbine so as to guide the movement of the baffle plates, and a limiting means for limiting the movement of the baffle plates until the rotational speed of the turbine reaches a predetermined value. It is desired that the baffle plates are arranged in a plural number along the turbine shell and that the baffle plates are fitted with weight members.

The baffle mechanism comprises baffle plates arranged between the pump and the turbine, a guide means mounted on the pump so as to guide the movement of the baffle plates, and a limiting means for limiting the movement of the baffle plates until the rotational speed of the pump reaches a predetermined value. It is desired that the baffle plates are arranged in a plural number along the pump shell and that the baffle plates are fitted with weight members.

The baffle mechanism comprises baffle plates which are arranged between the core ring of the pump shell and the core ring of the turbine shell and are turnably supported, at the ends on one side thereof, by a support shaft mounted on the turbine shell, and a limiting means for limiting the movement of the baffle plates until the rotational speed of the turbine reaches a predetermined value. It is desired that the baffle plates are arranged in a plural number along the turbine shell and that the baffle plates are fitted with weight members.

The baffle mechanism comprises baffle plates which are arranged between the core ring of the pump shell and the core ring of the turbine shell and are turnably supported, at the ends on one side thereof, by a support shaft mounted on the pump shell, and a limiting means for limiting the movement of the baffle plates until the rotational speed of the pump reaches a predetermined value. It is desired that the baffle plates are arranged in a plural number along the pump shell and that the baffle plates are fitted with weight members.

According to the present invention, there is further provided a fluid coupling comprising:

a pump having an annular pump shell and a plurality of impellers arranged in said pump shell; and a turbine disposed opposite said pump and having an annular turbine shell and a plurality of runners arranged in said turbine shell; wherein provision is made of a baffle mechanism which is so constituted as to retractably protrude toward the outer peripheral portion in the radial direction of a fluid circulatory passage formed by said pump shell and said turbine shell, the baffle mechanism being positioned on the outer peripheral portion of said fluid circulatory passage in a state where the rotational speed is low and retracting from the outer peripheral portion of said fluid circulatory passage in a state where the rotational speed is high.

The baffle mechanism comprises baffle plates arranged between the pump and the turbine, a guide means mounted on the turbine so as to guide the movement of the baffle plates, and a limiting means for limiting the movement of the plurality of baffle plates until the rotational speed of the turbine reaches a predetermined value. It is desired that the baffle plates are arranged in a plural number along the turbine shell and that the baffle plates are fitted with weight members.

The baffle mechanism comprises baffle plates arranged between the pump and the turbine, a guide means mounted on the pump so as to guide the movement of the baffle plates, and a limiting means for limiting the movement of the baffle plates until the rotational speed of the pump reaches a predetermined value. It is desired that the baffle plates are arranged in a plural number along the pump shell and that the baffle plates are fitted with weight members.

The baffle mechanism comprises baffle plates which are arranged between the core ring of the pump shell and the core ring of the turbine shell and are turnably supported, at the ends on one side thereof, by a support shaft mounted on the outer periphery of the pump shell, and a limiting means for limiting the movement of the baffle plates until the rotational speed of the pump reaches a predetermined value. It is desired that the baffle plates are arranged in a plural number along the pump shell and that the baffle plates are fitted with weight members.

According to the present invention, there is further provided a fluid coupling comprising:

a pump having an annular pump shell with an annular core ring and a plurality of impellers arranged in said pump shell; and a turbine disposed opposite said pump and having an annular turbine shell with an annular core ring and a plurality of runners arranged in said turbine shell, wherein provision is made of a baffle mechanism which comprises:

flap-like baffle plates which are arranged in a fluid circulatory passage formed by said pump shell and said turbine shell and are turnably supported, at the edges on one side thereof, by the inner peripheral portion of the core ring of said pump shell; and a limiting means which works, in response to the centrifugal force acting on said baffle plates, to bring the edges on the other side of said baffle plates to the central portion of said fluid circulatory passage in a state where the rotational speed of the pump is low and to bring the edges on the other side of said baffle plates to the inner peripheral side of the core ring of said turbine shell in a state where the rotational speed of the pump is high.

It is desired that the above baffle plates are arranged in a plural number along the core ring of the pump shell and that the baffle plates are fitted at the other edge portions thereof with weight members. The limiting means is constituted by spring members arranged between the plurality of baffle plates and said pump shell.

According to the present invention, there is further provided a fluid coupling comprising:

a pump having an annular pump shell with an annular core ring and a plurality of impellers arranged in said pump shell; and a turbine disposed opposite said pump and having an annular turbine shell with an annular core ring and a plurality of runners arranged in said turbine shell, wherein provision is made of a baffle mechanism which comprises:

flap-like baffle plates which are arranged in a fluid circulatory passage formed by said pump shell and said turbine shell and are turnably supported, at the edges on one side thereof, by the inner peripheral portion of the core ring of said turbine shell; and a limiting means which works, in response to the centrifugal force acting on said baffle plates, to bring the edges on the other side of said baffle plates to the central portion of said fluid circulatory passage in a state where the rotational speed of the turbine is low and to bring the edges on the other side of said baffle plates to the inner peripheral side of the core ring of said pump shell in a state where the rotational speed of the turbine is high.

It is desired that the baffle plates are arranged in a plural number along the core ring of the turbine shell and that the baffle plates are fitted at the other edge portions thereof with weight members. The limiting means is constituted by spring members arranged between the plurality of baffle plates and the turbine shell.

According to the present invention, there is further provided a fluid coupling comprising:

a pump having an annular pump shell and a plurality of impellers arranged in said pump shell; and a turbine disposed opposite said pump and having an annular turbine shell and a plurality of runners arranged in said turbine shell, wherein:

provision is made of a baffle mechanism which comprises:

flap-like baffle plates which are arranged in a fluid circulatory passage formed by said pump shell and said turbine shell and are turnably supported, at the edges on one side thereof, by the inner peripheral portion of said pump shell;

weight members mounted on said baffle plates to bring the edges on the other side of said plurality of flaps to the inner peripheral side of said turbine shell by the action of the centrifugal force; and a limiting means which works, in response to the centrifugal force acting on said weight members, to bring the edges on the other side of said baffle plates to the central portion of said fluid circulatory passage in a state where the rotational speed of the pump is low and to bring the edges on the other side of said baffle plates to the inner peripheral portion of said turbine shell in a state where the rotational speed of the pump is high.

It is desired that the baffle plates are arranged in a plural number along the pump shell. The limiting means is constituted by spring members arranged between the plurality of baffle plates and the pump shell.

According to the present invention, there is further provided a fluid coupling comprising:

a pump having an annular pump shell and a plurality of impellers arranged in said pump shell; and a turbine disposed facing said pump and having an annular turbine shell and a plurality of runners arranged in said turbine shell; wherein:

provision is made of a baffle mechanism which comprises:

flap-like baffle plates which are arranged in a fluid circulatory passage formed by said pump shell and said turbine shell and are turnably supported, at the edges on one side thereof, by the inner peripheral portion of said turbine shell;

weight members mounted on said baffle plates to bring the edges on the other side of said plurality of baffle plates to the inner peripheral side of said pump by the action of the centrifugal force; and a limiting means which works, in response to the centrifugal force acting on said weight members, to bring the edges on the other side of said baffle plates to the central portion of said fluid circulatory passage in a state where the rotational speed of the turbine is low and to bring the edges on the other side of said baffle plates to the inner peripheral portion of said pump shell in a state where the rotational speed of the turbine is high.

It is desired that the baffle plates are arranged in a plural number along the turbine shell. The limiting means is constituted by spring members arranged between the plurality of baffle plates and the turbine shell.

Other features of the invention will become obvious from the following description.

DETAILED DESCRIPTION OF THE PREFERRED EMBODIMENTS

Preferred embodiments of the fluid coupling constituted according to the present invention will now be described in further detail with reference to the accompanying drawings.

Figure 1:
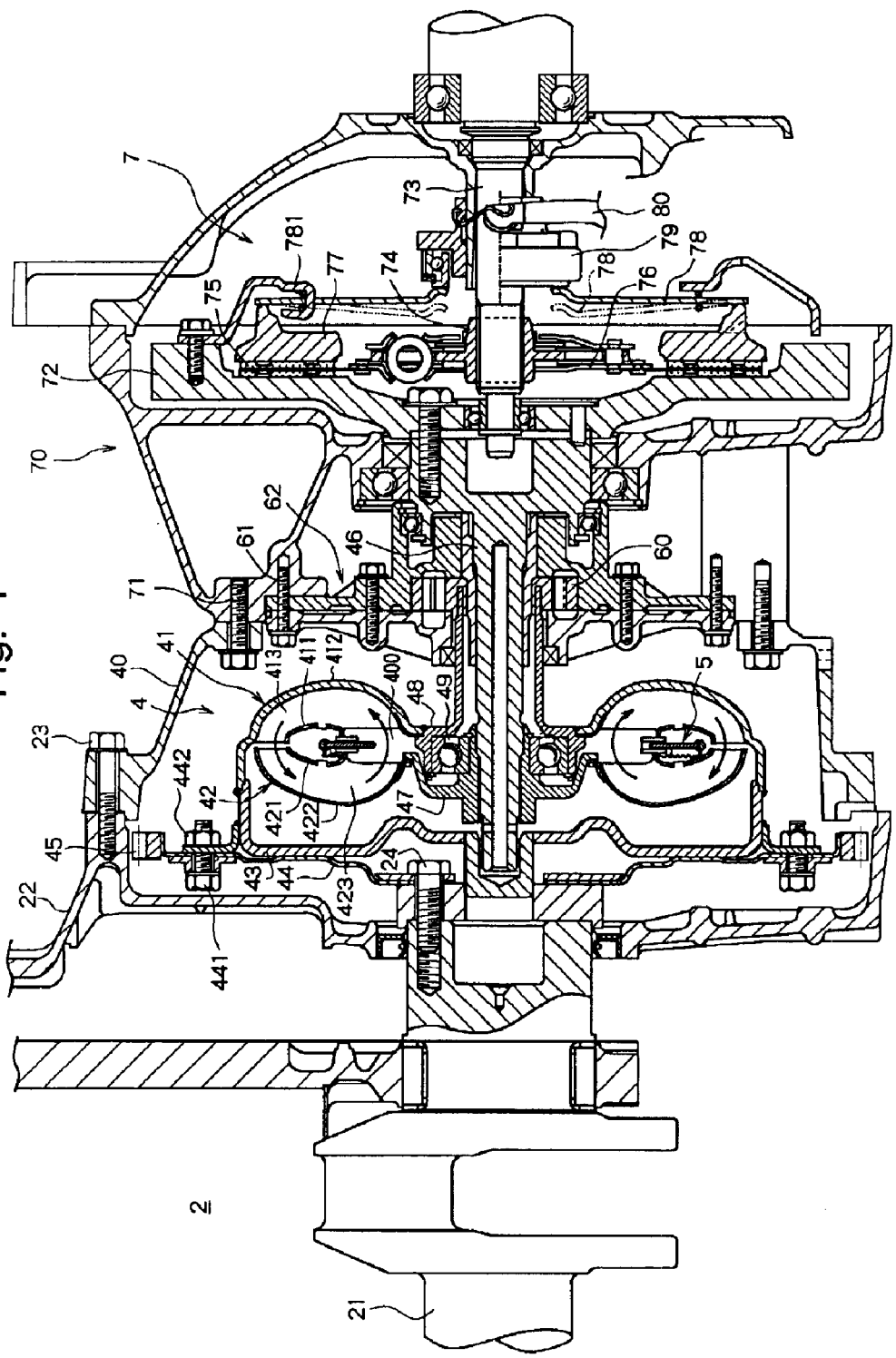
FIG. 1 is a sectional view illustrating an embodiment of a driving device equipped with a fluid coupling constituted according to the present invention.

FIG. 1 illustrates an embodiment of a driving device in which a fluid coupling constituted according to the present invention is arranged between an automotive engine and a friction clutch. The driving device according to the illustrated embodiment is constituted by an internal combustion engine 2 which is a prime mover, a fluid coupling 4 constituted according to the present invention and a friction clutch 7. The internal combustion engine 2 according to the illustrated embodiment is a diesel engine, and the fluid coupling 4 on the side of a pump that will be described later is attached to an end portion of a crankshaft 21.

The fluid coupling 4 is disposed in a fluid coupling housing 40 that is attached to a housing 22 mounted on the diesel engine 2 by using a fastening means such as bolts 23 or the like. The fluid coupling 4 of the illustrated embodiment comprises a pump 41, a turbine 42 disposed opposite the pump 41, and a casing 43 coupled to the pump 41.

The pump 41 that constitutes the fluid coupling 4 comprises a cup-like pump shell 412 having an annular core ring 411, and a plurality of impellers 413 radially arranged in the pump shell 412. The pump shell 412 is mounted on the casing 43 by a fixing means such as welding or the like. The casing 43 is mounted, by a fastening means such as bolts 441 and nuts 442 or the like, on the outer peripheral portion of a drive plate 44 that is mounted, at its inner peripheral portion, on the crankshaft 21 by bolts 24. Thus, the pump shell 412 of pump 41 is coupled to the crankshaft 21 via the casing 43 and the drive plate 44. Accordingly, the crankshaft 21 works as an input shaft of the fluid coupling 4. A ring gear 45 for starting is fitted onto the outer periphery of the drive plate 44 to come in mesh with a drive gear of a starter motor that is not shown.

The turbine 42 comprises a cup-like turbine shell 422 having an annular core ring 421 disposed opposie the pump shell 412 of the pump 41, and a plurality of runners 423 radially arranged in the turbine shell 422. The turbine shell 422 is attached, by a fixing means such as welding or the like, to a turbine hub 47 spline-fitted to an output shaft 46 that is arranged in concentric with the crankshaft 21 as the input shaft.

The fluid coupling 4 according to the embodiment of FIG. 1 has a baffle mechanism 5 which is retractably disposed in a fluid circulatory passage 400 formed by the pump shell 412 and the turbine shell 422, protrudes by an increased amount into the fluid circulatory passage 400 in a state where a rotational speed is low and protrudes little into the fluid circulatory passage 400 in a state where the rotational speed is high. The baffle mechanism 5 will be described later in detail.

If further described with reference to FIG. 1, the fluid coupling 4 according to the illustrated embodiment has a hydraulic pump 60. The hydraulic pump 60 is disposed in a pump housing 62 which is attached, by a fixing means such as bolts 61 or the like, to a clutch housing 70 that will be described later, of a friction clutch 7 mounted on the fluid coupling housing 40. The hydraulic pump 60 is rotationally driven by a pump hub 48 attached to the pump shell 412 of the pump 41, and feeds an operation fluid into the pump 41 and the turbine 42 through a fluid passage that is not shown. The pump hub 48 is rotatably supported on the turbine hub by a bearing 49.

Next, the friction clutch 7 will be described.

The friction clutch 7 is disposed in the clutch housing 70 mounted on the fluid coupling housing 40 by bolts 71. The friction clutch 7 in the illustrated embodiment comprises a clutch drive plate 72 mounted on the output shaft 46 of the fluid coupling 4, a transmission shaft 73 (an input shaft. of the transmission (not shown)in the illustrated embodiment) arranged in concentric with the output shaft 46, a driven plate 76 mounted on the clutch hub 74 spline-fitted to the transmission shaft 73 and having a clutch facing 75 mounted on an outer peripheral portion thereof, a pressure plate 77 for pressing the driven plate 76 against the clutch drive plate 72, a diaphragm spring 78 for urging the pressure plate 77 toward the clutch drive plate 72, a release bearing 79 which comes into engagement with the inner end portion of the diaphragm spring 78 to actuate the diaphragm spring 78 with an intermediate portion thereof as a fulcrum 781, and a clutch release fork 80 for actuating the release bearing 79 in the axial direction. When the thus constituted friction clutch 7 is in a state that is illustrated, the pressure plate 77 is pushed onto the clutch drive plate 72 due to the spring force of the diaphragm spring 78 and hence, the clutch facing 75 mounted on the driven plate 76 is pressed against the clutch drive plate 72. As a result, the power transmitted to the output shaft 46 of the fluid coupling 4 is transmitted to the transmission shaft 73 through the clutch drive plate 72 and driven plate 76. To interrupt the transmission of the power, a hydraulic pressure is fed to a slave cylinder that is not shown to actuate the clutch release fork 80, so that the release bearing 79 moves toward the left in FIG. 1. Then, the diaphragm spring 78 moves as indicated by a two-dot chain line in the drawing to release the pushing force exerted on the pressure plate 77, whereby the transmission of power from the clutch drive plate 72 to the driven plate 76 is interrupted.

The driving device equipped with the fluid coupling of the illustrated embodiment is constituted as described above. Its action will be described hereinafter.

A driving force produced on the crankshaft 21 (input shaft) of the diesel engine 2 is transmitted to the casing 43 of the fluid coupling 4 through the drive plate 44. The casing 43 and the pump shell 412 of the pump 41 have been integratedly constituted together and, hence, the pump 41 is rotated by the above driving force. As the pump 41 rotates, the operation fluid in the pump 41 flows toward the outer periphery thereof along the impellers 413 due to the centrifugal force, and flows into the side of the turbine 42 as indicated by an arrow. The operation fluid that has flowed into the side of the turbine 42 flows then toward the inner peripheral side thereof and returns back into the pump 41 as indicated by an arrow. As the operation fluid in the pump 41 and the turbine 42 circulates through the pump 41 and the turbine 42 in this manner, the drive torque on the side of the pump 41 is transmitted to the side of the turbine 42 through the operation fluid. The driving force transmitted to the side of the turbine 42 is, then, transmitted to the output shaft 46 through the turbine shell 422 and turbine hub 47, and is, further, transmitted to the transmission that is not shown through the friction clutch 7.

Next, the baffle mechanism 5 according to the first embodiment will be described with reference to FIGS. 2 to 4.

The baffle mechanism 5 according to the first embodiment comprises a plurality of (four in the illustrated embodiment) baffle plates 51 movably arranged between the core ring 411 of the pump shell 412 and the core ring 421 of the turbine shell 422 so as to move in the radial direction, a guide means 52 mounted on the inner peripheral portion of the core ring 421 of the turbine shell 422 to guide the movement of the baffle plates 51, and a limiting means 53 for limiting the movement of the plurality of baffle plates 51 until the rotational speed of the turbine 42 reaches a predetermined value. The baffle plates 51 are formed of, for example, an aluminum alloy and are fitted, at the outer peripheral edges thereof, with a weight member 511 made of a metal having a large specific gravity, such as copper or lead. Specifically, as shown in FIG. 4, a recessed portion 512 for fitting is formed in the weight member 511, and the outer peripheral edge of the baffle plate 51 is fitted into the recessed portion 512 and is joined thereto by brazing.

The guide means 52 is constituted by U-shaped guide members 520 having a guide groove 521 corresponding to the thickness of the baffle plate 51, and are mounted, by a fixing means such as welding or the like, onto the inner peripheral portion of the core ring 421 of the turbine shell 422 at positions corresponding to both sides of the baffle plates 51. Both side portions of the baffle plates 51 are fitted into the guide grooves 521 of the guide members 520. The baffle plates 51 of which both side portions have been fitted into the guide grooves 521 of the guide means 52 are guided by the guide members 520 to move in the radial direction. A stopper portion 513 protruding sideways from an upper end of the baffle plate 51 is provided, and it comes in contact with the guide member 520 to limit the movement into the fluid circulatory passage 400 side.

In the illustrated embodiment, the limiting means 53 is constituted by a spring member such as a tension coiled spring 531 arranged between both ends of the weight member 511 fitted to the baffle plate 51 and the inner peripheral portion of the core ring 421 of the turbine shell 422. The setting load of the tension coiled spring 531 has been so set that the baffle plate 51 is urged toward the side of the fluid circulatory passage 400 and that the baffle plate 51 is so positioned that the stopper portion 511 comes in contact with the guide member 520 as shown in the upper half portions of FIGS. 2 and 3 until the rotational speed of the turbine 42 reaches a predetermined value. As the rotational speed of the turbine 42 becomes greater than the predetermined value, an increased centrifugal force acts on the baffle plates 51 and on the weight members 511. As shown in the lower half portions of FIGS. 2 and 3, therefore, the baffle plates 51 move outward in the radial direction against the spring forces of the tension coiled springs 531, and retract into between the core ring 411 of the pump shell 412 and the core ring 421 of the turbine shell 422. Here, as the limiting means 53 may be provided spring members such as tension coiled springs 531 or the like arranged among the neighboring baffle plates 51, 51 as employed by the second embodiment shown in FIG. 5.

Figure 2:
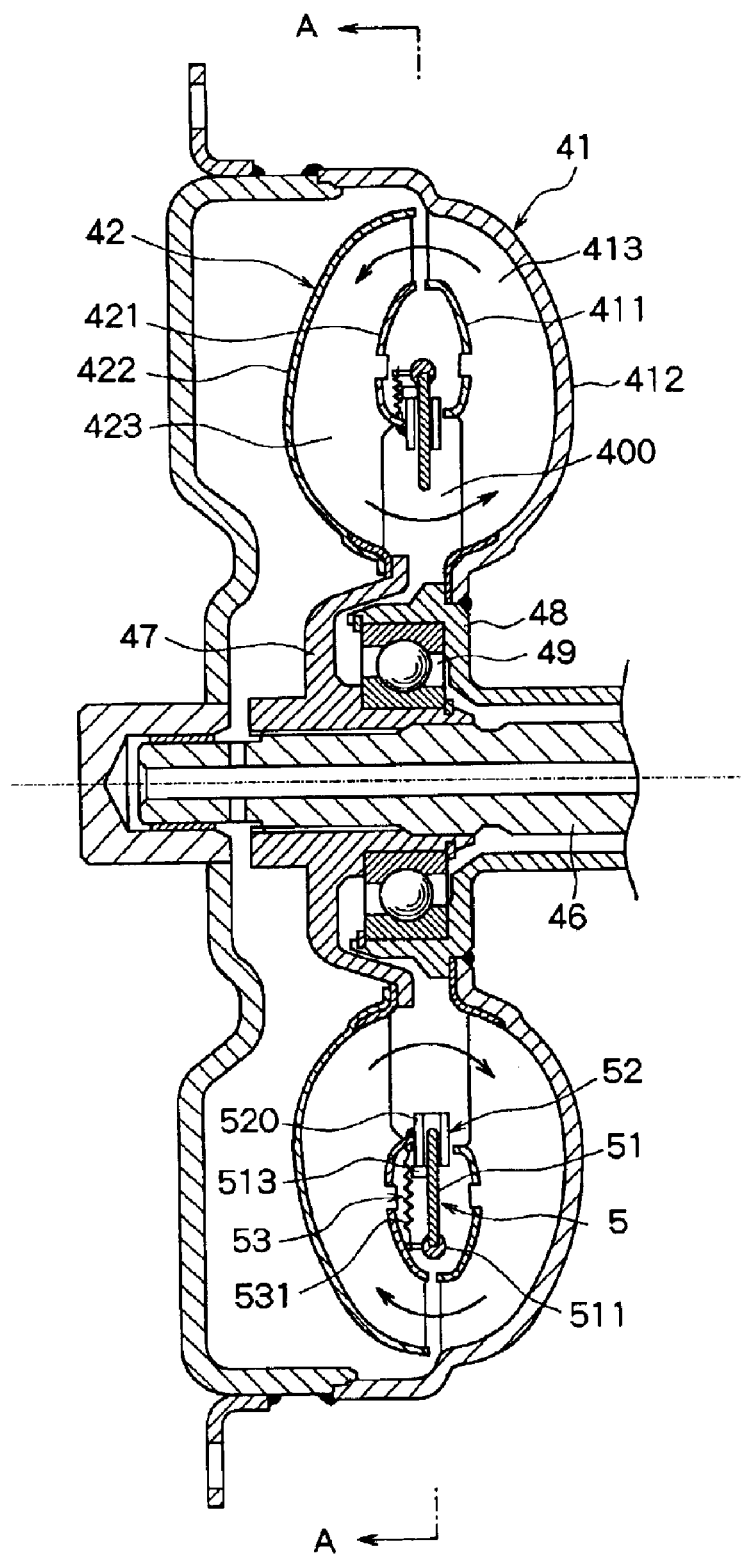
FIG. 2 is a sectional view illustrating the first embodiment of the fluid coupling constituted according to the present invention.
Figure 3:
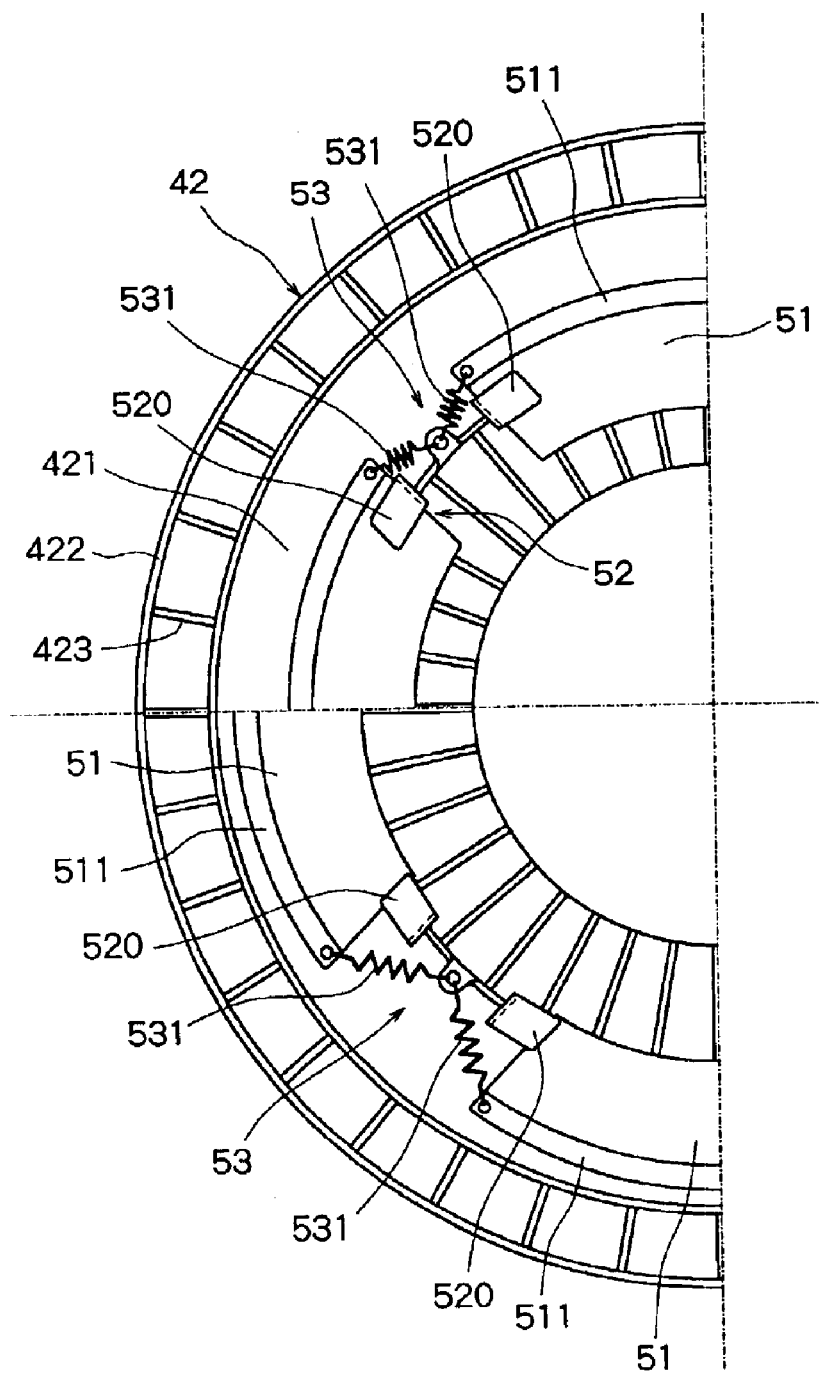
FIG. 3 is a sectional view along the line A—A in FIG. 2.
Figure 4:
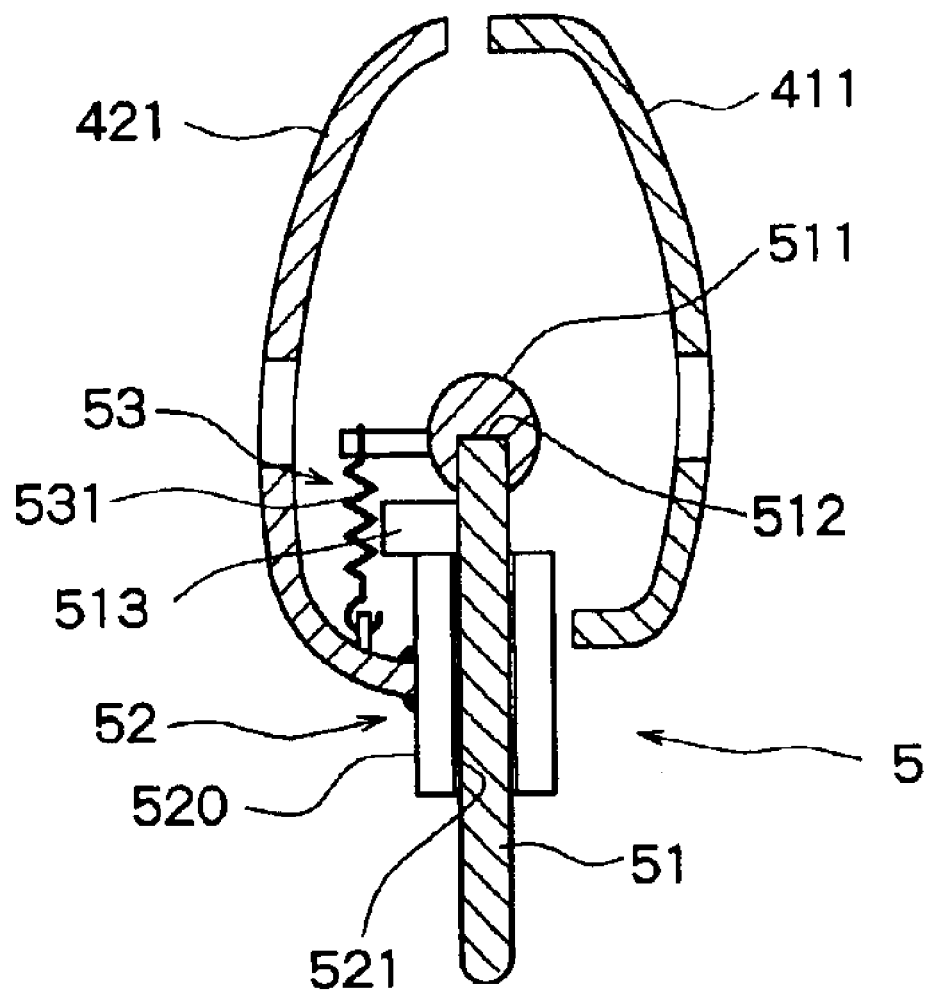
FIG. 4 is a sectional view illustrating, on an enlarged scale, a major portion of the fluid coupling shown in FIG. 2.
Figure 5:
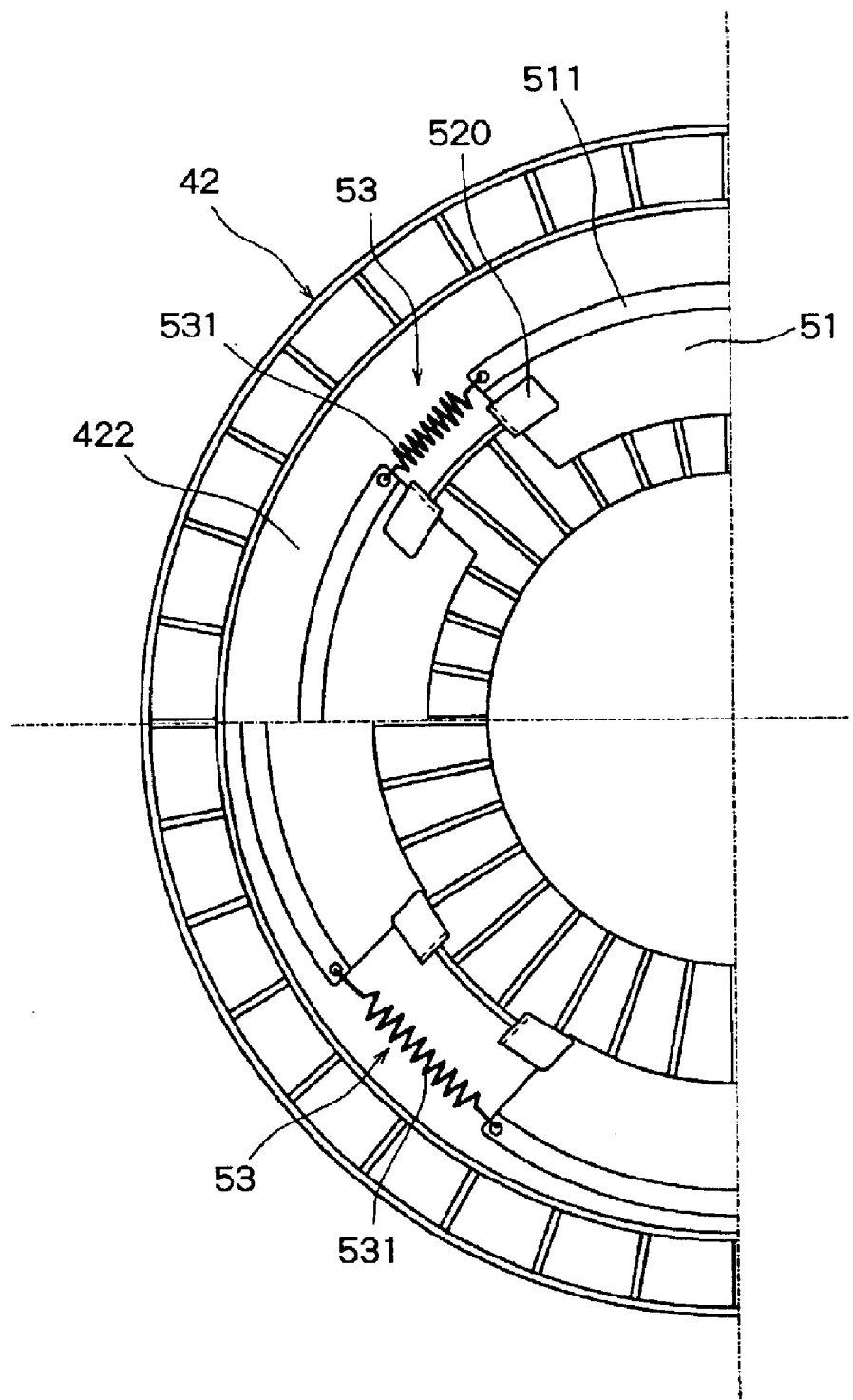
FIG. 5 is a sectional view illustrating the second embodiment of the fluid coupling constituted according to the present invention, which corresponds to FIG. 3.

In the baffle mechanism 5 according to the first and second embodiments as described above, the baffle plates 51 are brought to a position where the stopper members 513 come in contact with the guide member 520 due to the spring force of the tension coiled springs 531 as shown in the upper half portions of FIGS. 2, 3 and 5 until the rotational speed of the turbine 42 reaches a predetermined value (e.g., 500 rpm which is an idling rotational speed of a diesel engine). As a result, the baffle plates 51 are positioned to greatly protrude into the fluid circulatory passage 400. While the engine is in idling operation, the operation fluid to which the rotational force is imparted by the rotation of pump 41 is caused to circulate through the turbine 42 as indicated by an arrow in FIG. 2. However, since the baffle plates 51 are positioned greatly protruding into the fluid circulatory passage 400, the operation fluid comes into collision with the baffle plates 51 causing a decrease in the velocity of flow and a decrease in the transmission of torque. It is, therefore, made possible to decrease the drag torque during the idling operation of the engine that is in a state where the speed ratio (e) of the pump to the turbine is zero (0), i.e., the pump rotates but the turbine is at rest. As the rotational speed of the turbine 42 becomes greater than the predetermined value, on the other hand, an increased centrifugal force acts on the baffle plates 51 and on the weight members 511. As shown in the lower half portions of FIGS. 2 and 3, therefore, the baffle plates 51 move outward in the radial direction against the spring forces of the tension coiled springs 531, and retract into between the core ring 411 of the pump shell 412 and the core ring 421 of the turbine shell 422. As a result, the baffle plates 51 protrude little or do not protrude into the fluid circulatory passage 400. The operation fluid that circulates flows into the pump 41 without receiving the action of the baffle plates 51 and, hence, the transmission efficiency does not decrease during the high-speed operation of the engine.

Figure 6:
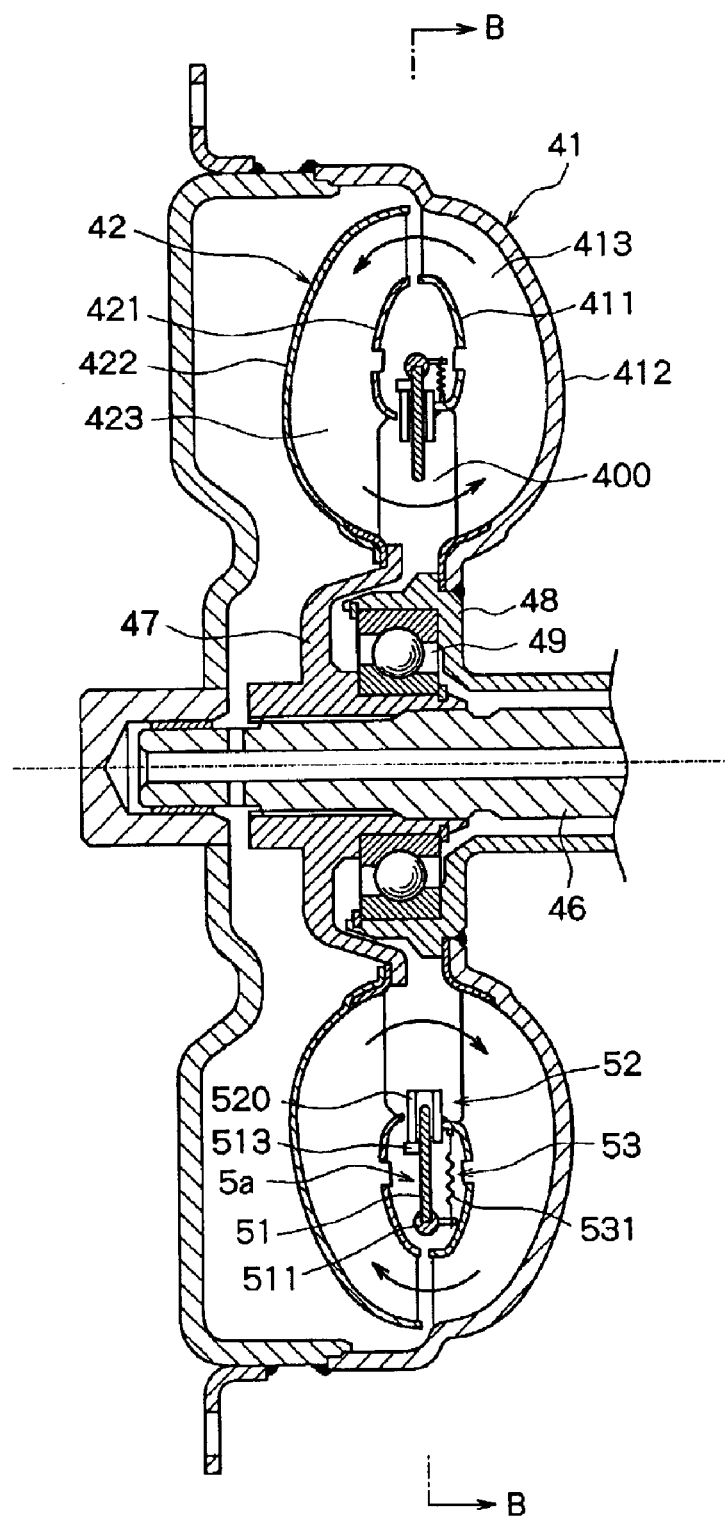
FIG. 6 is a sectional view illustrating the third embodiment of the fluid coupling constituted according to the present invention.
Figure 7:
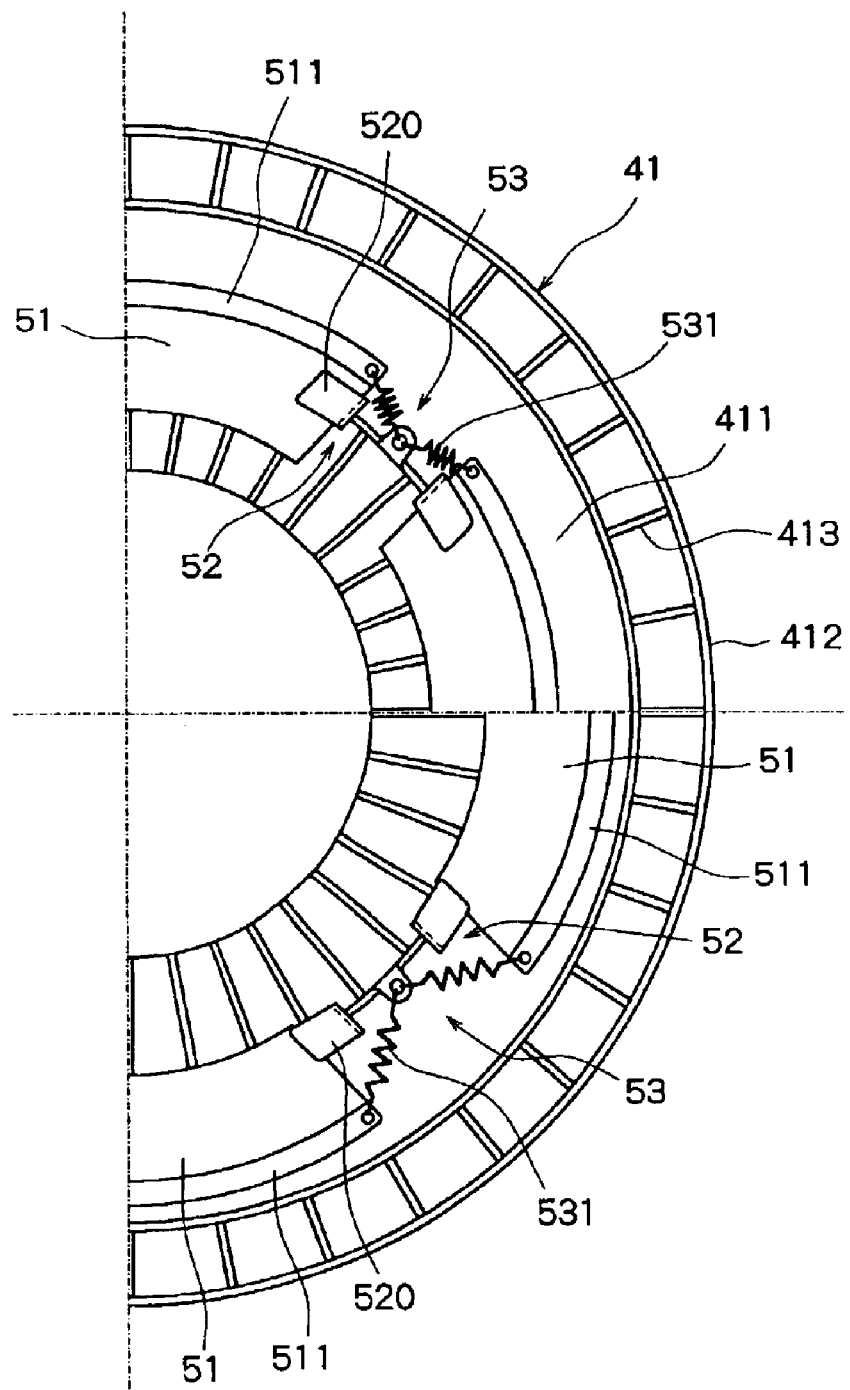
FIG. 7 is a sectional view along the line B—B in FIG. 6.

Next, the baffle mechanism 5a according to the third embodiment will be described with reference to FIGS. 6 to 8. In the baffle mechanism 5a according to the third embodiment, the same members as those members constituting the baffle mechanism 5 of the first embodiment are denoted by the same reference numerals but their description is not repeated.

Like the baffle mechanism 5 in the first embodiment, the baffle mechanism 5a according to the third embodiment, too, comprises a plurality of (four in the illustrated embodiment) baffle plates 51 movably arranged between the core ring 411 of the pump shell 412 and the core ring 421 of the turbine shell 422 so as to move in the radial direction, a guide means 52 for guiding the movement of the baffle plates 51, and a limiting means 53 for limiting the movement of the plurality of baffle plates 51 until the rotational speed of the turbine 42 reaches a predetermined value. The baffle mechanism 5a according to the third embodiment is different from the baffle mechanism 5 according to the first embodiment with respect to that the U-shaped guide member 520 serving as the guide means 52 is attached, by a fixing means such as welding or the like, onto the inner peripheral portion of the core ring 411 of the pump shell 412 and that the tension coiled spring 531 serving as the limiting means 53 is disposed between both ends of the weight member 511 mounted on the baffle plate 51 and the inner peripheral portion of the core ring 411 of the pump shell 412. Here, the limiting means 53 may be spring members such as tension coiled springs 531 arranged among the neighboring baffle plates 51, 51 as employed by the fourth embodiment shown in FIG. 9.

Figure 39:
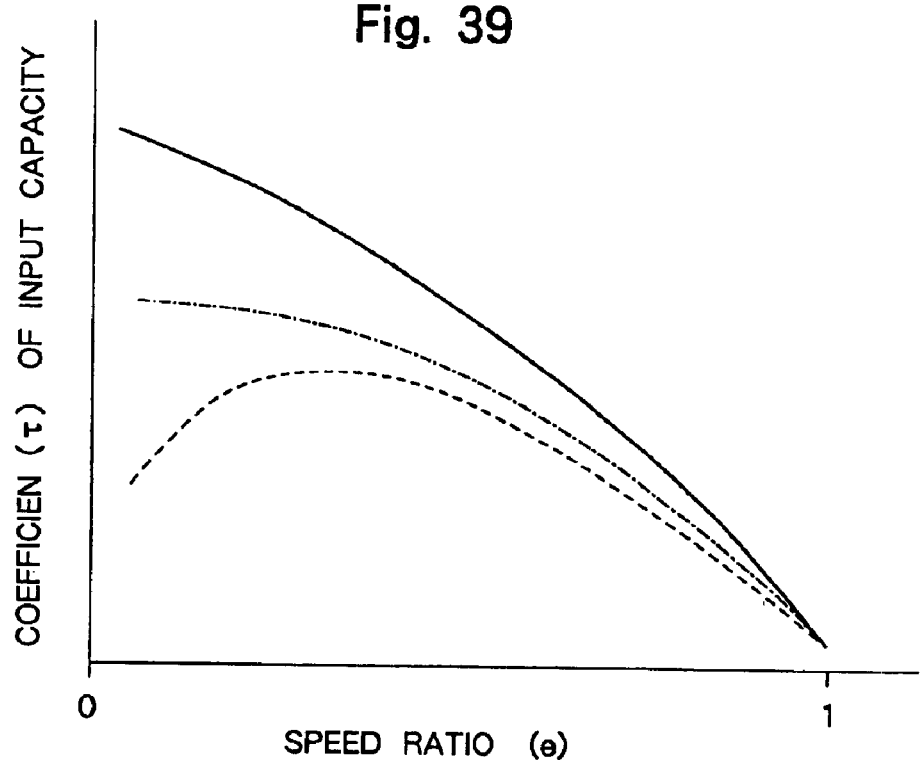
FIG. 39 is a diagram illustrating characteristics of the fluid coupling constituted according to the present invention.
Figure 40:
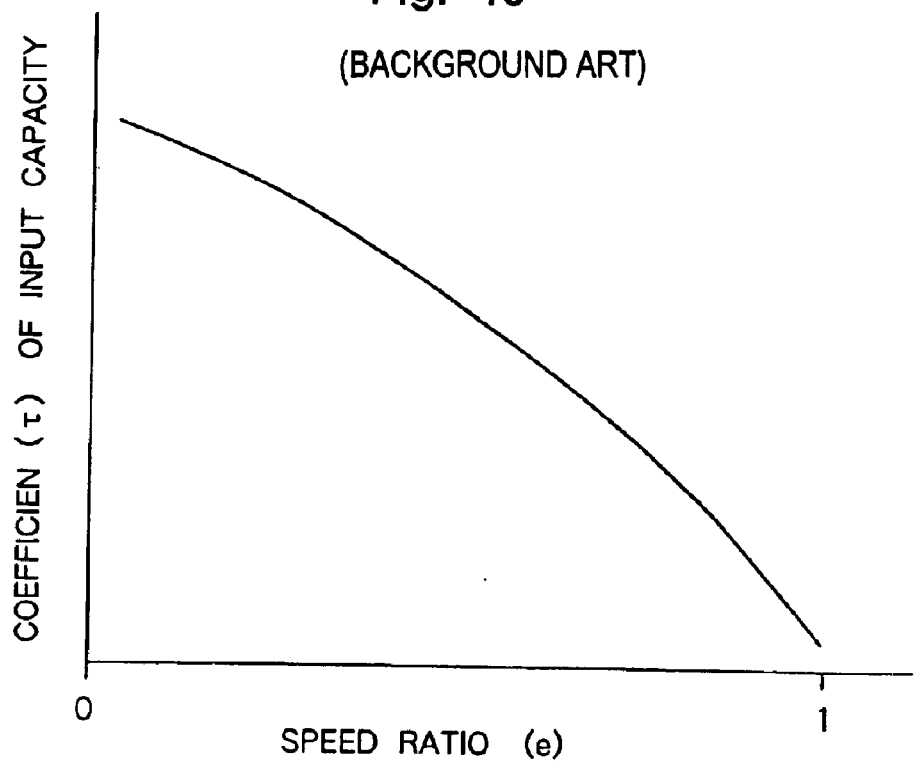
FIG. 40 is a diagram illustrating characteristics of a fluid coupling that has heretofore been used.
Figure 41:
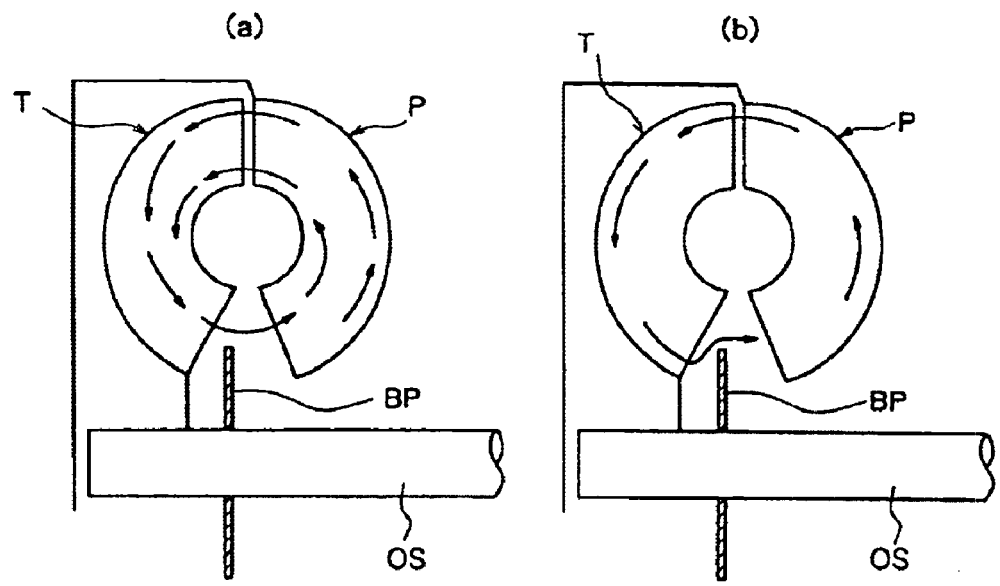
FIG. 41 is a diagram illustrating the flow of operation fluid in an example of the conventional fluid coupling.
Figure 42:
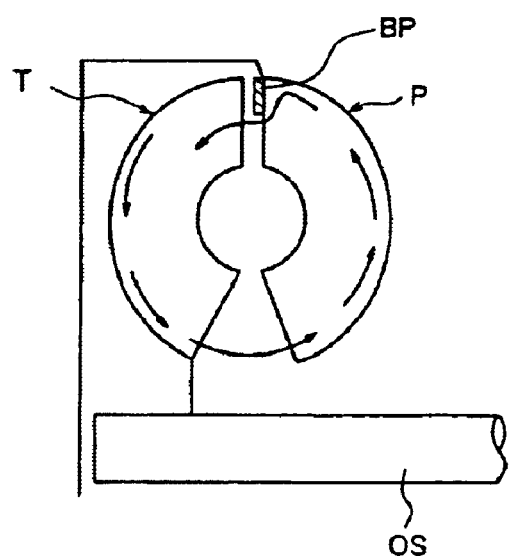
FIG. 42 is a diagram illustrating the flow of operation fluid in another example of the conventional fluid coupling.

In the baffle mechanism 5a of the third and fourth embodiments, the guide members 520 are mounted on the inner peripheral portion of the core ring 411 of the pump shell 412, and the baffle plates 51 move along the guide members 520. Therefore, the baffle plates 51 move in response to the rotational speed of the pump 41. Accordingly, the fluid coupling equipped with the baffle mechanism 5a according to the third and fourth embodiments exhibits characteristics shown in FIG. 39 in response to the rotational speed of the pump 41, i.e., of the engine. In FIG. 39, the abscissa represents the speed ratio (e) of the pump to the turbine, and the ordinate represents the coefficient ($\tau$) of input capacity of the fluid coupling. In FIG. 39, a broken line represents characteristics at the idling operation (e.g., rotational speed of 500 rpm) of the diesel engine, a dot-dash chain line represents characteristics at the start (e.g., rotational speed of 1000 rpm), and a solid line represents characteristics at the maximum torque operation of the engine (e.g., rotational speed of 1500 rpm). That is, the fluid coupling equipped with the baffle mechanism 5a of the third and fourth embodiments exhibits characteristics that vary depending upon the engine operating conditions, making it possible to lower the drag torque during the idling operation and to obtain a transmission of torque that matches with the driver's driving feeling assuring a smooth start of the vehicle.

Figure 10:
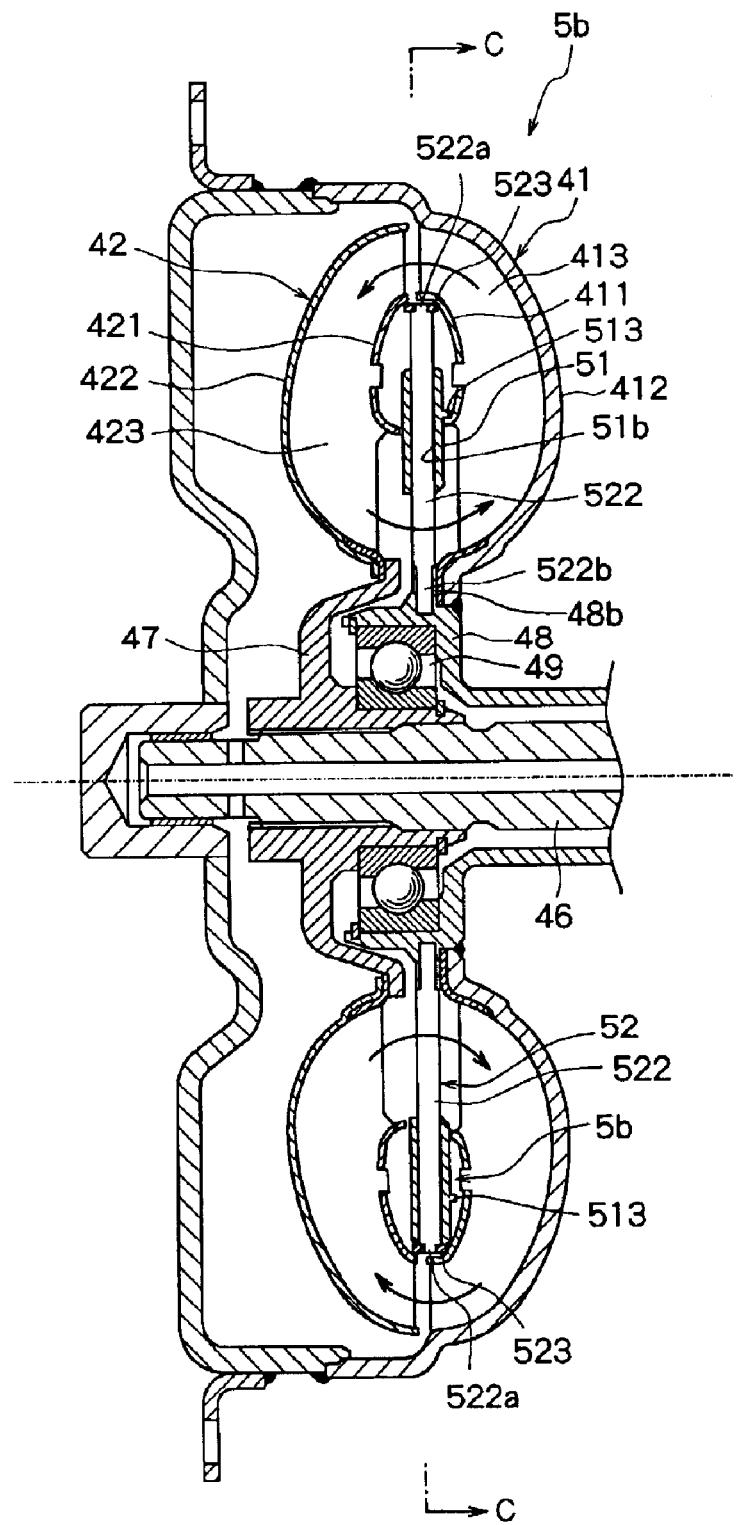
FIG. 10 is a sectional view illustrating the fifth embodiment of the fluid coupling constituted according to the present invention.
Figure 11:
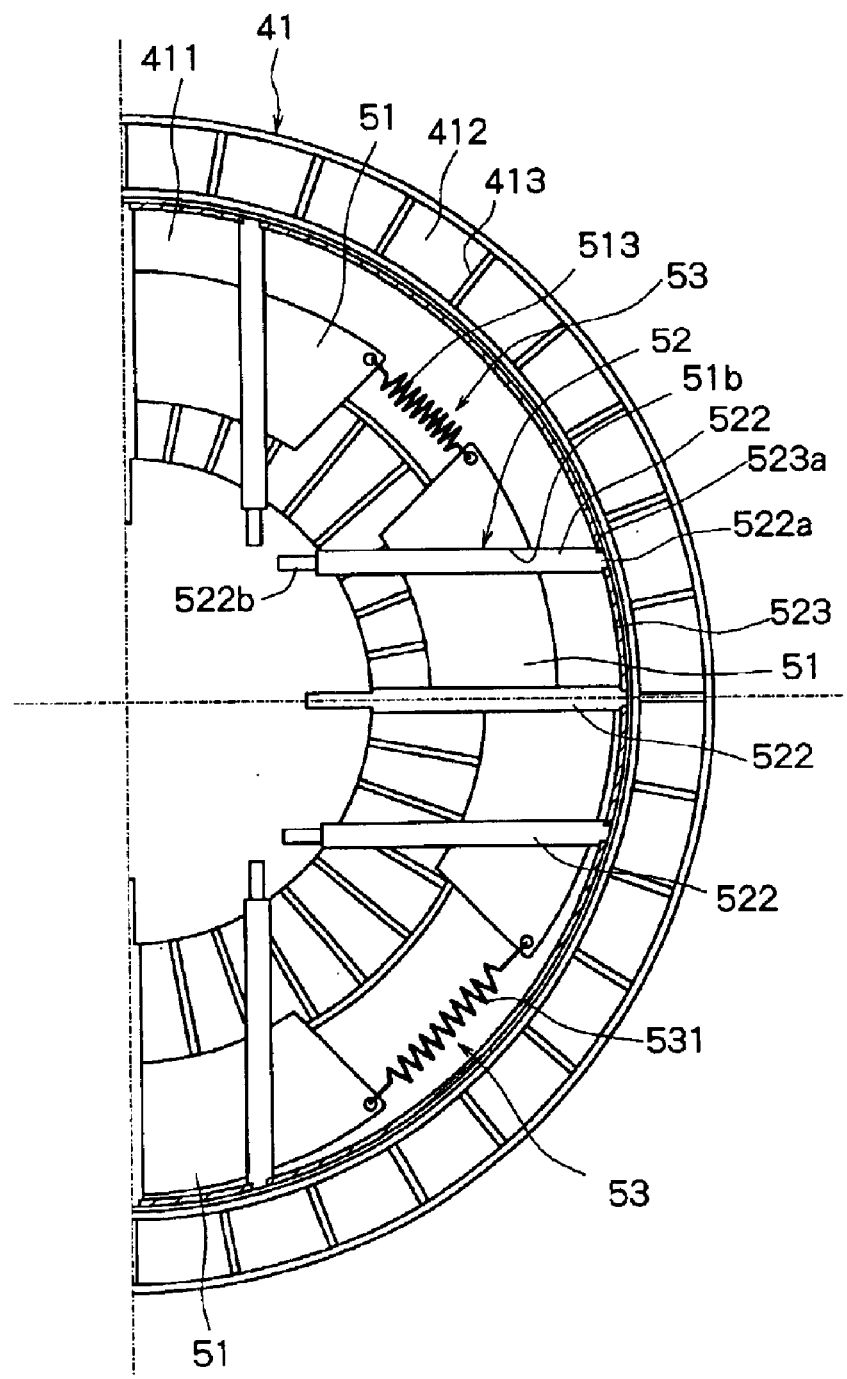
FIG. 11 is a sectional view along the line C—C in FIG. 10.

Next, the baffle mechanism 5b according to the fifth embodiment will be described with reference to FIGS. 10 and 11. In the baffle mechanism 5b according to the fifth embodiment, the same members as those members constituting the baffle mechanisms 5 and 5a of the first to fourth embodiments are denoted by the same reference numerals but their description is not repeated.

In the baffle mechanism 5b of the fifth embodiment, the guide means 52 for guiding the baffle plates 51 in the radial direction is constituted by three guide shafts 522 for each baffle plate. The three guide shafts 522 are arranged being inserted between the core ring 411 of the pump shell 412 and the core ring 421 of the turbine shell 422. One at the center of them is arranged in the radial direction and the other two are arranged in parallel with the central one. The three guide shafts 522 are mounted, at the ends on the outer peripheral side thereof, on an annular guide shaft support member 523 mounted on the outer peripheral side of the core ring 411 of the pump shell 412 and are mounted, at the ends on the inner peripheral side thereof, on the pump hub 48. Specifically, the ends of the guide shafts 522 on the outer peripheral side thereof are formed to possess a small diameter, and the small-diameter portions 522a are fitted into fitting holes 523a formed in the guide shaft support member 523. On the other hand, the ends of the guide shafts 522 on the inner peripheral side, too, are formed to possess a small diameter, and the small-diameter portions 522b are fitted into fitting holes 48b formed in the pump hub 48.

Three through holes 51b are formed in parallel in each baffle plate 51 to meet the gap among the three guide shafts 522, and the guide shafts 522 are inserted in these three through holes 51b. Therefore, each baffle plate 51 is guided by three guide shafts 522 to move in the radial direction. A stopper portion 513 is formed protruding from the central side surface of each baffle plate 51 on the side of the pump shell 412. The stopper portion 513 comes in contact with the inner peripheral edge of the core ring 411 of the pump shell 412 to limit the motion toward the side of the fluid circulatory passage 400. In the baffle mechanism 5b according to the fifth embodiment, the tension coiled spring 531 as the limiting means 53 is arranged between the baffle plates 51 and 51 which are adjacent to each other. Being constituted as described above, the baffle mechanism 5b according to the fifth embodiment exhibits the same action and effect as those of the baffle mechanism 5a of the second embodiment, and assures the rigidity of the baffle plates 51.

Next, the baffle mechanism 5c according to the sixth embodiment will be described with reference to FIGS. 12 and 13. In the baffle mechanism 5c according to the sixth embodiment, the same members as those members constituting the baffle mechanisms of the above embodiments are denoted by the same reference numerals but their description is not repeated.

The baffle mechanism 5c according to the sixth embodiment comprises a plurality of (eight in the illustrated embodiment) baffle plates 51 which are arranged between the core ring 411 of the pump shell 412 and the core ring 421 of the turbine shell 422 and are turnably supported, at the ends on one side thereof, on a support shaft 54 mounted on the core ring 421 of the turbine shell 422, and a limiting means 53 for limiting the movement of the plurality of baffle plates 51 until the rotational speed of the turbine 42 reaches a predetermined value. The baffle plate 51 has a shaft hole 51c formed in one end portion thereof and is fitted with a weight member 511 at the other end portion thereof. The support shaft 54 is arranged in the axial direction of the turbine 42, is mounted at its one end to the core ring 421 of the turbine shell 422 by welding, and is rotatably fitted at the other end thereof to the shaft hole 51c formed in one end portion of the baffle plate 51. The limiting means 53 is constituted by a tension coiled spring 531, and is arranged between the baffle plates 51 that are adjacent to each other.

Figure 12:
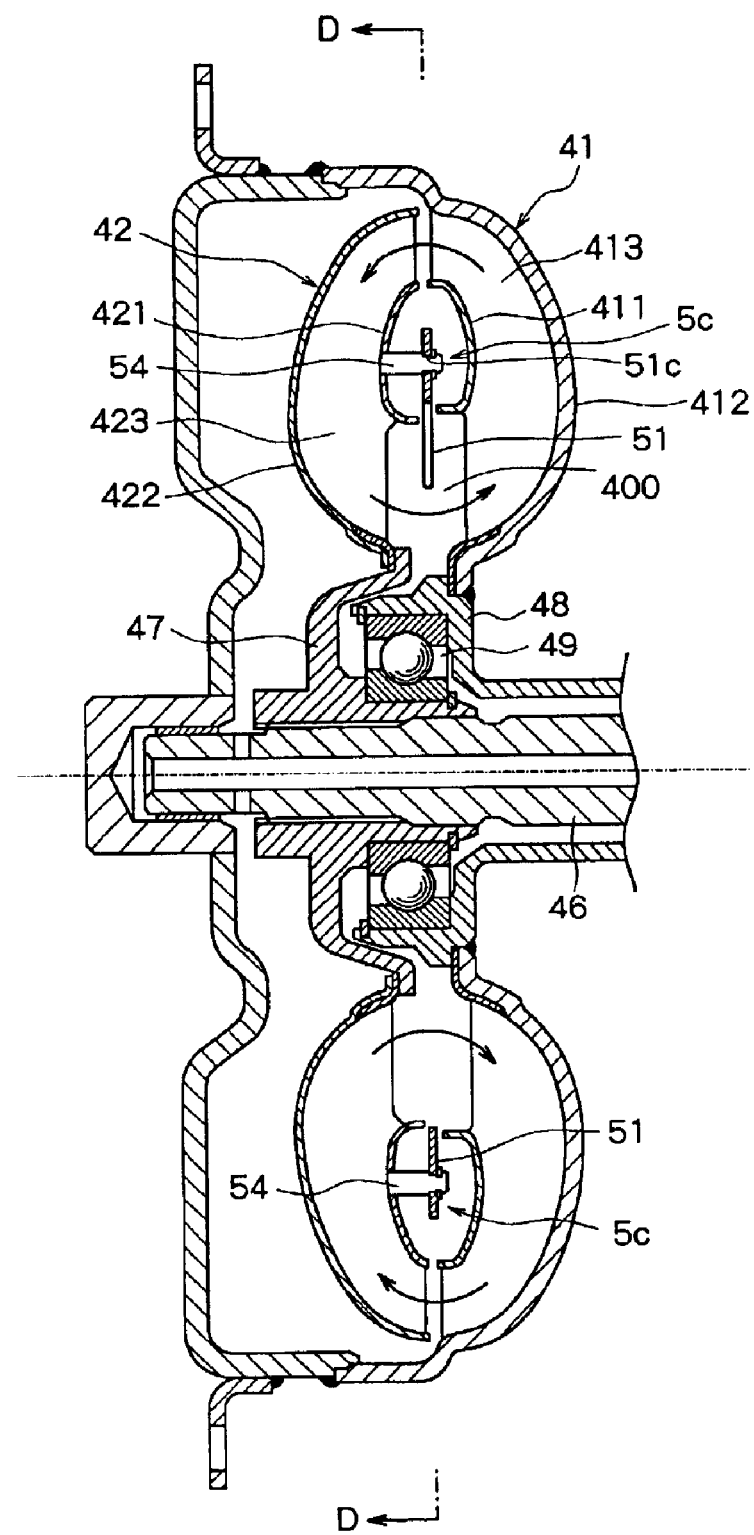
FIG. 12 is a sectional view illustrating the sixth embodiment of the fluid coupling constituted according to the present invention.
Figure 13:
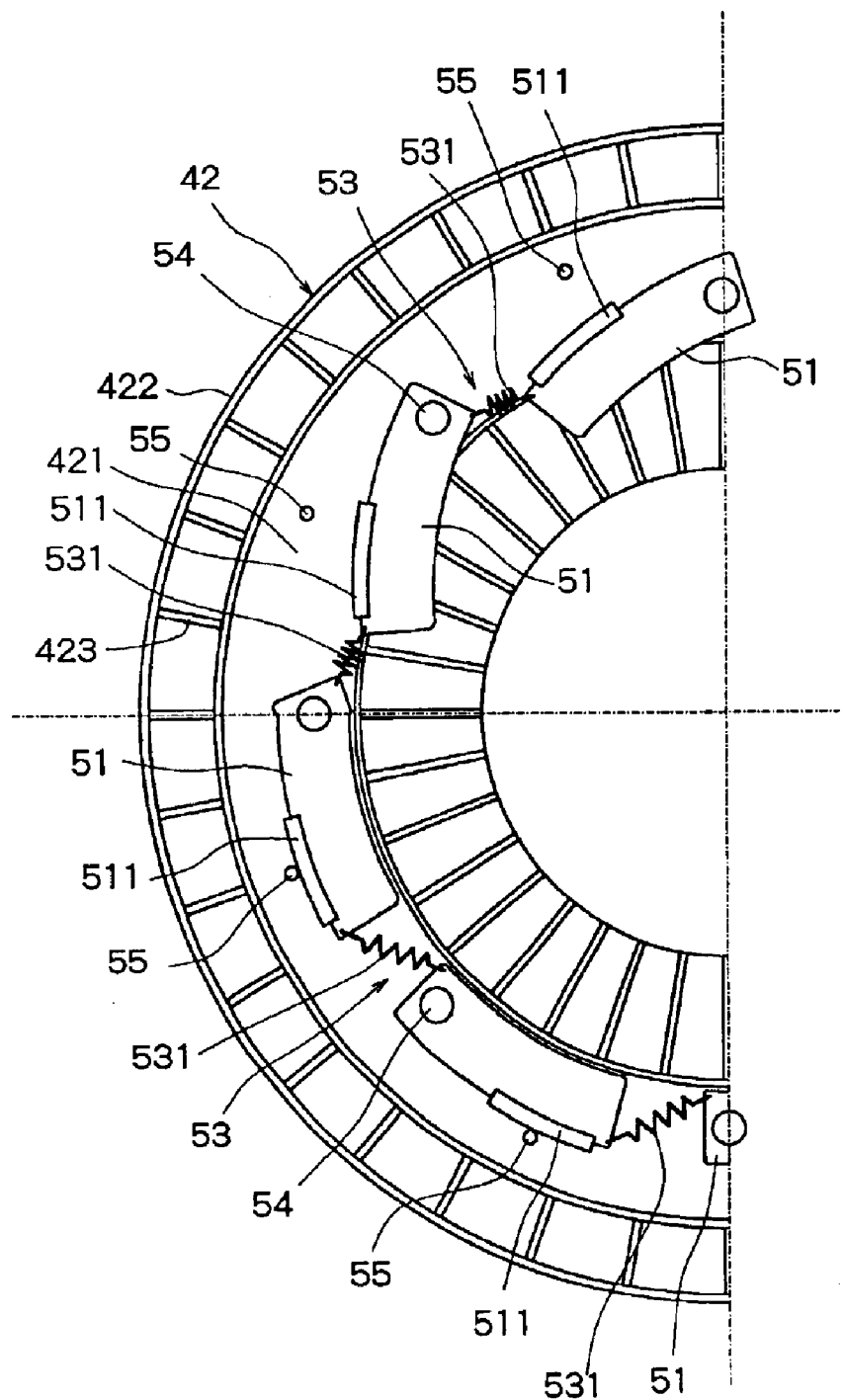
FIG. 13 is a sectional view along the line D—D in FIG. 12.

The baffle mechanism 5c according to the sixth embodiment is constituted as described above, and the baffle plates 51 are positioned to greatly protrude into the fluid circulatory passage 400 due to the spring force of the tension coiled springs 531 as shown in the upper half portions of FIGS. 12 and 13 until the rotational speed of the turbine 42 reaches a predetermined value. When the rotational speed of the turbine 42 becomes higher than the predetermined value, on the other hand, the baffle plates 51 turn against the spring forces of the tension coiled springs 531 with the support shafts 54 as a center due to the centrifugal force, and retract into between the core ring 411 of the pump shell 412 and the core ring 421 of the turbine shell 422 as shown in the lower half portions of FIGS. 12 and 13, and come in contact with the stopper pins 55 mounted on the core ring.421 of the turbine shell 422. Therefore, there are obtained the same action and effect as those of the above-mentioned embodiments.

Next, the baffle mechanism 5d according to the seventh embodiment will be described with reference to FIGS. 14 and 15. In the baffle mechanism 5d according to the seventh embodiment, the same members as those members constituting the baffle mechanisms of the above embodiments are denoted by the same reference numerals but their description is not repeated.

The baffle mechanism 5d according to the seventh embodiment is different from the baffle mechanism 5c of the sixth embodiment in regard to the baffle plates 51 constituting the baffle mechanism 5c of the sixth embodiment shown in FIGS. 12 and 13 being mounted on the core ring 411 of the pump shell 412. Namely, the baffle mechanism 5d according to the seventh embodiment comprises a plurality of (eight in the illustrated embodiment) baffle plates 51 arranged between the core ring 411 of the pump shell 412 and the core ring 421 of the turbine shell 422 and turnably supported, at the ends on one side thereof, by the support shafts 54 mounted on the core ring 411 of the pump shell 412, and a limiting means 53 arranged between the neighboring baffle plates 51 and constituted by tensile coiled springs 531 to limit the movement of the plurality of baffle plates 51 until the rotational speed of the pump 41 reaches a predetermined value.

Figure 14:
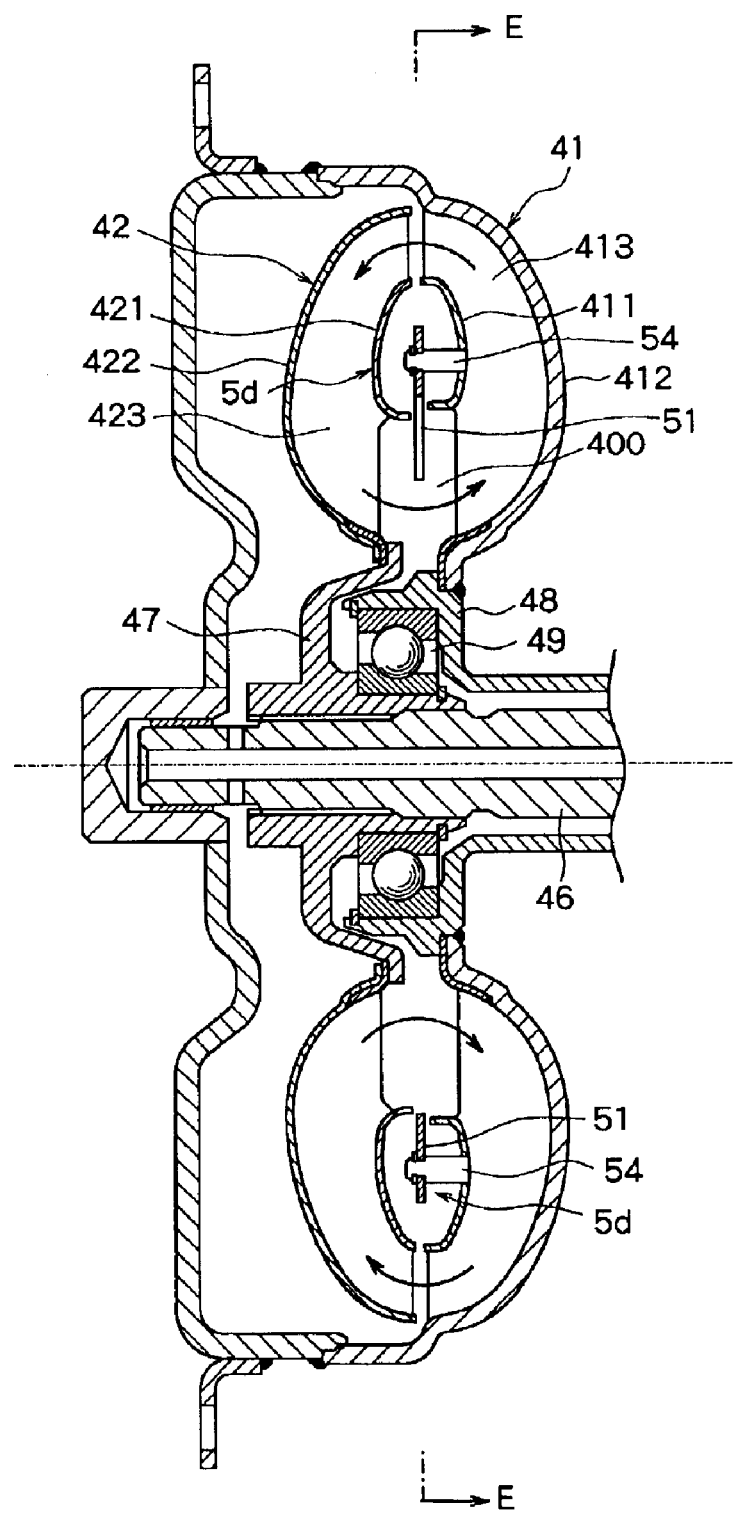
FIG. 14 is a sectional view illustrating the seventh embodiment of the fluid coupling constituted according to the present invention.
Figure 15:
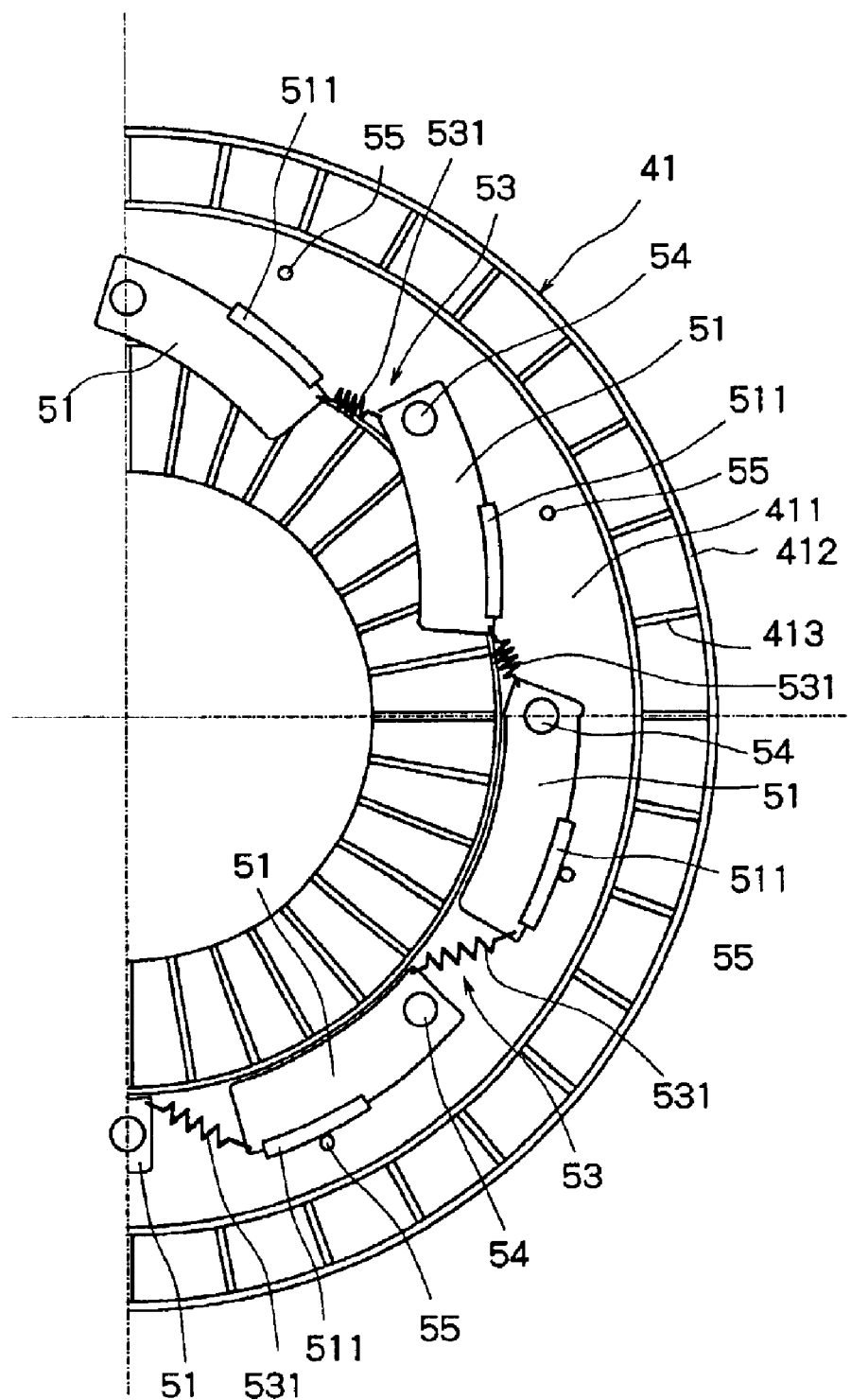
FIG. 15 is a sectional view along the line E—E in FIG. 14.

The baffle mechanism 5d according to the seventh embodiment is constituted as described above, and the baffle plates 51 are positioned to greatly protrude into the fluid circulatory passage 400 due to the spring forces of the tension coiled springs 531 as shown in the upper half portions of FIGS. 14 and 15 until the rotational speed of the pump 41 reaches a predetermined value. When the rotational speed of the pump 41 becomes higher than the predetermined value, on the other hand, the baffle plates 51 turn against the spring forces of the tension coiled springs 531 on the support shafts 54 as centers due to the centrifugal force, and retract into between the core ring 411 of the pump shell 412 and the core ring 421 of the turbine shell 422 as shown in the lower half portions of FIGS. 14 and 15, and come in contact with the stopper pins 55 mounted on the core ring 411 of the pump shell 412. Therefore, there are obtained the same action and effect as those of the above-mentioned embodiments.

Figure 16:
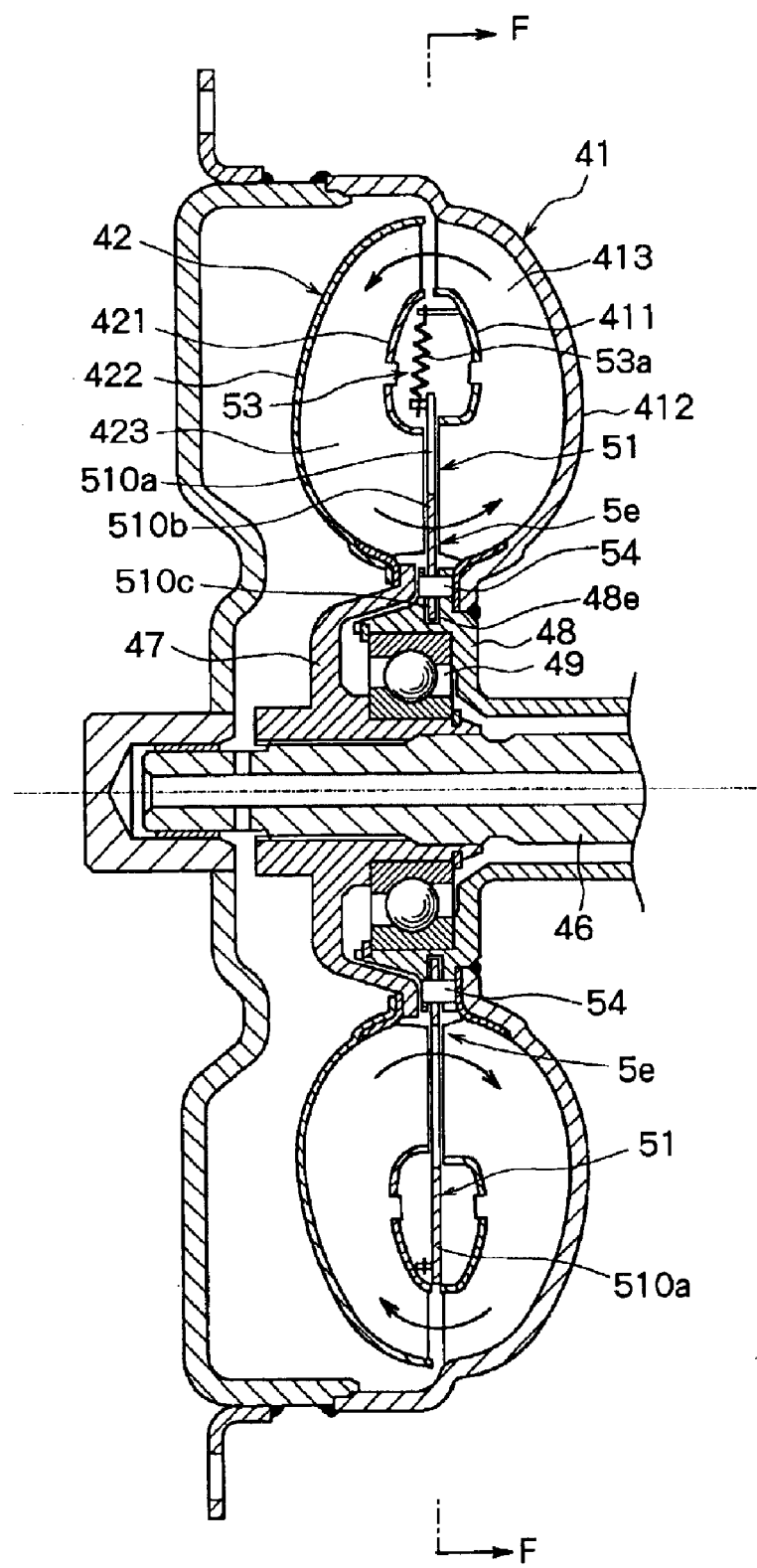
FIG. 16 is a sectional view illustrating the eighth embodiment of the fluid coupling constituted according to the present invention.

Next, the baffle mechanism 5e according to the eighth embodiment will be described with reference to FIGS. 16 to 18. In the baffle mechanism 5e according to the eighth embodiment, the same members as those members constituting the baffle mechanisms of the above embodiments are denoted by the same reference numerals but their description is not repeated.

The baffle mechanism 5e according to the eighth embodiment includes a plurality of (four in the illustrated embodiment) baffle plates 51 that are arranged between the core ring 411 of the pump shell 412 and the core ring 421 of the turbine shell 422 and are turnably supported, at the ends on one side thereof, by a support shaft 54 mounted on the inner peripheral portion of the pump shell 412, and a limiting means 53 for limiting the movement of the plurality of baffle plates 51 until the rotational speed of the pump 41 reaches a predetermined value. The baffle plate 51 comprises a baffle portion 510a, a support portion 510b and a coupling portion 510c for coupling them together, and the support portion 510b is turnably supported by the support shaft 54 mounted on the inner peripheral portion of the pump shell 412 in the axial direction. Grooves 48e in which the support portions 510b of the baffle plates 51 are to be inserted are formed in a pump hub 48 mounted on the pump shell 412. A weight member 511 is embedded in the baffle portion 510a of the baffle plate 51. The limiting means 53 is constituted by the tension coiled spring 531, and is arranged between the baffle portion 510a of the baffle plate 51 and the core ring 421 of the pump shell 412. It is desired that the coupling portion 510c coupling the baffle portion 510a of the baffle plate 51 to the support portion 510b is formed as narrow as possible so will not to impart resistance to the fluid.

Figure 17:
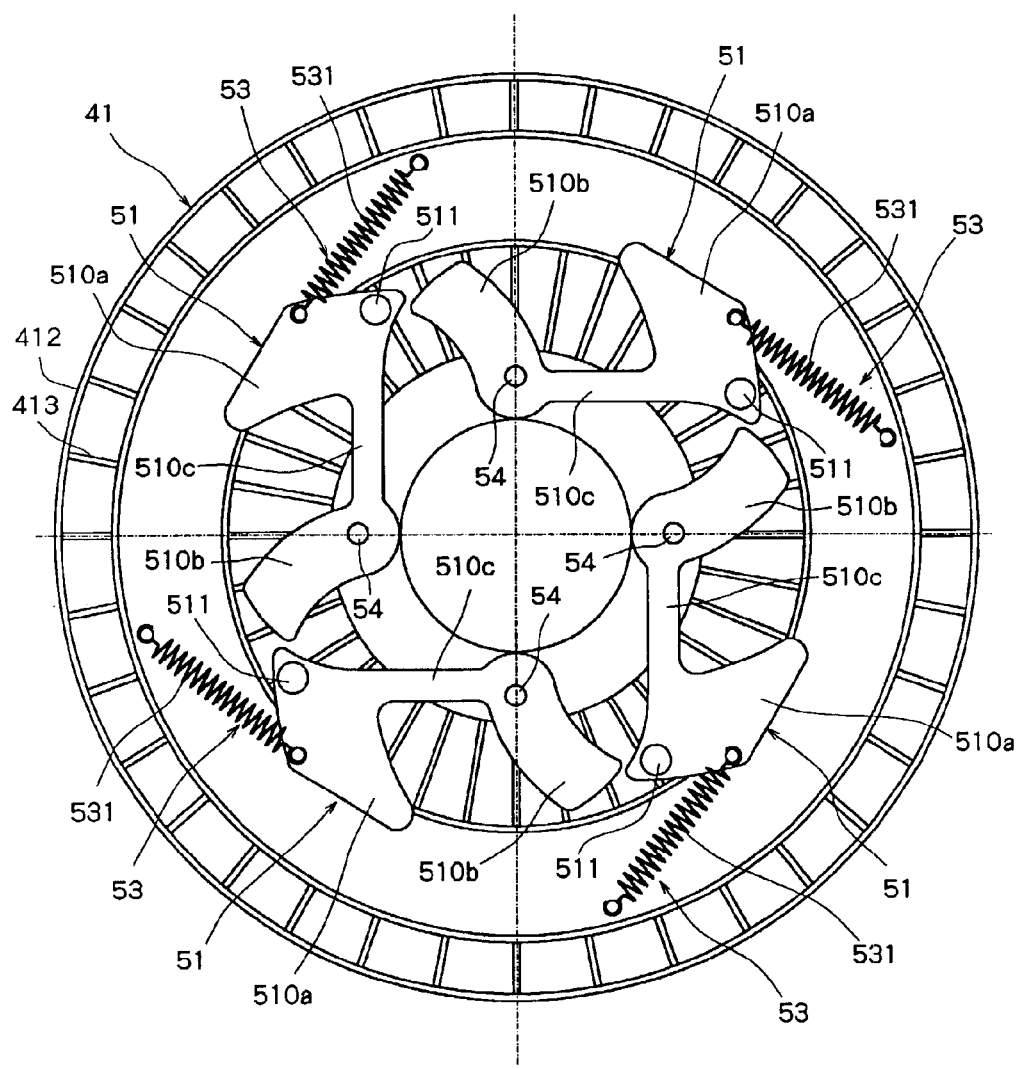
FIG. 17 is a sectional view along the line F—F in FIG. 16.
Figure 18:
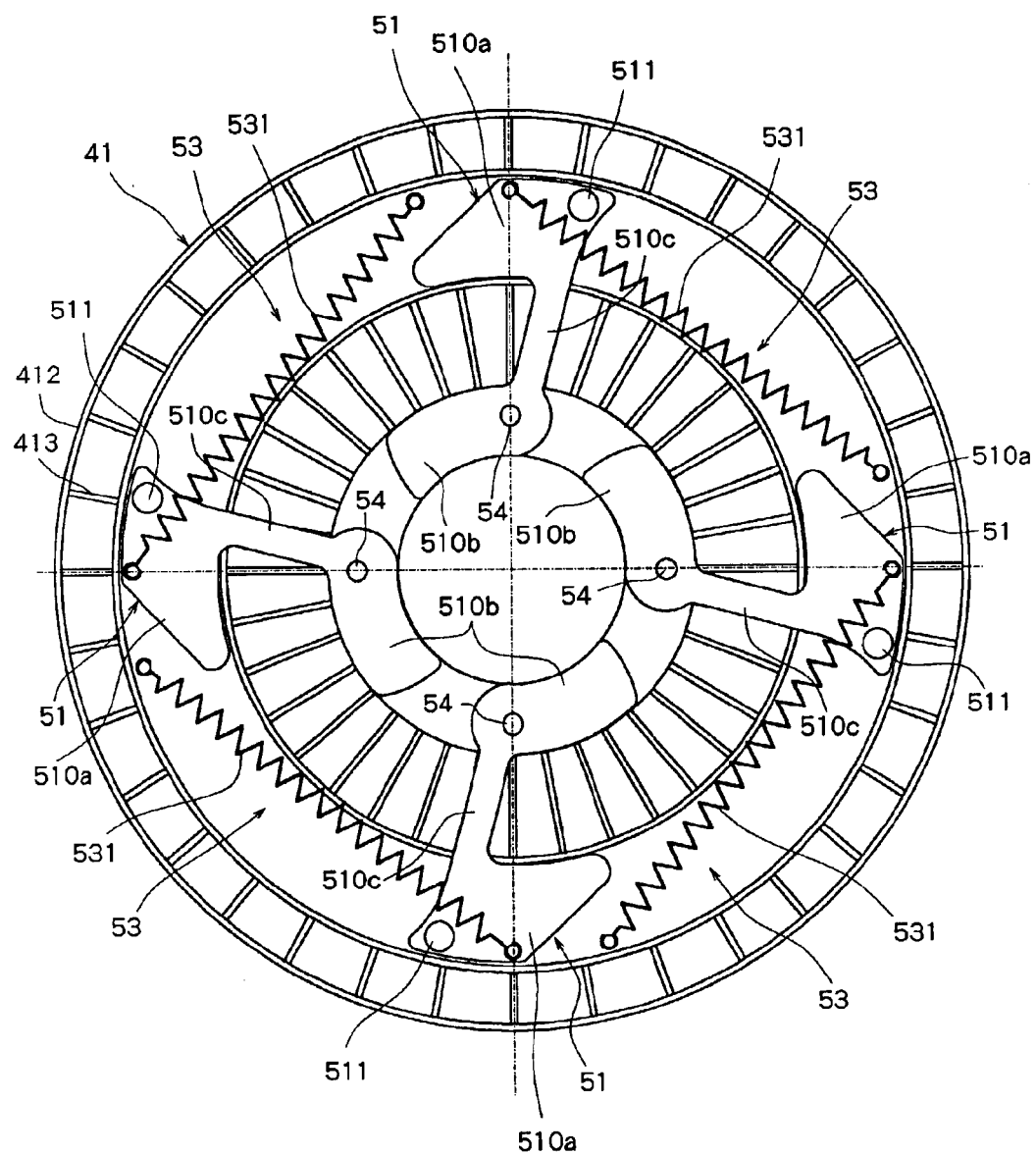
FIG. 18 is a view illustrating the operating state on the F—F sectional view of FIG. 16.

The baffle mechanism 5e according to the eighth embodiment is constituted as described above, and the baffle portions 510a of the baffle plates 51 are positioned to greatly protrude into the fluid circulatory passage 400 due to the spring forces of the tension coiled springs 531 as shown in FIG. 17 until the rotational speed of the pump 41 reaches a predetermined value. When the rotational speed of the pump 41 becomes higher than the predetermined value, on the other hand, the baffle portions 510a of the baffle plates 51 turn against the spring forces of the tension coiled springs 531 on the support shafts 54 as centers due to the centrifugal force, and retract into between the core ring 411 of the pump shell 412 and the core ring 421 of the turbine shell 422 as shown in FIG. 18. Therefore, there are obtained the same action and effect as those of the above-mentioned embodiments.

Though the eighth embodiment has dealt with the baffle mechanism 5e in which the baffle plates 51 are mounted on the pump shell 412, the same action and effect are obtained even when the baffle plates 51 are mounted on the turbine shell 422.

Next, the baffle mechanism 5f according to the ninth embodiment will be described with reference to FIGS. 19 and 20. In the baffle mechanism 5f according to the ninth embodiment, the same members as those members constituting the baffle mechanisms of the above embodiments are denoted by the same reference numerals but their description is not repeated.

The baffle mechanism 5f according to the ninth embodiment is the one in which the invention is applied to the fluid coupling that is constituted by the pump 41 and the turbine 42 without having core rings. Like those of the above-mentioned embodiments, the baffle mechanism 5f according to the ninth embodiment comprises a plurality of (four in the illustrated embodiment) baffle plates 51 arranged between the pump shell 412 and the turbine shell 422 so as to move in the radial direction, a guide means 52 for guiding the movement of the baffle plates 51 in the radial direction, and a limiting means 53 for limiting the movement of the plurality of baffle plates 51 until the rotational speed of the turbine 42 reaches a predetermined value.

The baffle mechanism 5f according to the ninth embodiment has a feature in that the baffle plates 51 are arranged to move in the radial direction of the fluid circulatory passage 400 formed by the pump shell 412 and the turbine shell 422 between the inner peripheral portion thereof in the radial direction and the central portion thereof, that the baffle plates 51 are so constituted as to position on the side of the inner periphery of the fluid circulatory passage 400 in a state where the rotational speed of the turbine 42 is low and as to move toward the central portion of the fluid circulatory passage 400 in a state where the rotational speed of the turbine 42 is high. That is, the baffle plates 51 are movably supported by the guide means 52 mounted on a plurality of runners 423 radially arranged in the turbine shell 422, so as to move in the radial direction. The guide means 52 in the illustrated embodiment comprises a guide member 525 having two guide portions 524, 524 arranged between the baffle plates 51 and formed at right angles. The guide member 525 is formed of a channel member having guide grooves 525a, 525a corresponding to the thickness of the baffle plate 51, and is attached to the plurality of impellers 413 of the turbine 42 by a fixing means such as welding or the like. Stoppers 525b and 525c are formed on the inner peripheral side and on the outer peripheral side of the two guide portions 524, 524 constituted by the guide member 525. Specifically, the stopper portions 525b and 525c are formed by cutting and bending the bottom plate of the guide member 525 in the form of a tongue. Both side portions of the neighboring baffle plates 51 are fitted into the guide groves 525a, 525a of the thus constituted guide member 525. Therefore, the baffle plates 51 are allowed to move between the stopper portions 525b and 525c along the guide grooves 525a. The limiting means 53 according to the illustrated embodiment is constituted by the tension coiled spring 531 arranged between the baffle plates 51 and 51 that are adjacent to each other.

Figure 19:
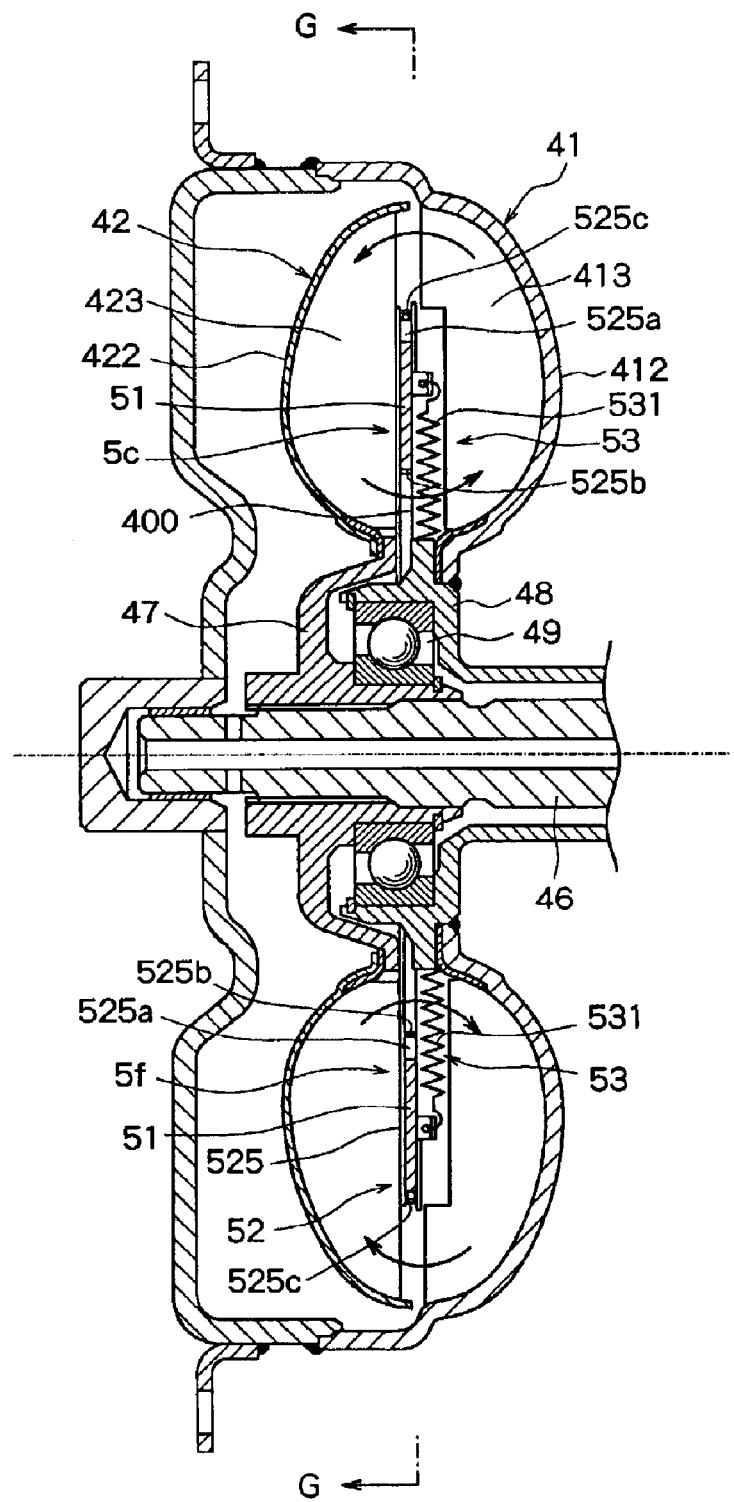
FIG. 19 is a sectional view illustrating the ninth embodiment of the fluid coupling constituted according to the present invention.
Figure 20:
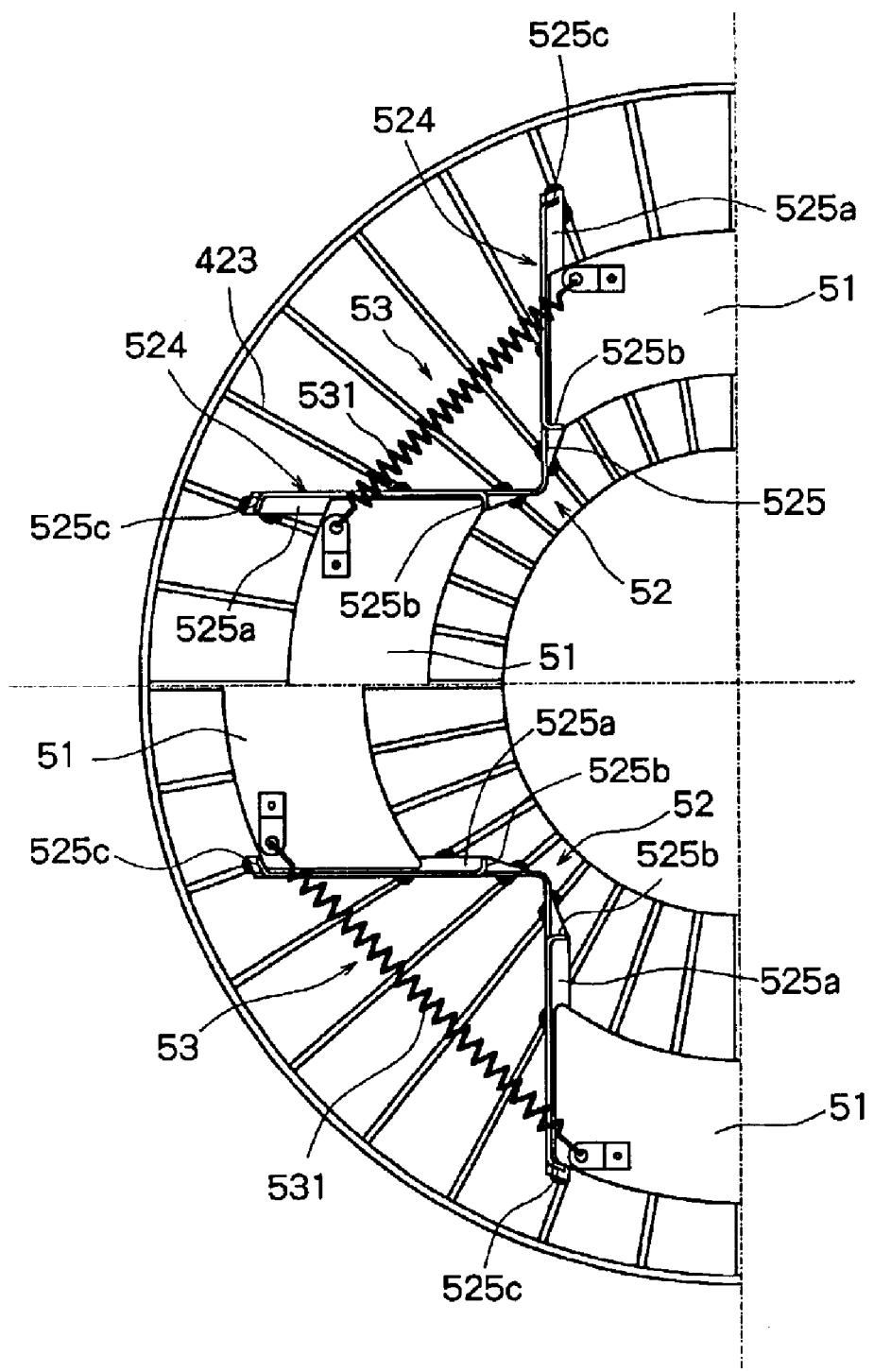
FIG. 20 is a sectional view along the line G—G in FIG. 19.

The baffle mechanism 5f according to the ninth embodiment is constituted as described above, and the baffle plates 51 are positioned to come in contact with the stopper portions 525b on the inner peripheral side due to the spring forces of the tension coiled springs 531 as shown in the upper half portions of FIGS. 19 and 20 until the rotational speed of the turbine 42 reaches a predetermined value (e.g., 500 rpm which is an idling rotational speed of a diesel engine). As a result, the baffle plates are positioned to protrude toward the inner periphery of the fluid circulatory passage 400 in the radial direction. While the engine is in idling operation, the operation fluid to which the rotational force is imparted by the rotation of pump 41 is caused to circulate through the turbine 42 as indicated by an arrow in FIG. 12. However, since the baffle plates 51 are positioned greatly protruding toward the inner periphery of the fluid circulatory passage 400 in the radial direction, the operation fluid comes into collision with the baffle plates 51 thereby causing a decrease in the velocity of flow and a decrease in the transmission of torque. It is, therefore, made possible to decrease the drag torque during the idling operation of the engine which is in a state where the speed ratio (e) of the pump and the turbine is zero (0), i.e., the pump rotates but the turbine is at rest. As the rotational speed of the turbine 42 becomes greater than the predetermined value, on the other hand, an increased centrifugal force acts on the baffle plates 51. As shown in the lower half portions of FIGS. 19 and 20, therefore, the baffle plates 51 move outward in the radial direction against the spring forces of the tension coiled springs 531, and come in contact with the stopper portions 525c on the outer peripheral side to be positioned at the central portion of the fluid circulatory passage 400. The operation fluid circulating through the pump shell 412 and the turbine shell 422 in a direction indicated by an arrow in FIG. 19 has a large velocity of flow on the outer peripheral side and a small velocity of flow in the central portion due to the action of centrifugal force. Therefore, the operation fluid is little affected by the baffle plates 51 positioned at the central portion of the fluid circulatory passage 400, and the transmission efficiency does not decrease during the high-speed operation of the engine.

It is desired that the baffle plates 51 according to the ninth embodiment be fitted with the weight members on the outer peripheral edges thereof like those in the above-mentioned embodiments. In the embodiment shown in FIGS. 19 and 20, the guide members 525 that serve as guide means 52 are mounted on the turbine 42. However, the guide members 525 that serve as guide means 52 may be mounted on the side of the pump 41. When the guide members 525 are mounted on the pump 41 side to movably guide the baffle plates 51 in the radial direction, the baffle plates 51 are positioned on the side of the inner periphery of the fluid circulatory passage 400 in a state where the rotational speed of the pump 41 is low and are moved toward the central portion of the fluid circulatory passage 400 in a state where the rotational speed of the pump 41 is high. By mounting the guide members 525 as the guide means 52 on the pump 41 side, therefore, there are obtained the same action and effect as those of the above-mentioned third and fourth embodiments.

Figure 21:
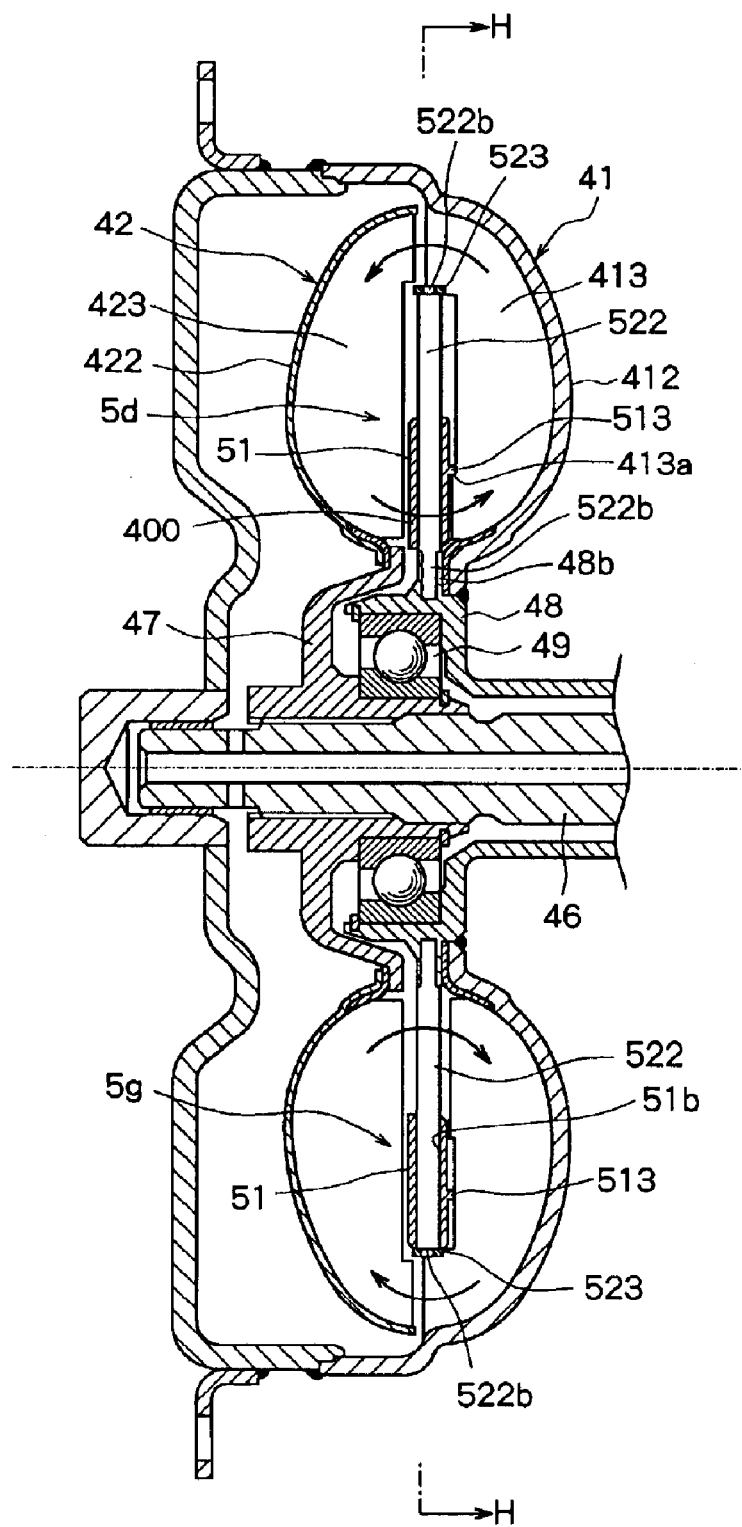
FIG. 21 is a sectional view illustrating the tenth embodiment of the fluid coupling constituted according to the present invention.
Figure 22:
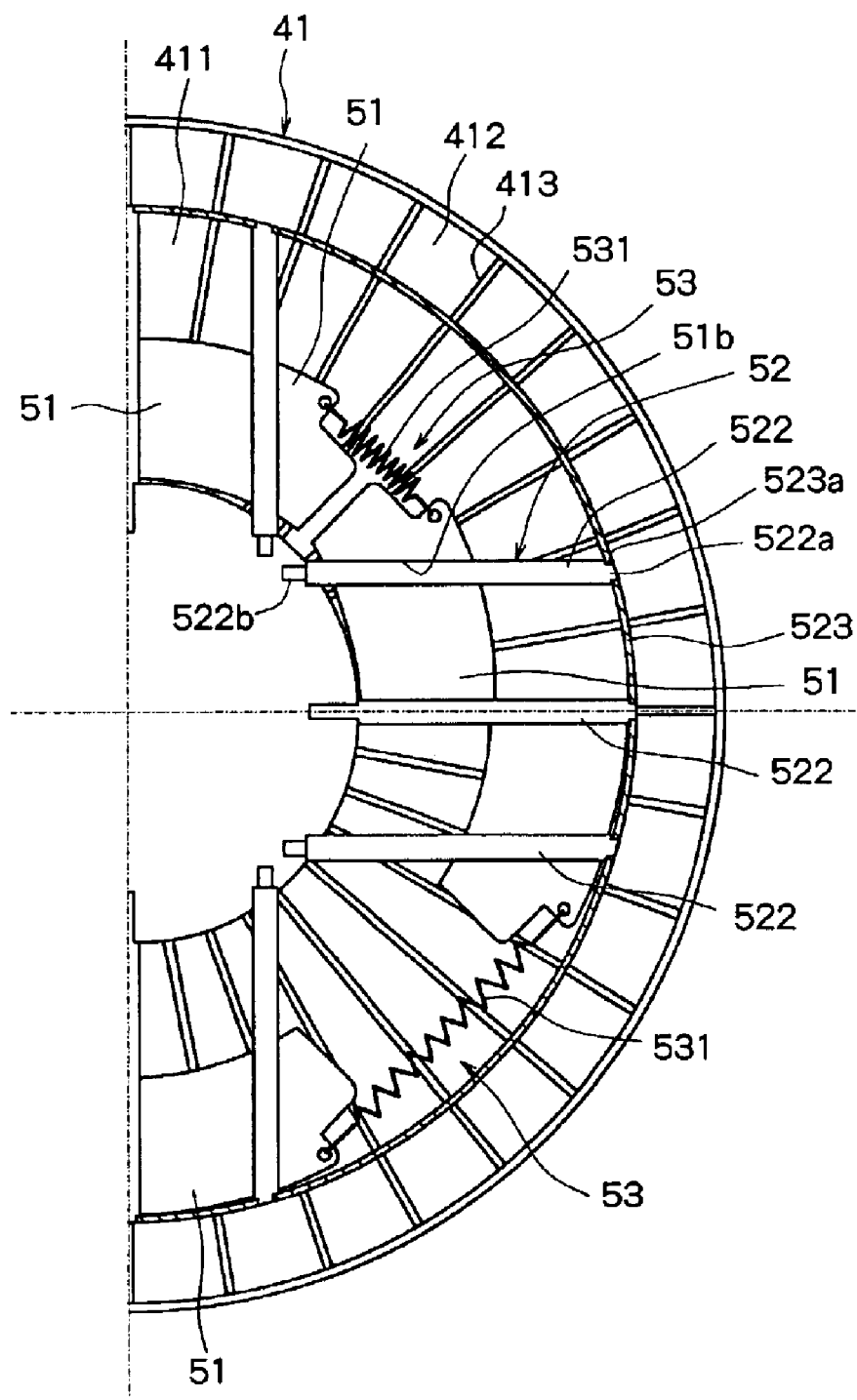
FIG. 22 is a sectional view along the line H—H in FIG. 21.

Next, the baffle mechanism 5g according to the tenth embodiment will be described with reference to FIGS. 21 and 22. The baffle mechanism 5g according to the tenth embodiment is the one in which the baffle mechanism 5b of the above fifth embodiment is applied to the fluid coupling constituted by the pump 41 and the turbine 42 without having core rings. In the baffle mechanism 5g of the tenth embodiment, therefore, the same members as those constituting the baffle mechanism 5b of the above fifth embodiment are denoted by the same reference numerals but their description is not repeated.

Like that of the fifth embodiment, the baffle mechanism 5g according to the tenth embodiment comprises a plurality of baffle plates 51, a guide means 52 comprising three guide shafts 522 for guiding the plurality of baffle plates 51 so as to move in the radial direction, and a limiting means 53 constituted by a tension coiled spring 531 arranged between the neighboring baffle plates 51 and 51. This embodiment is substantially the same as the above fifth embodiment except that the outer peripheral ends of the guide shafts 522 are mounted at different positions. That is, small-diameter portions 522a formed at the outer peripheral ends of the guide shafts 522 of the tenth embodiment are fitted into fitting holes 523a formed in a guide shaft support member 523 mounted on a plurality of impellers 413 radially arranged in the pump shell 412 at positions slightly on the outer side of the central portion of the pump shell 412. In a state where the rotational speed of the pump 41 is low, the baffle plates 51 according to the tenth embodiment are positioned on the inner peripheral side of the fluid circulatory passage 400 as the stopper portions 513 formed on the central side surfaces of the baffle plates 51 come into contact with the stepped portions 413a formed in the lower portions of the impellers 413 as shown in the upper half portions of FIGS. 21 and 22. In a state where the rotational speed of the pump 41 is high, on the other hand, the baffle plates 51 move toward the outer peripheral side in the radial direction along the guide shafts 522 due to the centrifugal force as shown in the lower half portions of FIGS. 21 and 22, and are positioned at the central portion of the fluid circulatory passage 400. Therefore, the baffle mechanism 5g according to the tenth embodiment exhibits the same action and effect as those of the above ninth embodiment.

Next, the baffle mechanism 5h according to the eleventh embodiment will be described with reference to FIGS. 23 and 24. From the mechanical point of view, the baffle mechanism 5h according to the eleventh embodiment is substantially the same as the baffle mechanism 5c of the above sixth embodiment. Therefore, the same members as those members constituting the baffle mechanism 5c of the sixth embodiment are denoted by the same reference numerals but their description is not repeated.

The baffle mechanism 5h according to the eleventh embodiment comprises a plurality of (eight in the illustrated embodiment) baffle plates 51 which are arranged between the inner peripheral portion and the central portion in the radial direction of the fluid circulatory passage formed by the pump shell 412 and turbine shell 422 and are turnably supported, at the ends on one side thereof, by a support shaft 54 mounted on the turbine shell 422, and a limiting means 53 constituted by the tension coiled spring 531 arranged between the neighboring baffle plates 51 to limit the movement of the plurality of baffle plates 51 until the rotational speed of the turbine 42 reaches a predetermined value.

Figure 23:
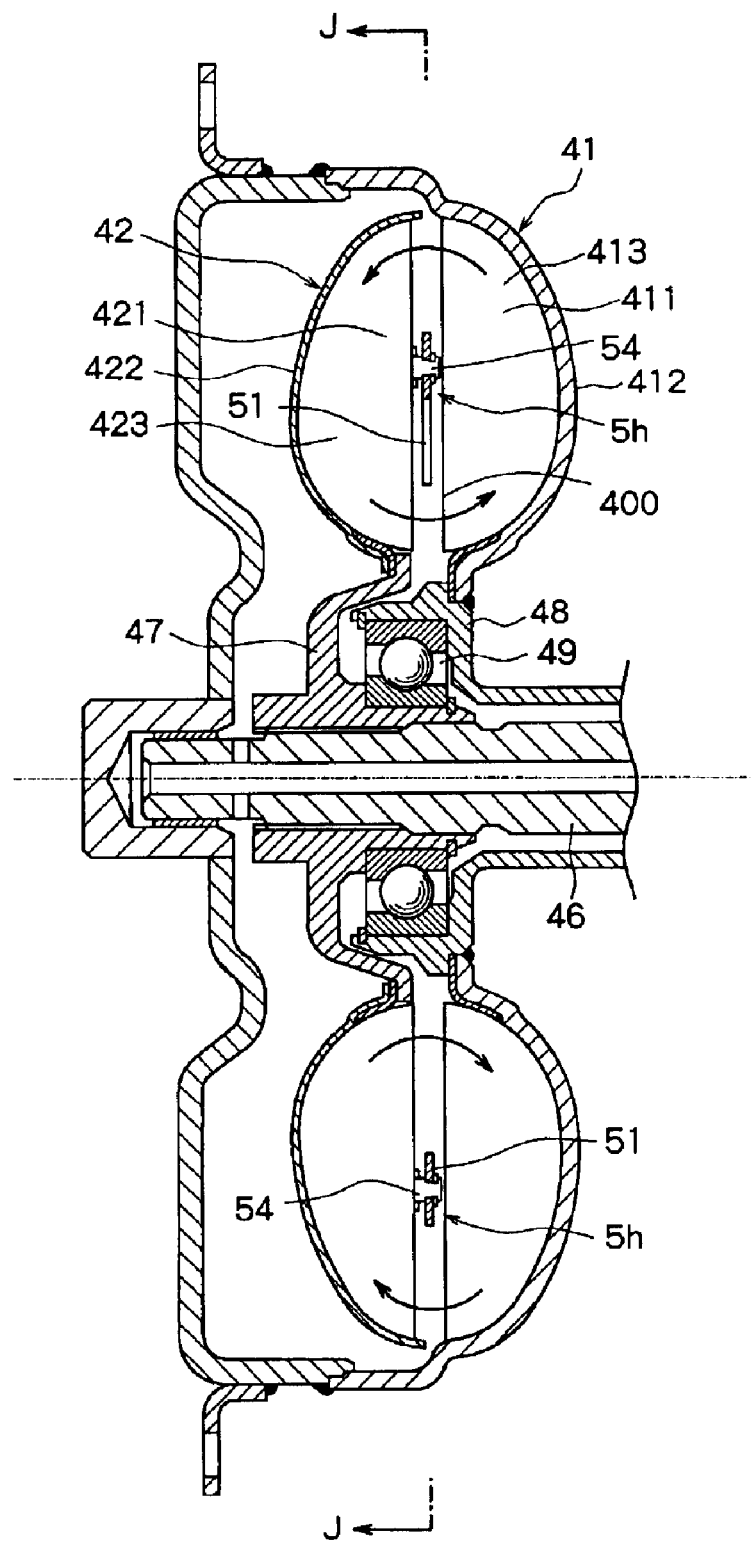
FIG. 23 is a sectional view illustrating the eleventh embodiment of the fluid coupling constituted according to the present invention.
Figure 24:
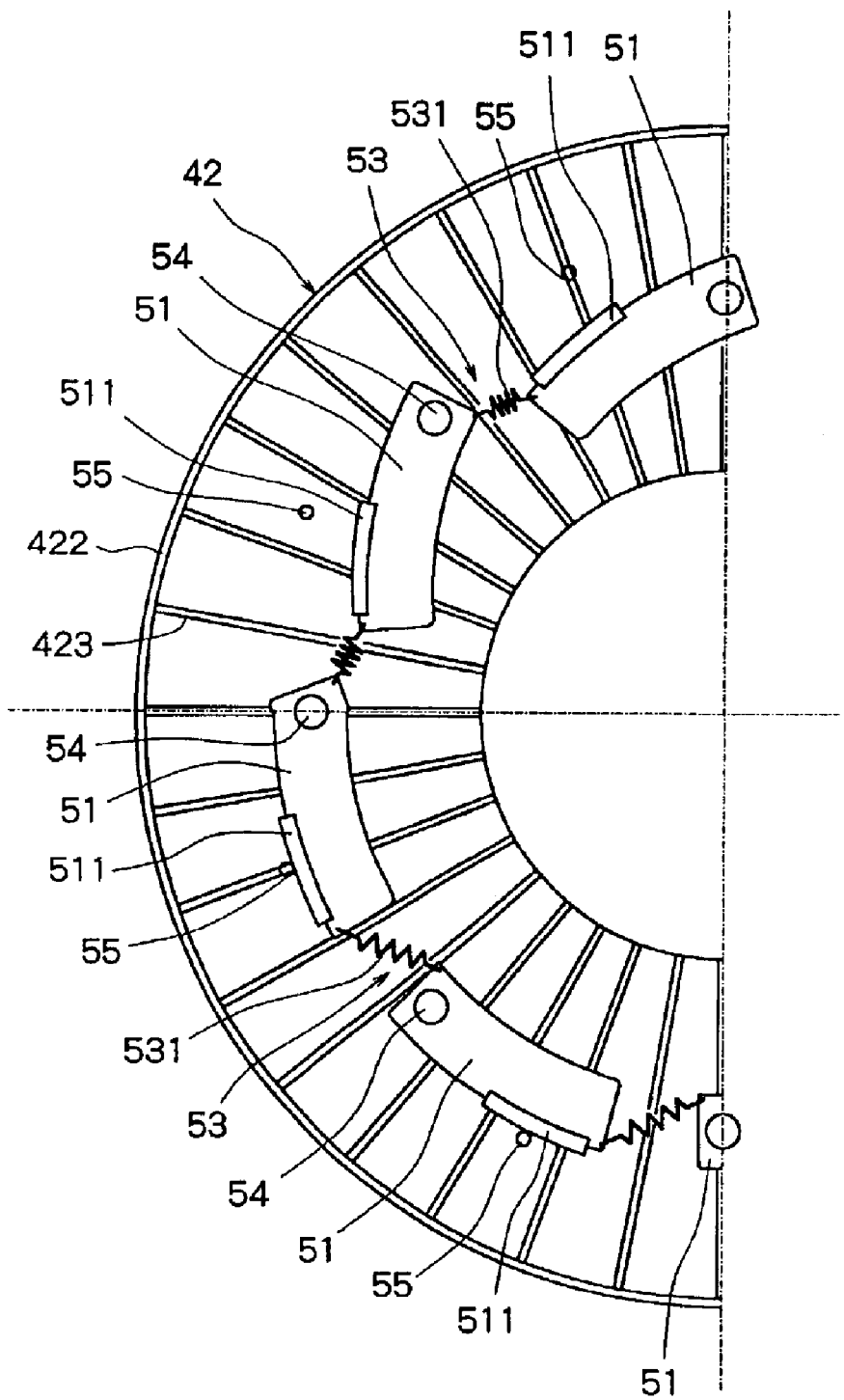
FIG. 24 is a sectional view along the line J—J in FIG. 23.

The baffle mechanism 5h according to the eleventh embodiment is constituted as described above, and the baffle plates 51 are positioned on the inner peripheral side of the fluid circulatory passage 400 due to the spring force of the tension coiled springs 531 as shown in the upper half portions of FIGS. 23 and 24 until the rotational speed of the turbine 42 reaches a predetermined value. When the rotational speed of the turbine 42 becomes higher than the predetermined value, on the other hand, the baffle plates 51 turn against the spring force of the tension coiled springs 531 on the support shafts 54 as centers due to the centrifugal force, and are positioned at the central portion of the fluid circulatory passage 400 as shown in the lower half portions of FIGS. 23 and 24. At this moment, the baffle plates 51 come in contact with the stopper pins 55 mounted on the turbine shell 422. Therefore, the baffle mechanism 5h of the eleventh embodiment exhibits the same action and effect as those of the above-mentioned ninth and tenth embodiments.

Next, the baffle mechanism 5j according to the twelfth embodiment will be described with reference to FIGS. 25 and 26. The baffle mechanism 5j according to the twelfth embodiment is different from the baffle mechanism 5h of the eleventh embodiment in regard to the baffle plates 51 being mounted on the pump shell 412. From the mechanical point of view, however, they are substantially the same. Therefore, the same members as those members constituting the baffle mechanism 5h of the eleventh embodiment are denoted by the same reference numerals but their description is not repeated.

Namely, the baffle mechanism 5j according to the twelfth embodiment comprises a plurality of (eight in the illustrated embodiment) baffle plates 51 which are arranged between the inner peripheral portion and the central portion in the radial direction of the fluid circulatory passage formed by the pump shell 412 and turbine shell 422 and are turnably supported, at the ends on one side thereof, by a support shaft 54 mounted on the pump shell 412, and a limiting means 53 constituted by the tension coiled spring 531 arranged between the neighboring baffle plates 51 to limit the movement of the plurality of baffle plates 51 until the rotational speed of the pump 41 reaches a predetermined value.

Figure 25:
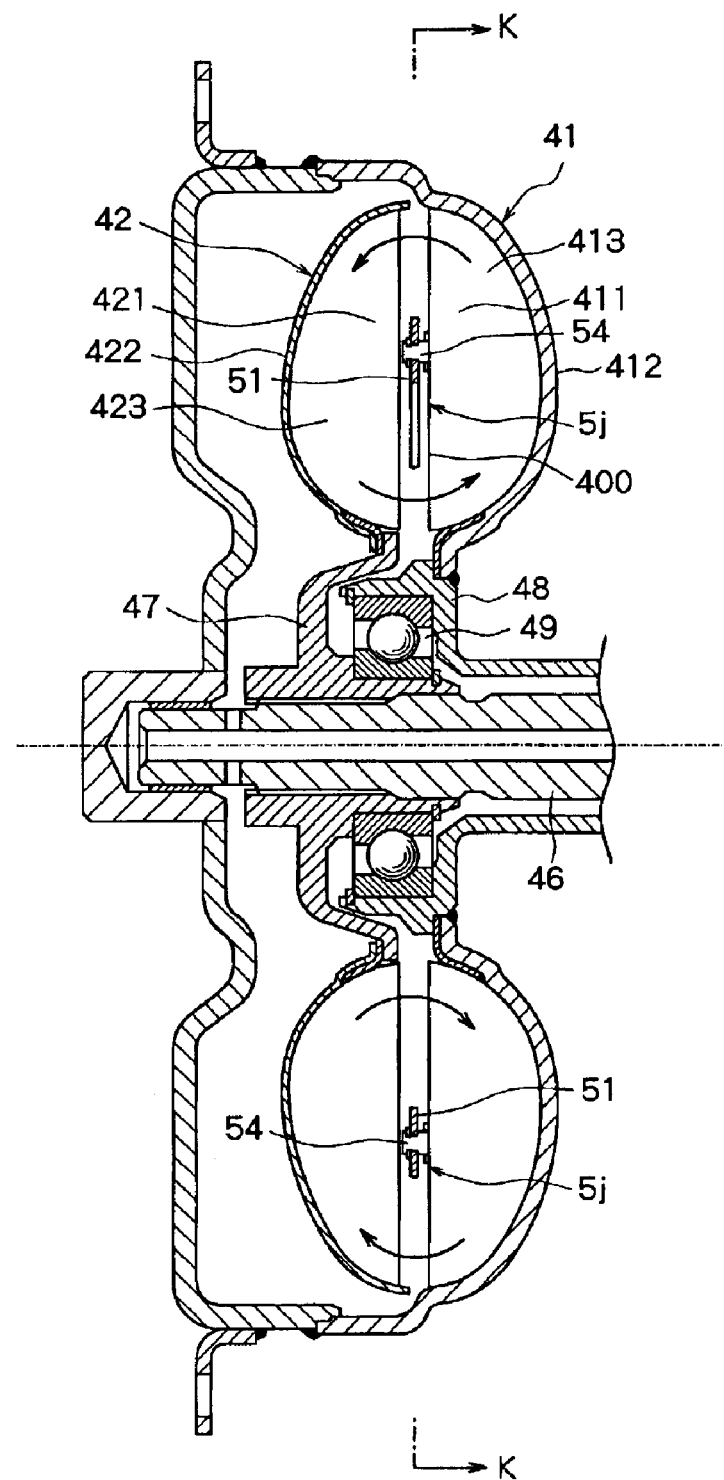
FIG. 25 is a sectional view illustrating the twelfth embodiment of the fluid coupling constituted according to the present invention.
Figure 26:
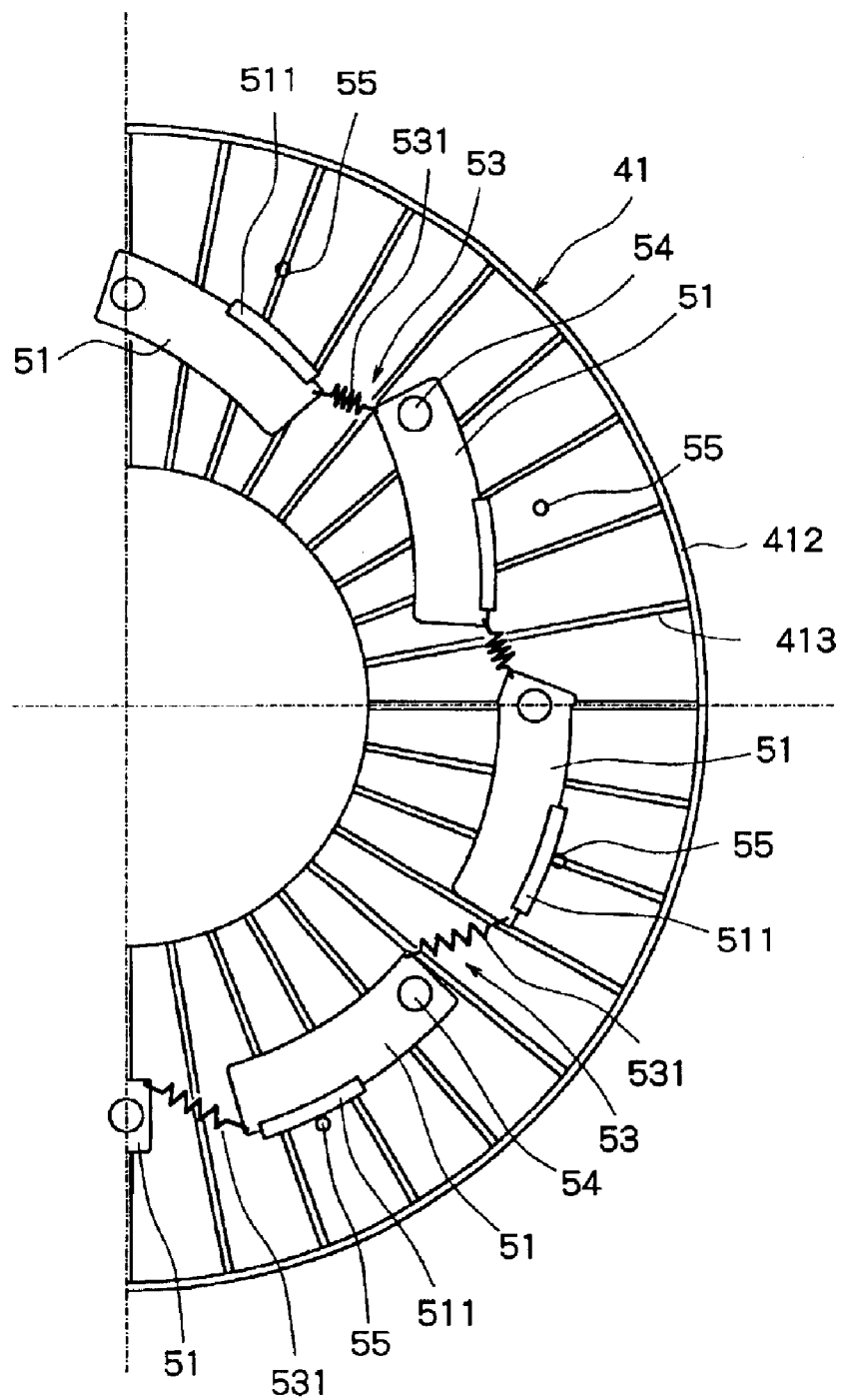
FIG. 26 is a sectional view along the line K—K in FIG. 25.

The baffle mechanism 5j according to the twelfth embodiment is constituted as described above, and the baffle plates 51 are positioned on the inner peripheral side of the fluid circulatory passage 400 due to the spring forces of the tension coiled springs 531 as shown in the upper half portions of FIGS. 25 and 26 until the rotational speed of the pump 41 reaches a predetermined value. When the rotational speed of the pump 41 becomes higher than the predetermined value, on the other hand, the baffle plates 51 turn against the spring forces of the tension coiled springs 531 on the support shafts 54 as centers due to the centrifugal force, and are positioned at the central portion of the fluid circulatory passage 400 as shown in the lower half portions of FIGS. 25 and 26. At this moment, the baffle plates 51 come in contact with the stopper pins 55 mounted on the pump shell 412. Therefore, the baffle mechanism 5j of the twelfth embodiment exhibits the same action and effect as those of the above-mentioned tenth and eleventh embodiments.

Next, the baffle mechanism 5k according to the thirteenth embodiment will be described with reference to FIGS. 27 and 28. The baffle mechanism 5k according to the thirteenth embodiment is the one in which the same mechanism as the baffle mechanism 5f of the ninth embodiment is applied to the outer peripheral side of the fluid coupling that is constituted by the pump 41 and turbine 42 without having core rings. In the baffle mechanism 5k of the thirteenth embodiment, therefore, the same members as those members constituting the baffle mechanism 5f of the ninth embodiment are denoted by the same reference numerals but their description is not repeated.

The baffle mechanism 5k according to the thirteenth embodiment has a feature in that the baffle plates 51 are movably arranged along the outer circumference in the radial direction of the fluid circulation passage formed by the pump shell 412 and turbine shell 422 so as to move in the radial direction, that the baffle plates 51 are so constituted as to position along the outer periphery of the fluid circulatory passage 400 in a state where the rotational speed of the turbine 42 is low and as to retract from the fluid circulatory passage 400 in a state where the rotational speed is high. That is, the guide means 52 comprising a guide member 525 having two guide portions 524, 524 is arranged to protrude beyond the outer peripheral edge between the pump shell 412 and the turbine shell 422, and is mounted on a plurality of runners 423 radially arranged in the turbine shell 422.

Figure 27:
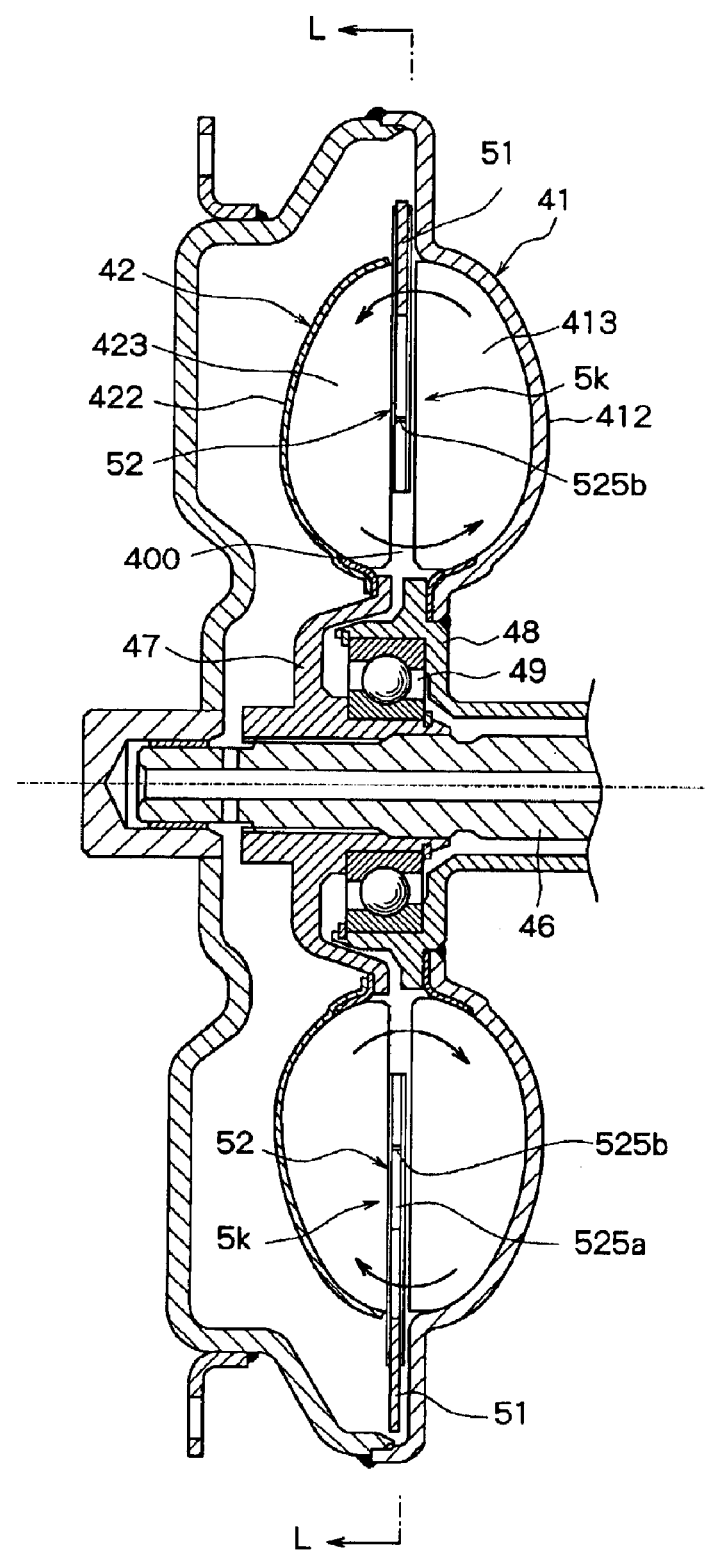
FIG. 27 is a sectional view illustrating the thirteenth embodiment of the fluid coupling constituted according to the present invention.
Figure 28:
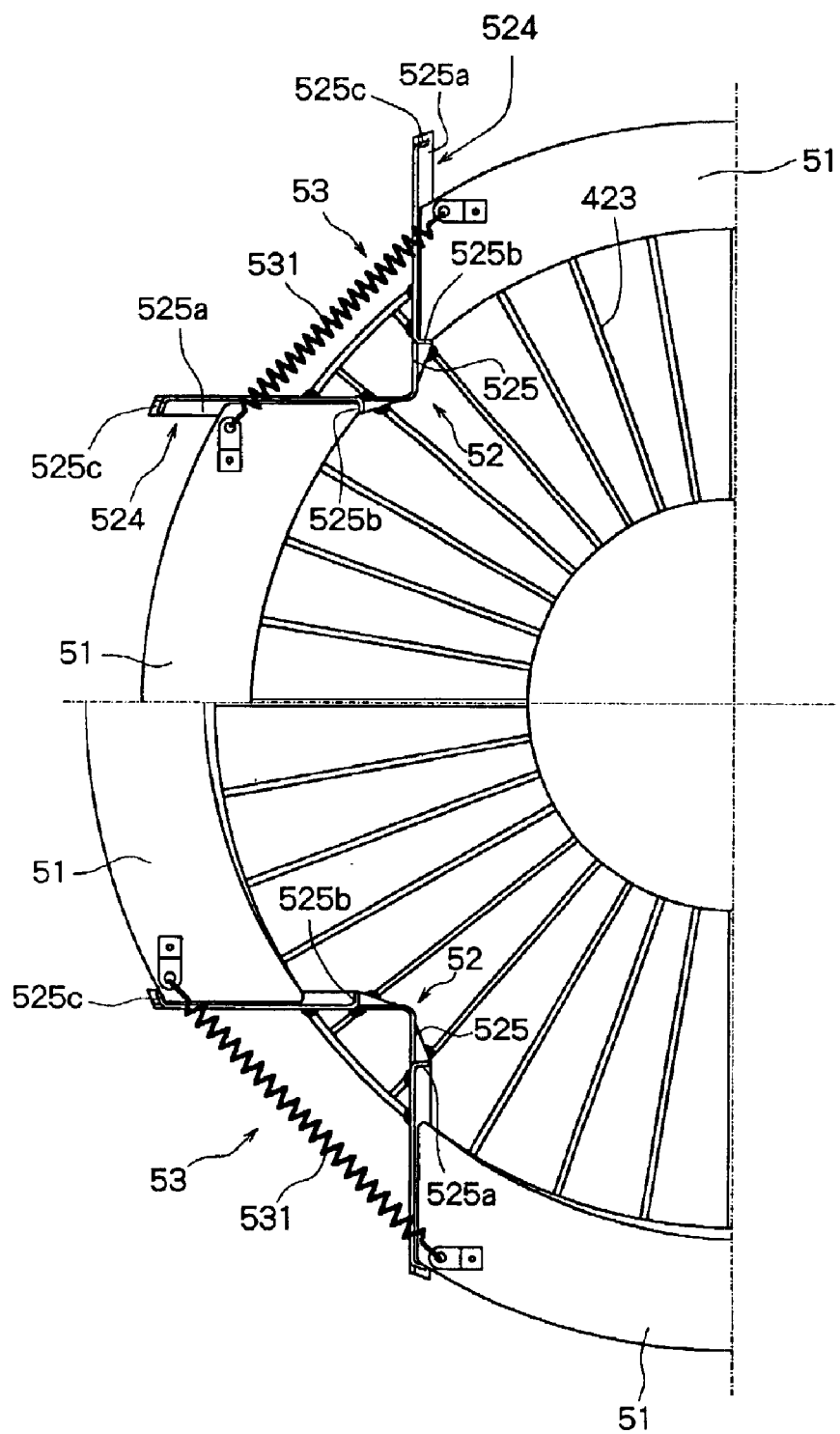
FIG. 28 is a sectional view along the line L—L in FIG. 27.

Accordingly, the baffle plates 51 are movably supported by the guide means 52 at the outer peripheral portions in the radial direction so as to move in the radial direction, and are positioned to come in contact with the stopper portions 525b on the inner peripheral side due to the spring forces of the tension coiled springs 531 as shown in the upper half portions of FIGS. 27 and 28 until the rotational speed of the turbine 42 reaches a predetermined value (e.g., 500 rpm which is an idling speed of a diesel engine). As a result, the baffle plates 51 are positioned to protrude toward the outer periphery of the fluid circulatory passage 400 in the radial direction. While the engine is in idling operation, the operation fluid to which the rotational force is imparted by the rotation of pump 41 is caused to circulate through the turbine 42 as indicated by an arrow in FIG. 30. However, since the baffle plates 51 are positioned protruding toward the outer periphery of the fluid circulatory passage 400 in the radial direction, the operation fluid comes into collision with the baffle plates 51 thereby causing a decrease in the velocity of flow and a decrease in the transmission of torque. It is, therefore, made possible to decrease the drag torque during the idling operation of the engine which is in a state where the speed ratio (e) of the pump and the turbine is zero (0), i.e., the pump rotates but the turbine is at rest. In particular, the effect for decreasing the drag torque is great since the operation fluid circulating through the fluid circulatory passage 400 has a large velocity of flow on the outer peripheral side. As the rotational speed of the turbine 42 becomes greater than the predetermined value, on the other hand, an increased centrifugal force acts on the baffle plate 51. As shown in the lower half portions of FIGS. 27 and 28, therefore, the baffle plates 51 move outward in the radial direction against the spring forces of the tension coiled springs 531, and, hence, retract from the fluid circulatory passage 400 and come in contact with the stopper portions 525c on the outer peripheral side. Therefore, the operation fluid is little affected by the baffle plates 51 and the transmission of torque does not decrease during the high-speed operation of the engine.

It is desired that the baffle mechanism 5k according to the thirteenth embodiment is fitted with the weight members like in the above-mentioned embodiments. In the embodiment shown in FIGS. 27 and 28, the guide means 52 is mounted on the turbine 42. However, the guide members 525 as the guide means 52 may be mounted on the pump 41. When the guide members 525 serving as the guide means 52 are mounted on the pump 41 to guide movement of the baffle plates 51 in the radial direction, the baffle plates 51 are positioned on the side of the outer periphery of the fluid circulatory passage 400 in a state where the rotational speed of the pump 41 is low and are retracted from the fluid circulatory passage 400 in a state where the rotational speed of the pump 41 is high. By mounting the guide members 525 serving as guide means 52 on the pump 41 side, therefore, there are obtained the same action and effect as those of the above-mentioned third and fourth embodiments.

Next, the baffle mechanism 5m according to the fourteenth embodiment will be described with reference to FIGS. 29 and 30. The baffle mechanism 5m according to the fourteenth embodiment is different from the baffle mechanism 5j of the twelfth embodiment in regard to the baffle plates 51 being mounted on the outer periphery of the pump shell 412. From the mechanical point of view, however, they are substantially the same. Therefore, the same members as those members constituting the baffle mechanism 5j of the twelfth embodiment are denoted by the same reference numerals but their description is not repeated.

Namely, the baffle mechanism 5m according to the fourteenth embodiment comprises a plurality of (eight in the illustrated embodiment) baffle plates 51 which are arranged along the outer periphery in the radial direction of the fluid circulatory passage formed by the pump shell 412 and the turbine shell 422 and are turnably supported at the ends on one side thereof by a support shaft 54 mounted on the pump shell 412, and a limiting means 53 constituted by the tension coiled springs 531 arranged between the neighboring baffle plates 51 to limit the movement of the plurality of baffle plates 51 until the rotational speed of the pump 41 reaches a predetermined value.

Figure 29:
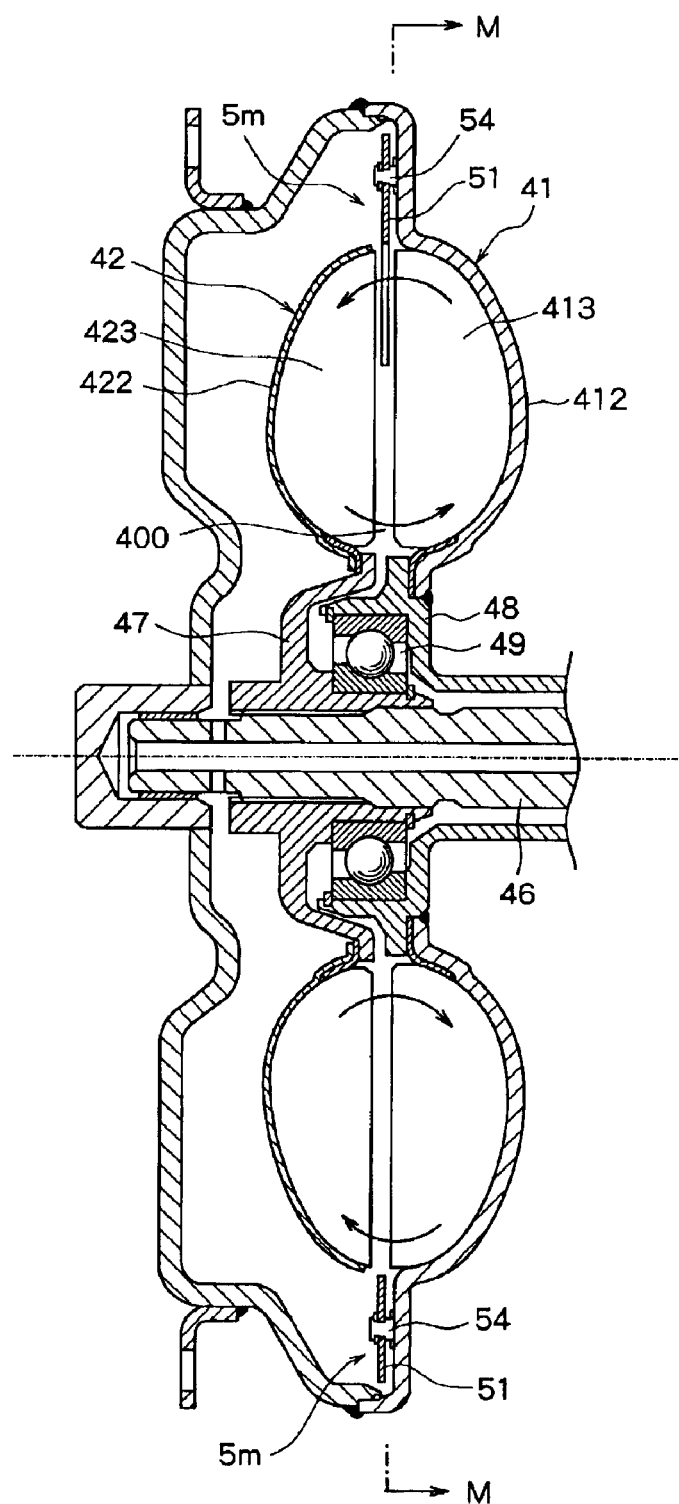
FIG. 29 is a sectional view illustrating the fourteenth embodiment of the fluid coupling constituted according to the present invention.
Figure 30:
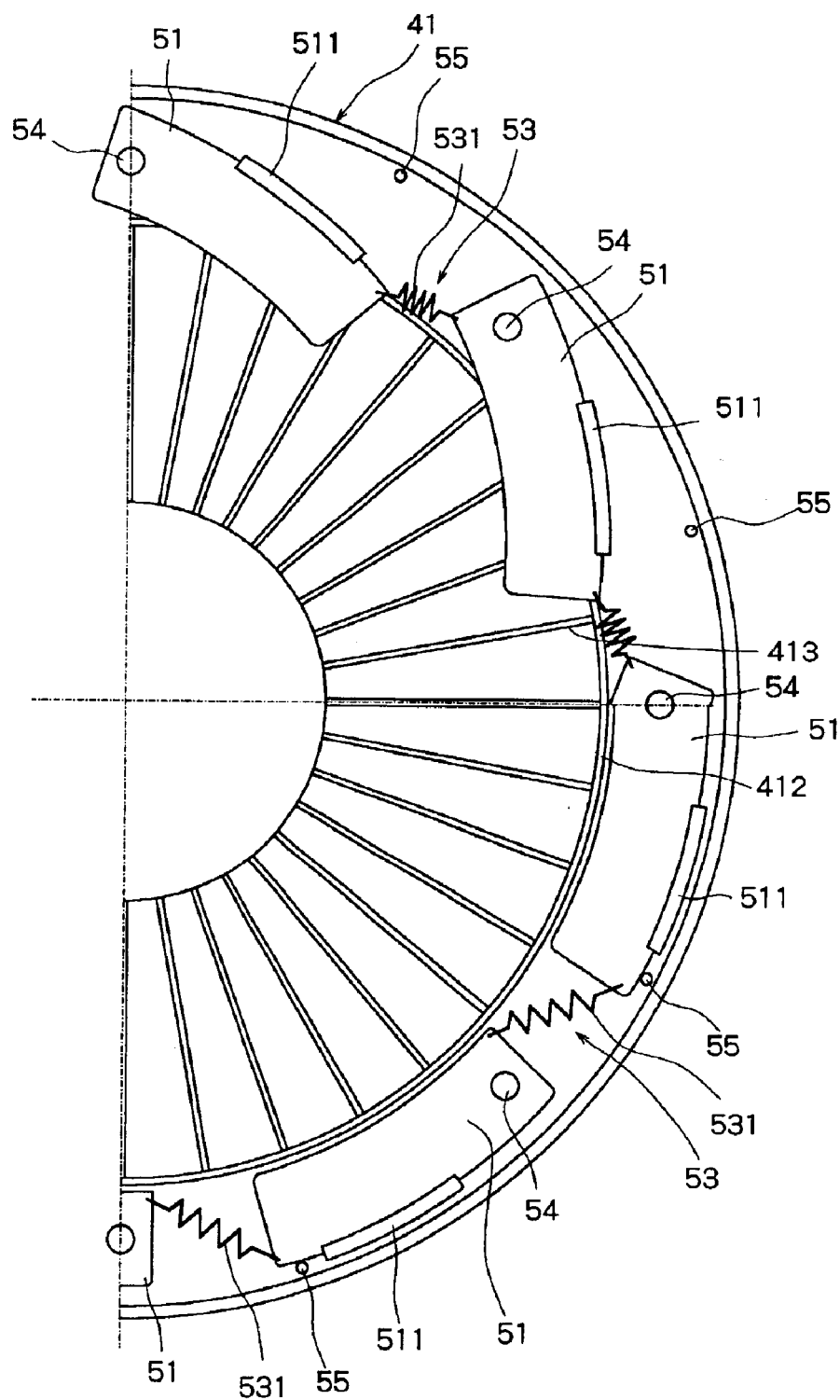
FIG. 30 is a sectional view along the line M—M in FIG. 29.

The baffle mechanism 5m according to the fourteenth embodiment is constituted as described above, and the baffle plates 51 are positioned on the outer peripheral side of the fluid circulatory passage 400 due to the spring forces of the tension coiled springs 531 as shown in the upper half portions of FIGS. 29 and 30 until the rotational speed of the pump 41 reaches a predetermined value. When the rotational speed of the pump 41 becomes higher than the predetermined value, on the other hand, the baffle plates 51 turn against the spring forces of the tension coiled springs 531 on the support shafts 54 as centers due to the centrifugal force, and are retracted from the fluid circulatory passage 400 as shown in the lower half portions of FIGS. 32 and 33. Therefore, the baffle mechanism 5m of the fourteenth embodiment exhibits the same action and effect as those of the above-mentioned thirteenth embodiment.

Next, the baffle mechanism 5n according to the fifteenth embodiment will be described with reference to FIGS. 31 and 32. In the baffle mechanism 5n according to the fifteenth embodiment, the same members as those members constituting the baffle mechanisms of the above embodiments are denoted by the same reference numerals but their description is not repeated.

The baffle mechanism 5n according to the fifteenth embodiment comprises a plurality of (six in the illustrated embodiment) flap-like baffle plates 51 arranged along the inner periphery of the core ring 411 of the pump shell 412 in the fluid circulatory passage 400 formed by the pump shell 412 and the turbine shell 422. The plurality of baffle plates 51 are turnably supported at the edges, on one side thereof, by the inner periphery of the core ring 411 of the pump shell 412. Specifically, baffle plate support members 56 are mounted by welding onto the inner periphery of the core ring 411 of the pump shell 412, and coupling portions 512, 512 are provided on one side edge of the baffle plate 51 at positions corresponding to both sides of the baffle plate support members 56. Support pins 57 are arranged by inserting through the coupling portions 512, 512 and the baffle plate support members 56, so that the baffle plates 51 are turnably supported by the core ring 411 of the pump shell 412. The baffle plates 51 are made of, for example, an aluminum alloy, and have weight members 511 of a metal having a large specific gravity, such as copper, lead or the like by brazing, which are joined at edges on the other side thereof.

The baffle mechanism 5n according to the fifteenth embodiment is provided with a limiting means 53 which works, in response to the centrifugal force acting on the plurality of baffle plates 51, to bring the edges on the other side of the plurality of baffle plates 51 to the central portion of the fluid circulatory passage 400 in a state where the rotational speed of the pump 41 is low and to bring the edges on the other side of the plurality of baffle plates 51 to the inner peripheral side of the core ring 421 of the turbine shell 422 in a state where the rotational speed of the pump 41 is high. In the illustrated embodiment, the limiting means 53 is constituted by spring members such as the tension coiled springs 531 or the like arranged between the inner periphery of the pump shell 412 and the weight members 511 mounted on the baffle plates 51. The setting load of the tension coiled springs 531 has been so set that the edges on the other side of the baffle plates 51 are positioned at the central portion of the fluid circulatory passage 411 as shown in the upper half portions of FIGS. 31 and 32 until the rotational speed of the pump 41 reaches a predetermined value. When the rotational speed of the pump 41 becomes greater than a predetermined value, an increased centrifugal force acts on the baffle plates 51 and on the weight members 511. As shown in the lower half portions of FIGS. 31 and 32, therefore, the edges of the baffle plates 51 so turn as to be positioned on the inner peripheral side of the core ring 421 of the turbine shell 422 on the support pins 57 as centers against the spring forces of the tension coiled springs 551.

Figure 31:
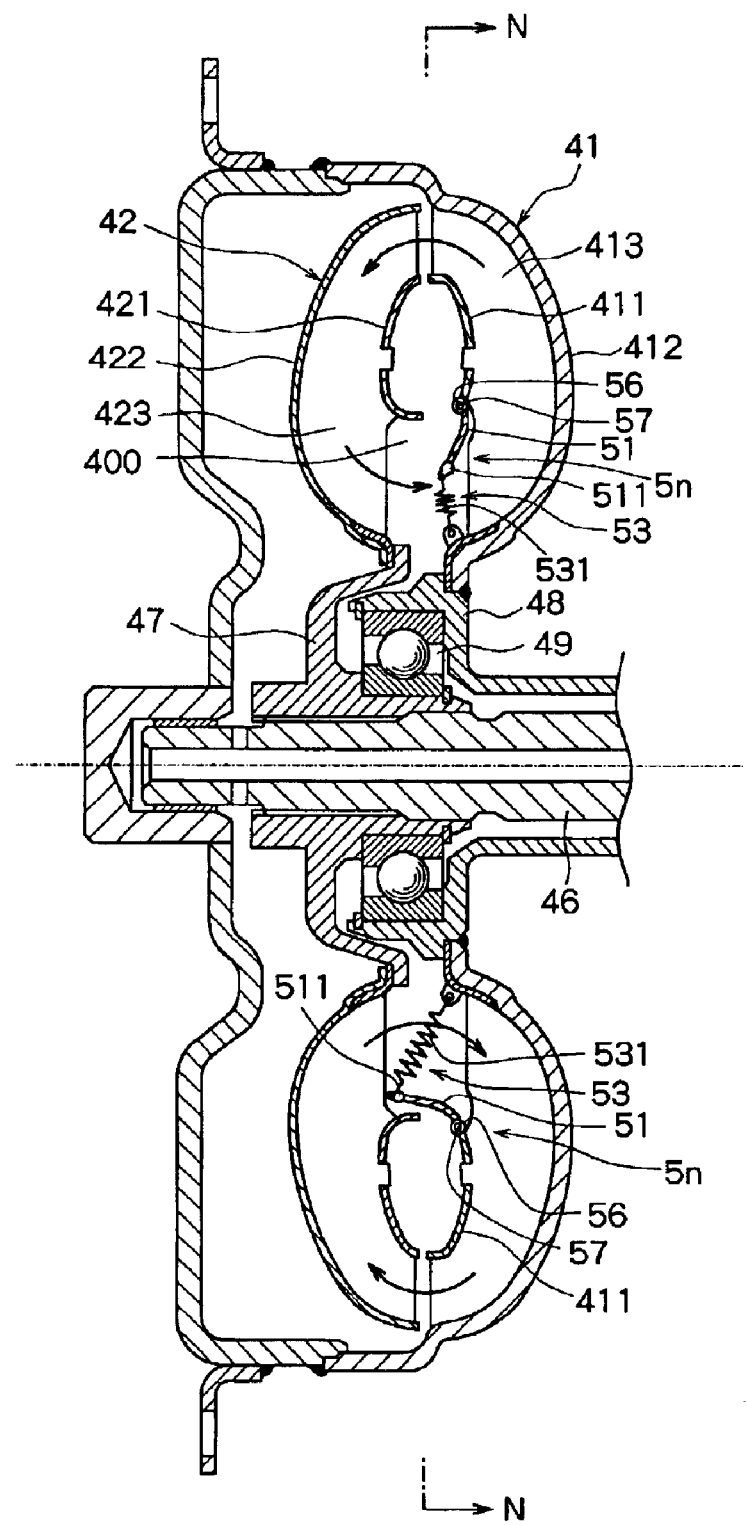
FIG. 31 is a sectional view illustrating the fifteenth embodiment of the fluid coupling constituted according to the present invention.
Figure 32:
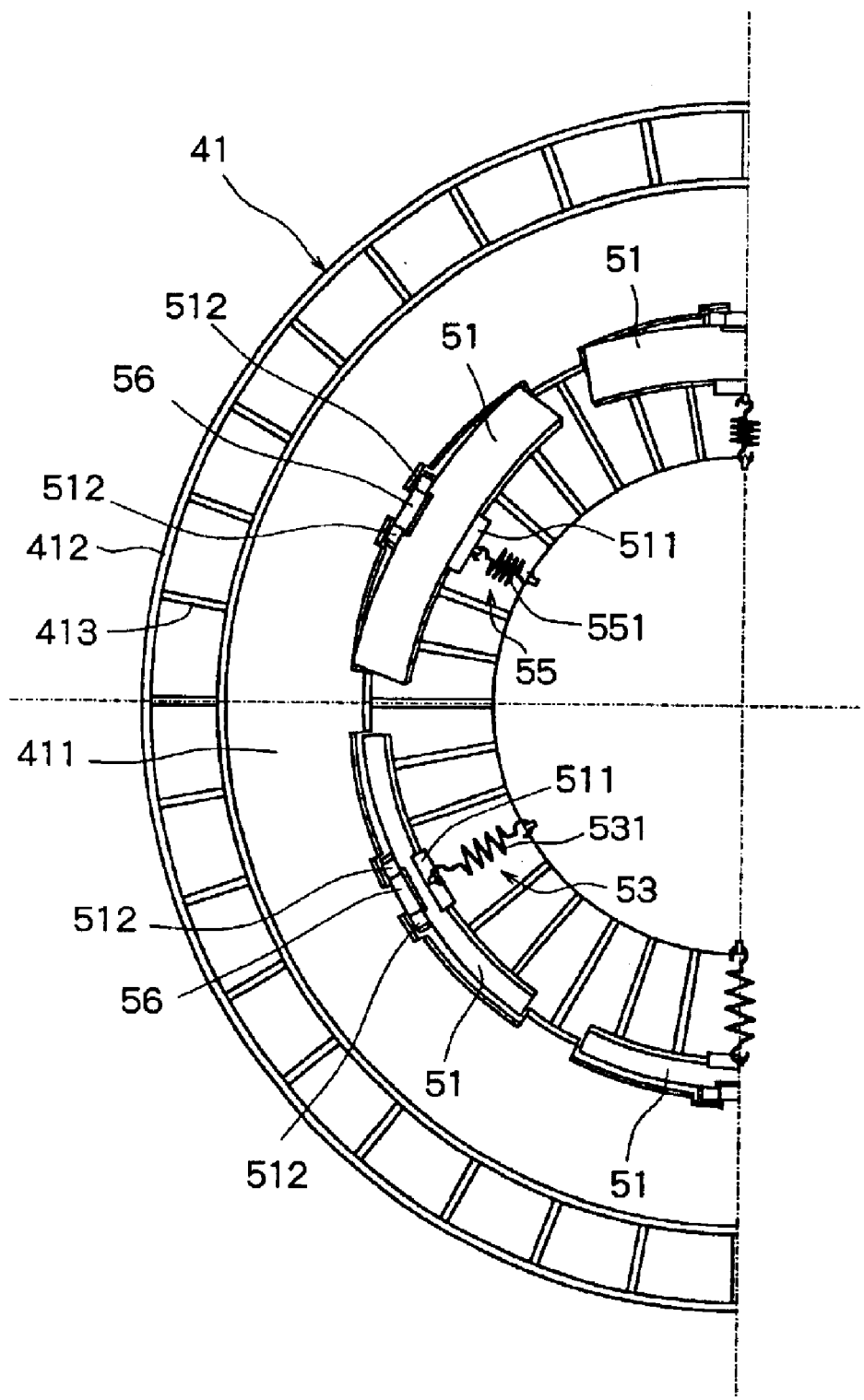
FIG. 32 is a sectional view along the line N—N in FIG. 31.

According to the baffle mechanism 5n of the fifteenth embodiment as described above, the edges on the other side of the baffle plates 51 are positioned at the central portion of the fluid circulatory passage 400 due to the spring forces of the tension coiled springs 531 as shown in the upper half portions of FIGS. 31 and 32 until the rotational speed of the pump 41 reaches a predetermined value (e.g., 500 rpm which is an idling speed of a diesel engine). While the engine is in idling operation, therefore, the operation fluid to which the rotational force is imparted by the rotation of pump 41 is caused to circulate through the turbine 42 as indicated by an arrow in FIG. 31. However, since the baffle plates 51 are positioned greatly protruding into the fluid circulatory passage 400, the operation fluid comes into collision with the baffle plates 51 thereby causing a decrease in the velocity of flow and a decrease in the transmission of torque. It is, therefore, made possible to decrease the drag torque during the idling operation of the engine that is in a state where the speed ratio (e) of the pump to the turbine is zero (0), i.e., the pump rotates but the turbine is at rest. As the rotational speed of the pump 41 becomes greater than the predetermined value, on the other hand, an increased centrifugal force acts on the baffle plates 51 and on the weight members 511. As shown in the lower half portions of FIGS. 31 and 32, therefore, the edges on the other side of the baffle plates 51 turn toward the turbine shell 422 side on the support pins 57 as centers against the spring forces of the tension coiled springs 531, and are positioned on the inner peripheral side of the core ring 421. As a result, the baffle plates 51 protrude little into the fluid circulatory passage 400, and the operation fluid that circulates flows into the pump 41 without almost receiving the action of the baffle plates 51. Therefore, the transmission efficiency does not decrease during the high-speed operation of the engine.

Next, the baffle mechanism 5p according to the sixteenth embodiment will be described with reference to FIGS. 33 and 34. The baffle mechanism 5p according to the sixteenth embodiment is the one in which the members constituting the baffle mechanism 5n of the fifteenth embodiment are arranged on the side of the turbine 42. In the baffle mechanism 5p according to the sixteenth embodiment, the same members as those members constituting the baffle mechanism 5n of the fifteenth embodiment are denoted by the same reference numerals but their description is not repeated.

The baffle mechanism 5p according to the sixteenth embodiment comprises a plurality of (six in the illustrated embodiment) flap-like baffle plates 51 which are arranged in the fluid circulatory passage 400 formed by the pump shell 412 and the turbine shell 422 and are turnably supported at the edges on one side thereof by the core ring 421 of the turbine shell 422, and a limiting means 53 which works, in response to the centrifugal force acting on the plurality of baffle plates 51, to bring the edges on the other side of the baffle plates 51 to the central portion of the fluid circulatory passage 400 in a state where the rotational speed of the turbine 42 is low and to bring the edges on the other side of the plurality of baffle plates 51 to the inner peripheral side of the core ring 411 of the pump shell 412 in a state where the rotational speed of the turbine 42 is high. In the baffle mechanism 5p according to the sixteenth embodiment, the baffle plate support members 56 are attached by welding to the inner peripheral portion of the core ring 421 of the turbine shell 422, and coupling portions 512, 512 are provided on the edges on one side of the baffle plates 51 at positions corresponding to both sides of the baffle plate support members 56. Support pins 57 are arranged passing through the coupling portions 512, 512 and the baffle plate support members 56, so that the baffle plates 51 are turnably supported by the core ring 411 of the pump shell 412. In the baffle mechanism 5p of the sixteenth embodiment, further, the tension coiled springs 531 constituting the limiting means 53 are arranged between the weight members 511 fitted onto the baffle plates 51 and the inner peripheral portion of the turbine shell 422.

Figure 33:
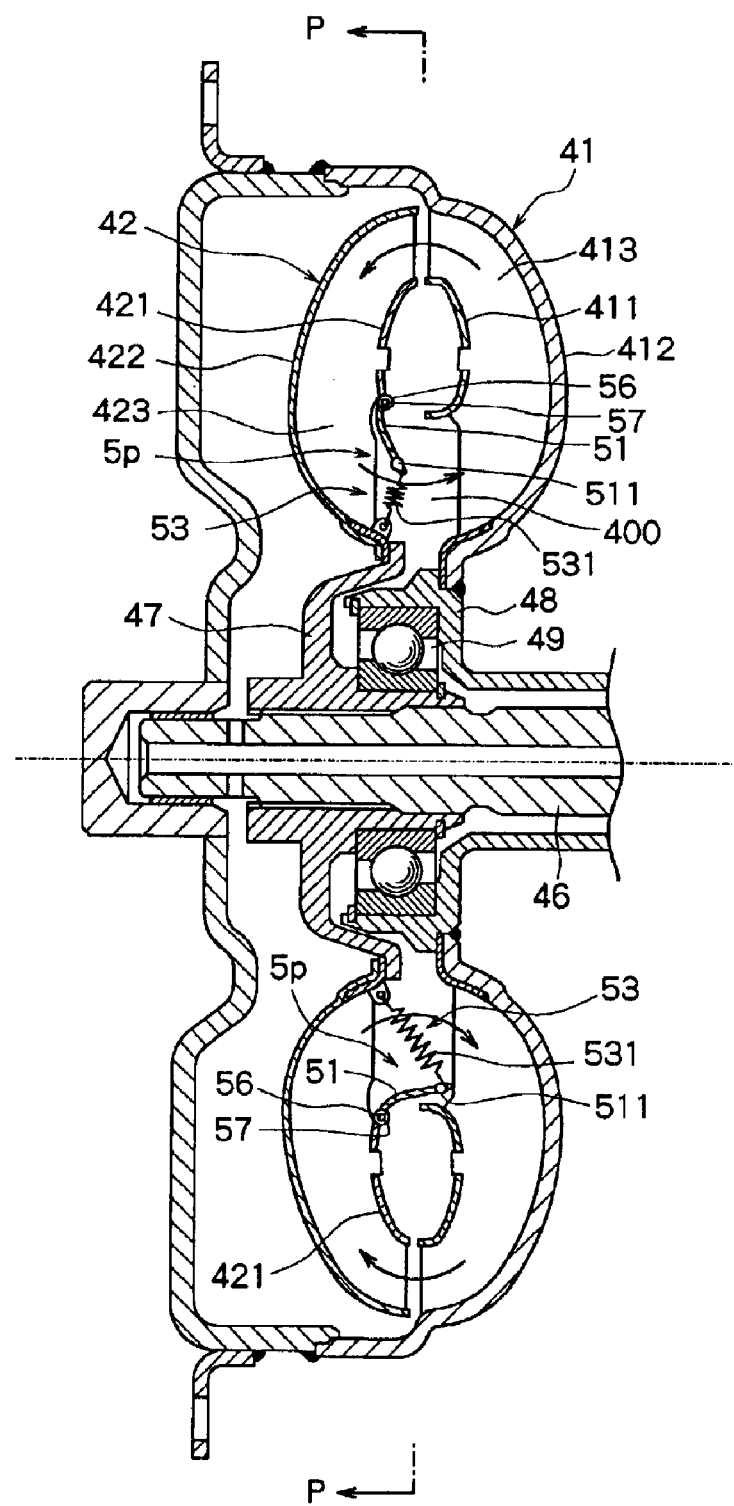
FIG. 33 is a sectional view illustrating the sixteenth embodiment of the fluid coupling constituted according to the present invention.
Figure 34:
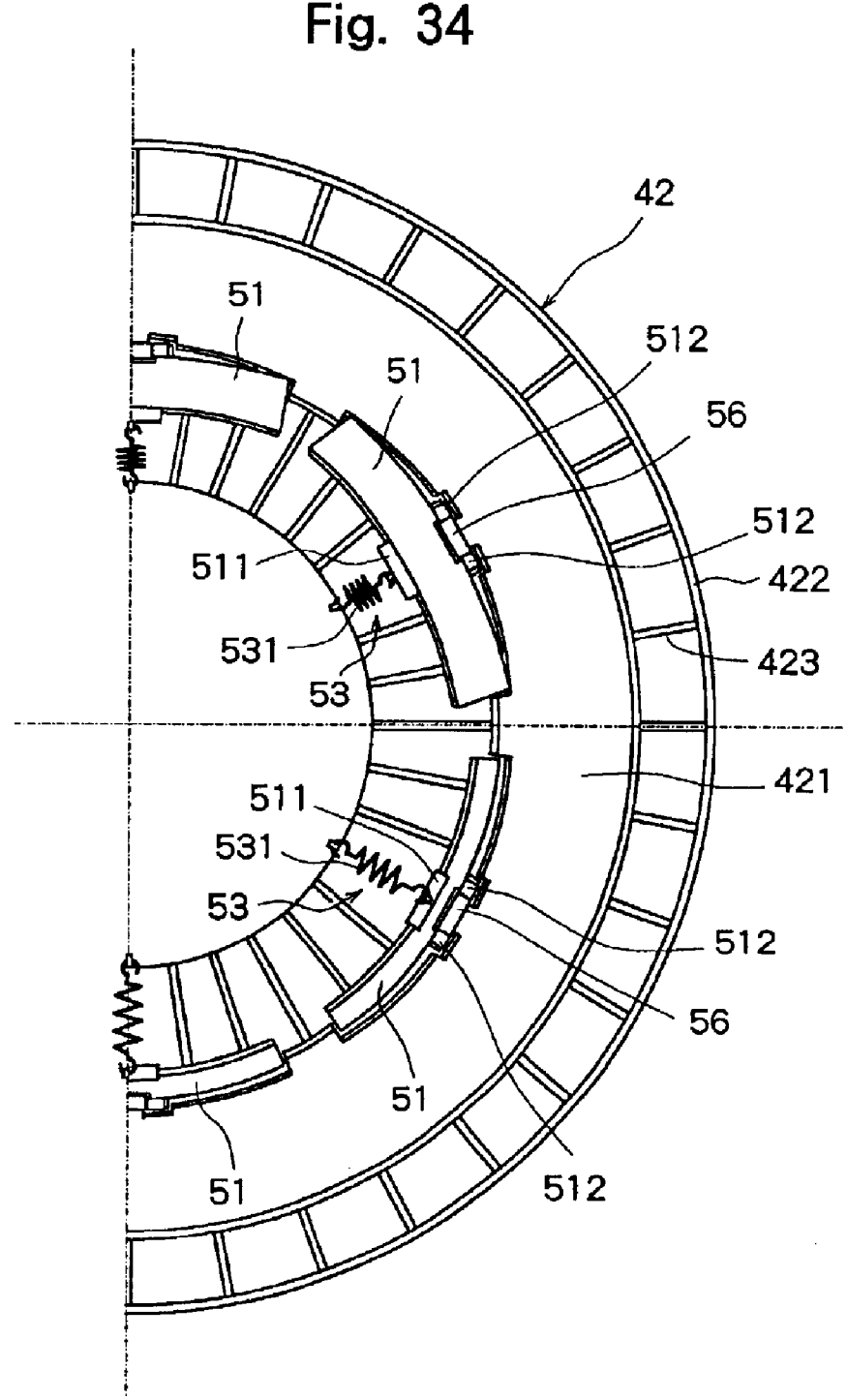
FIG. 34 is a sectional view along the line P—P in FIG. 33.

The baffle mechanism 5p according to the sixteenth embodiment is constituted as described above, and the edges on the other side of the baffle plates 51 are brought to the central portion of the fluid circulatory passage 400 due to the spring forces of the tension coiled springs 531 as shown in the upper half portions of FIGS. 33 and 34 until the rotational speed of the turbine 42 reaches a predetermined value (e.g., 500 rpm which is an idling rotational speed of a diesel engine). It is therefore allowed to decrease the drag torque during the idling operation of the engine in a state where the speed ratio (e) of the pump to the turbine is zero (0), i.e., in a state where the pump rotates but the turbine is at rest. As the rotational speed of the turbine 42 becomes greater than the predetermined value, on the other hand, an increased centrifugal force acts on the baffle plates 51 and on the weight members 511. As shown in the lower half portions of FIGS. 33 and 34, therefore, the edges on the other side of the baffle plates 51 turn toward the pump shell 412 side on the support pins 57 as centers against the spring forces of the tension coiled springs 531, and are positioned on the inner peripheral side of the core ring 411. As a result, the baffle plates 51 protrude little into the fluid circulatory passage 400, and the operation fluid that circulates flows into the pump 41 without almost receiving the action of the baffle plates 51. Therefore, the transmission efficiency does not decrease during the high-speed operation of the engine.

Figure 35:
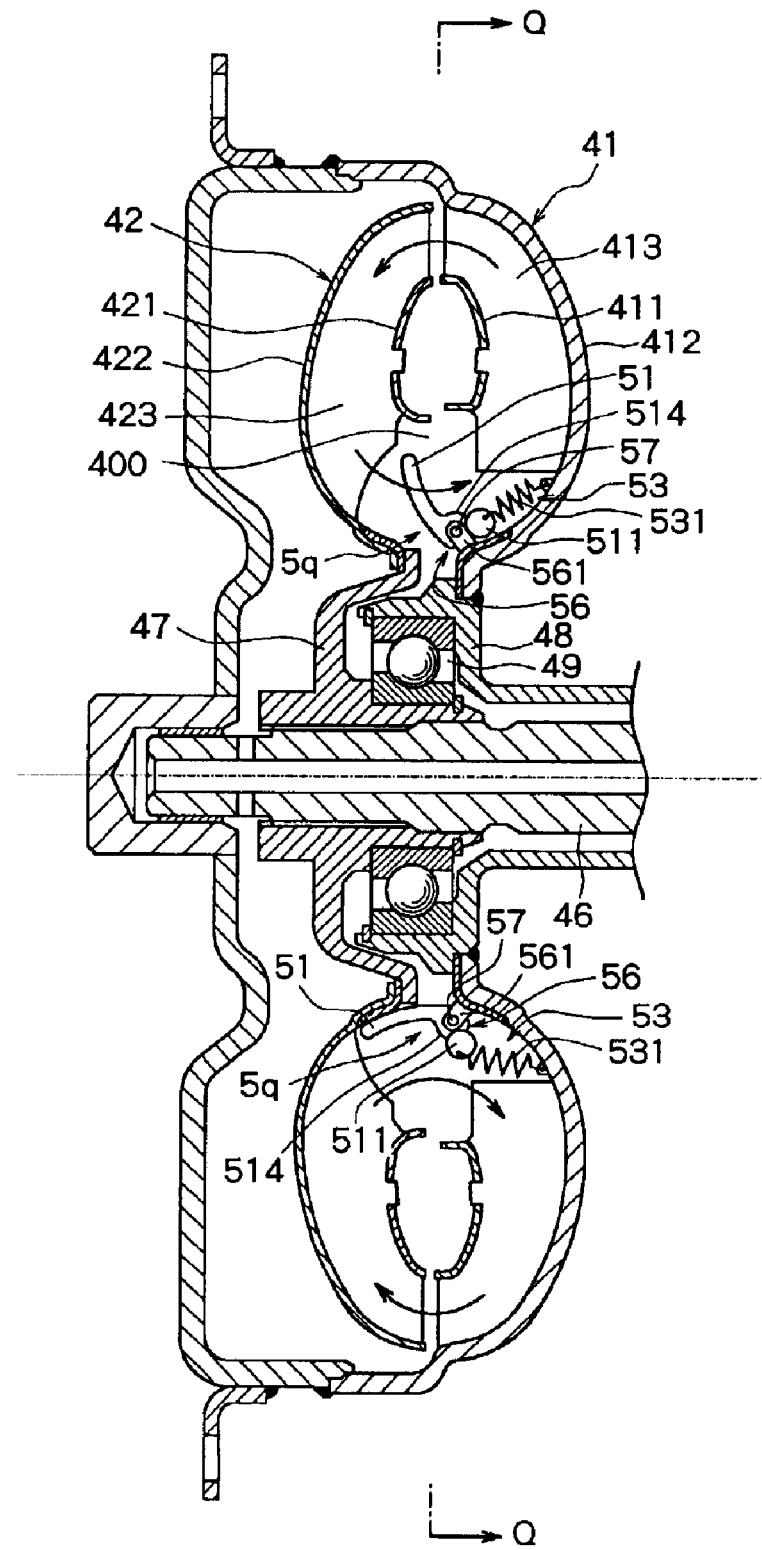
FIG. 35 is a sectional view illustrating the seventeenth embodiment of the fluid coupling constituted according to the present invention.
Figure 36:
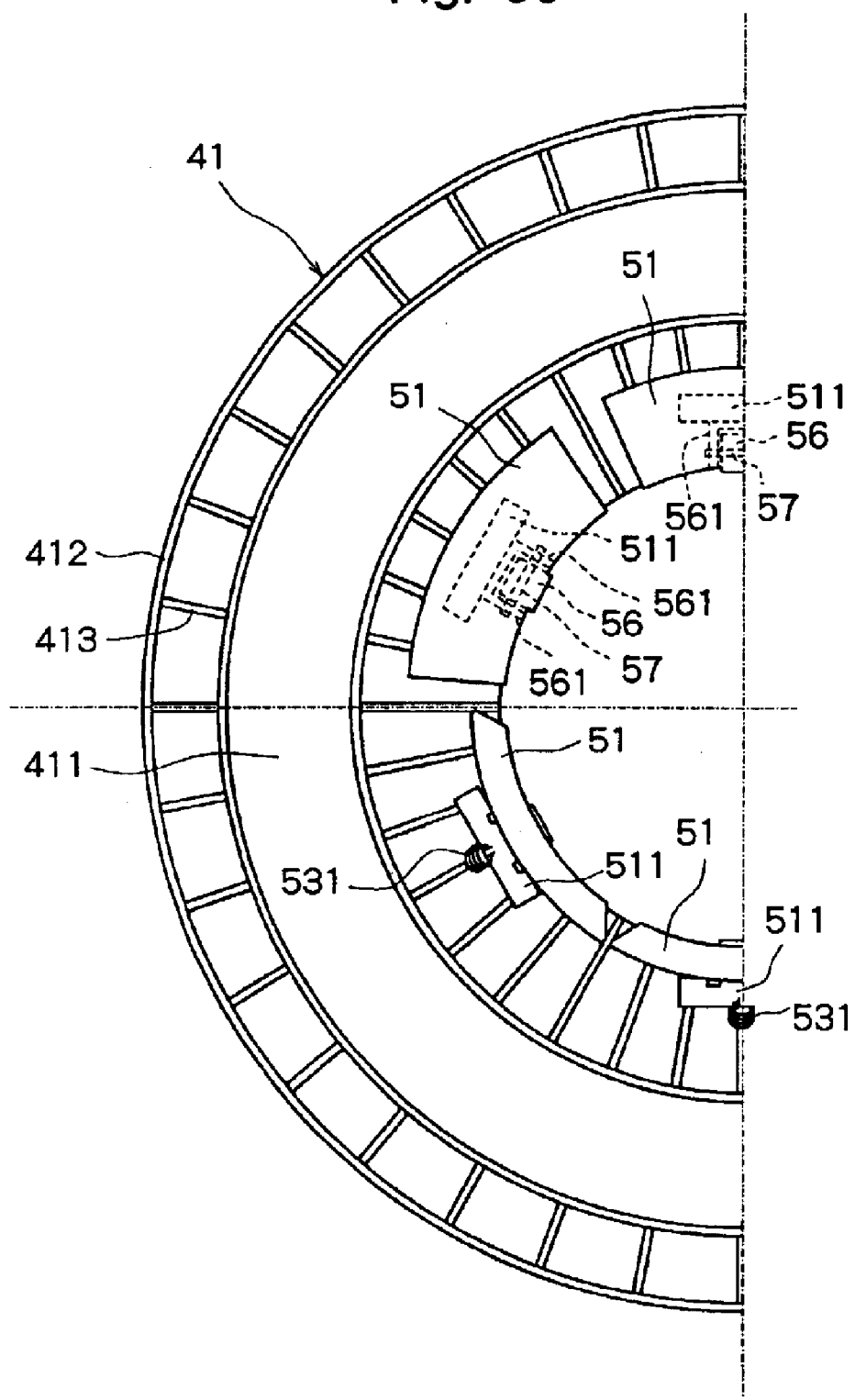
FIG. 36 is a sectional view along the line Q—Q in FIG. 36.

Next, the baffle mechanism 5q according to the seventeenth embodiment will be described with reference to FIGS. 35 and 36. The baffle mechanism 5q according to the seventeenth embodiment is the one in which the members constituting the baffle mechanism 5n of the fifteenth embodiment and the baffle mechanism 5p of the sixteenth embodiment are arranged in the pump shell 412. In the baffle mechanism 5q according to the seventeenth embodiment, therefore, the same members as those members constituting the baffle mechanisms 5n and 5p of the fifteenth embodiment and the sixteenth embodiment are denoted by the same reference numerals but their description is not repeated.

The baffle mechanism 5q according to the seventeenth embodiment comprises a plurality of (six in the illustrated embodiment) flap-like baffle plates 51 which are arranged in the fluid circulatory passage 400 formed by the pump shell 412 and the turbine shell 422 and are turnably supported, at the edges on one side thereof, by the inner peripheral surface of the pump shell 412. The plurality of baffle plates 51 are turnably supported, at the edges on one side thereof, by the inner periphery of the pump shell 412. Specifically, a baffle plate support member 56 having baffle plate support portions 561, 561 maintaining a predetermined distance is mounted by welding on the inner periphery of the pump shell 412, and a coupling portion 514 is provided on the edge on one side of the baffle plate 51. The coupling portion 514 is fitted into between the baffle plate support portions 561, 561 of the baffle plate support member 56, and a support pin 57 is inserted through the buffer plate support portions 561, 561 and the coupling portion 514, so that the baffle plate 51 is turnably supported on the inner periphery of the pump shell 412. The thus supported baffle plates 51 are formed of, for example, an aluminum alloy, and weight members 54 made of a metal having a large specific gravity, such as copper, lead or the like are joined by welding to the coupling portions 512. The weight members 54 are arranged on the side opposite to the baffle plates 51 with respect to the support pins 57.

The baffle mechanism 5q according to the seventeenth embodiment is equipped with a limiting means 53 which works, in response to the centrifugal force acting on the weight members 511 and on the plurality of baffle plates 51, to bring the edges on the other side of the plurality of baffle plates 51 to the central portion of the fluid circulatory passage 400 in a state where the rotational speed of the pump 41 is low and to bring the edges on the other side of the plurality of baffle plates 51 to the inner peripheral side of the turbine shell 422 in a state where the rotational speed of the pump 41 is high. The limiting means 53 in the illustrated embodiment comprises spring members such as tension coiled springs 531 or the like arranged between the weight members 54 fitted onto the baffle plates 51 and the pump shell 412. The setting load of the tension coiled springs 531 has been so set that the edges on the other side of the baffle plates 51 are brought to the central portion of the fluid circulatory passage 400 until the rotational speed of the pump 41 reaches a predetermined value as shown in the upper half portions of FIGS. 35 and 36.

The baffle mechanism 5q according to the seventeenth embodiment is constituted as described above, and the baffle plates 51 are positioned greatly protruding into the fluid circulatory passage 400 during the idling operation of the engine in a state where the rotational speed of the pump 41 is low. Therefore, the operation fluid comes into collision with the baffle plates 51 whereby the velocity of flow decreases and the transmission of torque decreases. As a result, it is allowed to decrease the drag torque during the idling operation of the engine in a state where the speed ratio (e) of the pump to the turbine is zero (0), i.e., in a state where the pump rotates but the turbine is at rest. As the rotational speed of the pump 41 becomes greater than the predetermined value, on the other hand, an increased centrifugal force acts on the weight members 511. As shown in the lower half portions of FIGS. 35 and 36, therefore, the edges on the other side of the baffle plates 51 turn toward the inner peripheral side of the turbine shell 422 on the support pins 57 as centers against the centrifugal force acting on themselves and spring forces of the tension coiled springs 531. As a result, the baffle plates 51 protrude little into the fluid circulatory passage 400, and the operation fluid that circulates flows into the pump 41 without almost receiving the action of the baffle plates 51. Therefore, the transmission efficiency does not decrease during the high-speed operation of the engine. The baffle mechanism 5q according to the seventeenth embodiment 17 can be applied to the fluid coupling constituted by the pump and turbine without having core rings.

Figure 37:
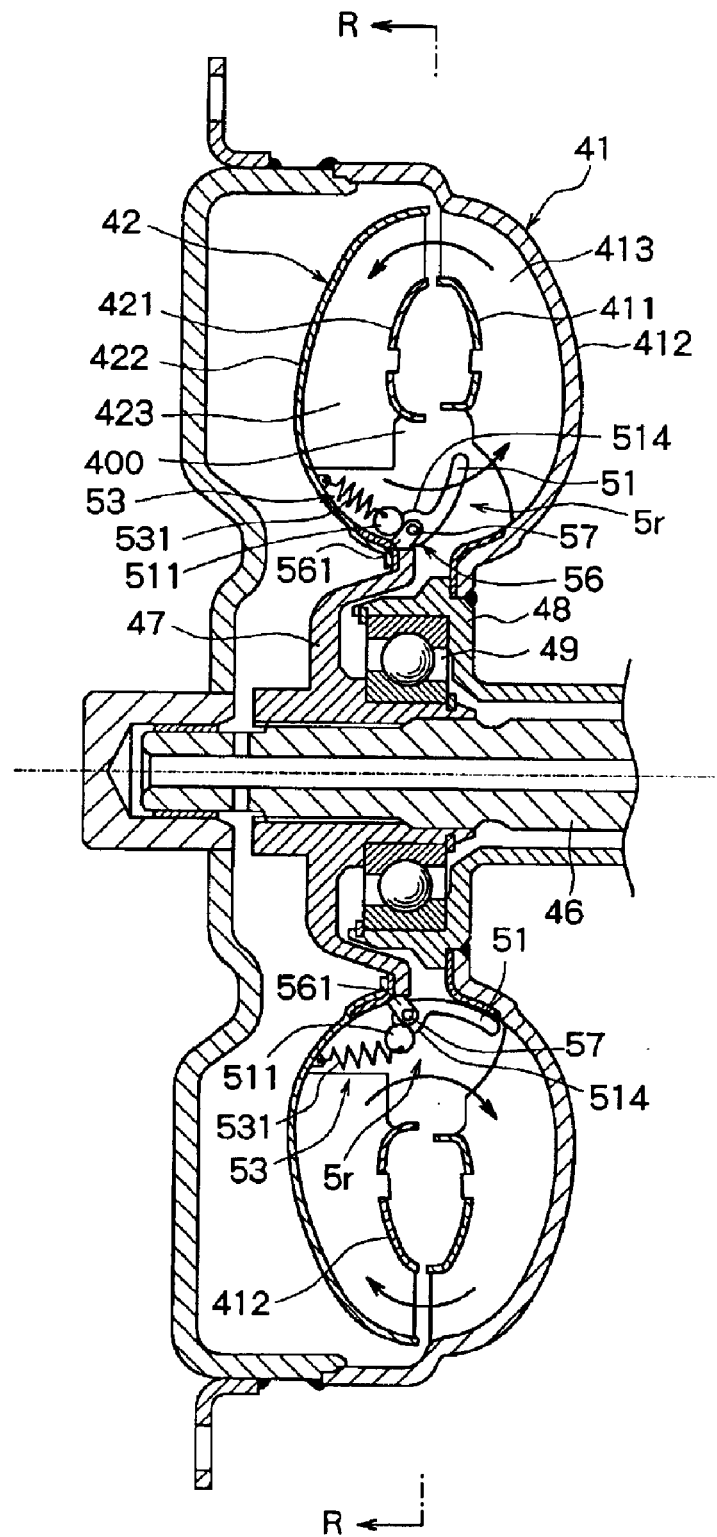
FIG. 37 is a sectional view illustrating the eighteenth embodiment of the fluid coupling constituted according to the present invention.
Figure 38:
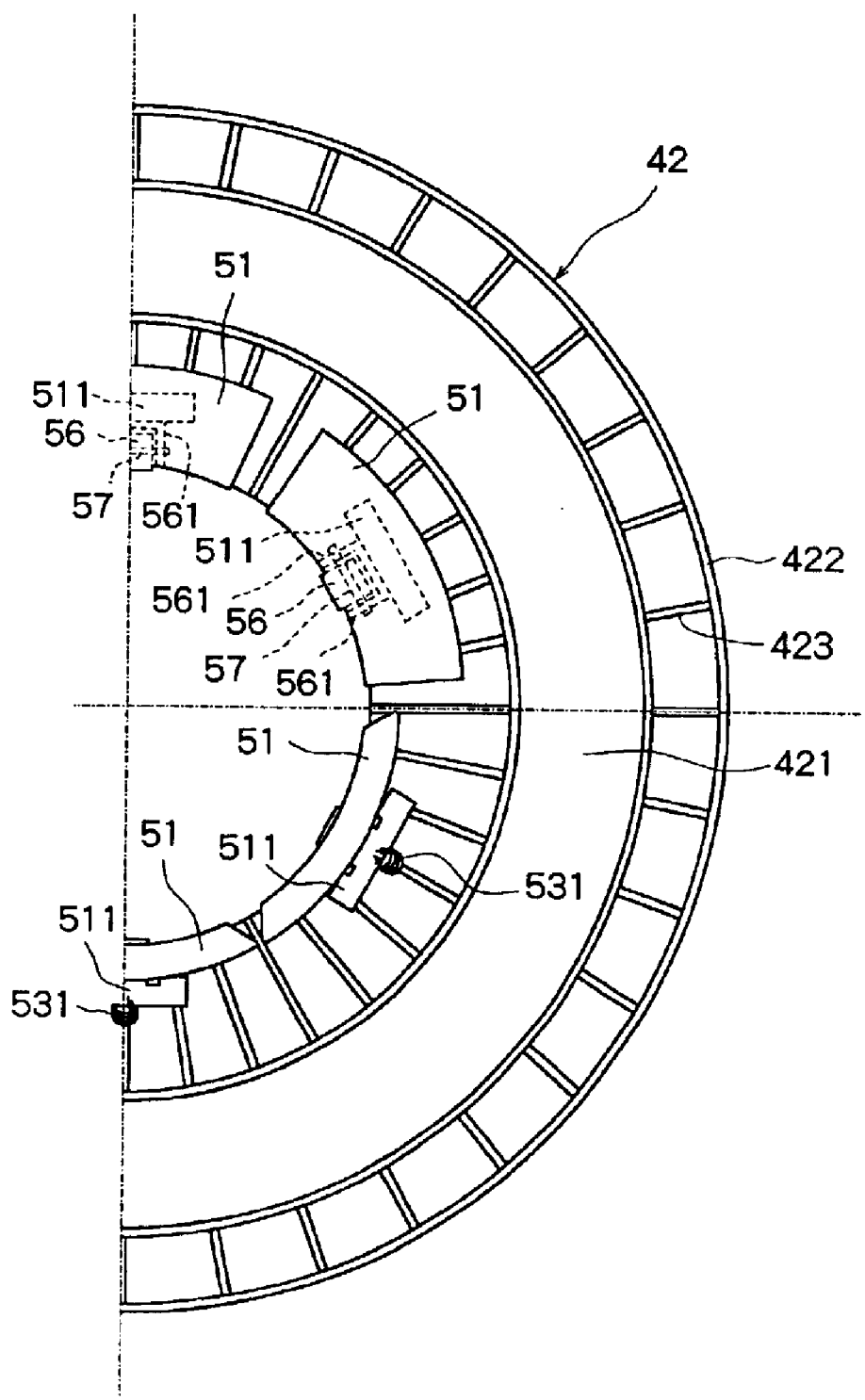
FIG. 38 is a sectional view along the line R—R in FIG. 37.

Next, the baffle mechanism 5r according to the eighteenth embodiment will be described with reference to FIGS. 37 and 38. The baffle mechanism 5r according to the eighteenth embodiment is the one in which the members constituting the baffle mechanism 5q of the above seventeenth embodiment are arranged in the turbine shell 422. In the baffle mechanism 5r according to the eighteenth embodiment, therefore, the same members as those members constituting the baffle mechanism 5q of the seventeenth embodiment are denoted by the same reference numerals but their description is not repeated.

The baffle mechanism 5r according to the eighteenth embodiment comprises a plurality of (six in the illustrated embodiment) flap-like baffle plates 51 which are arranged in the fluid circulatory passage 400 formed by the pump shell 412 and the turbine shell 422 and are turnably supported at the edges on one side thereof by the inner periphery of the turbine shell 422, weight members 511 joined to the coupling portions 514 provided for the baffle plates 51, and a limiting means 53 which comprises spring members such as tension coiled springs 531 or the like and works, in response to the centrifugal force acting on the weight members 511 and on the plurality of baffle plates 51, to bring the edges on the other side of the plurality of baffle plates 51 to the central portion of the fluid circulatory passage 400 in a state where the rotational speed of the turbine 42 is low and to bring the edges on the other side of the plurality of baffle plates 51 to the inner peripheral side of the pump shell 412 in a state where the rotational speed of the turbine 42 is high. In the baffle mechanism 5r of the eighteenth embodiment, a baffle plate support member 56 having baffle plate support portions 561, 561 at a predetermined distance is mounted by welding on the inner periphery of the turbine shell 422, and a coupling portion 514 is provided on the edge on one side of the baffle plate 51. The coupling portion 514 is fitted into between the baffle plate support portions 561, 561 of the baffle plate support member 56, and a support pin 57 is inserted through the buffer plate support portions 561, 561 and the coupling portion 514, so that the baffle plate 51 is turnably supported on the inner periphery of the turbine shell 422. In the baffle mechanism 5r according to the eighteenth embodiment, further, the tension coiled springs 531 constituting the limiting means 53 are arranged between the weight members 54 fitted onto the baffle plates 51 and the inner peripheral portion of the turbine shell 422.

Figure 8:
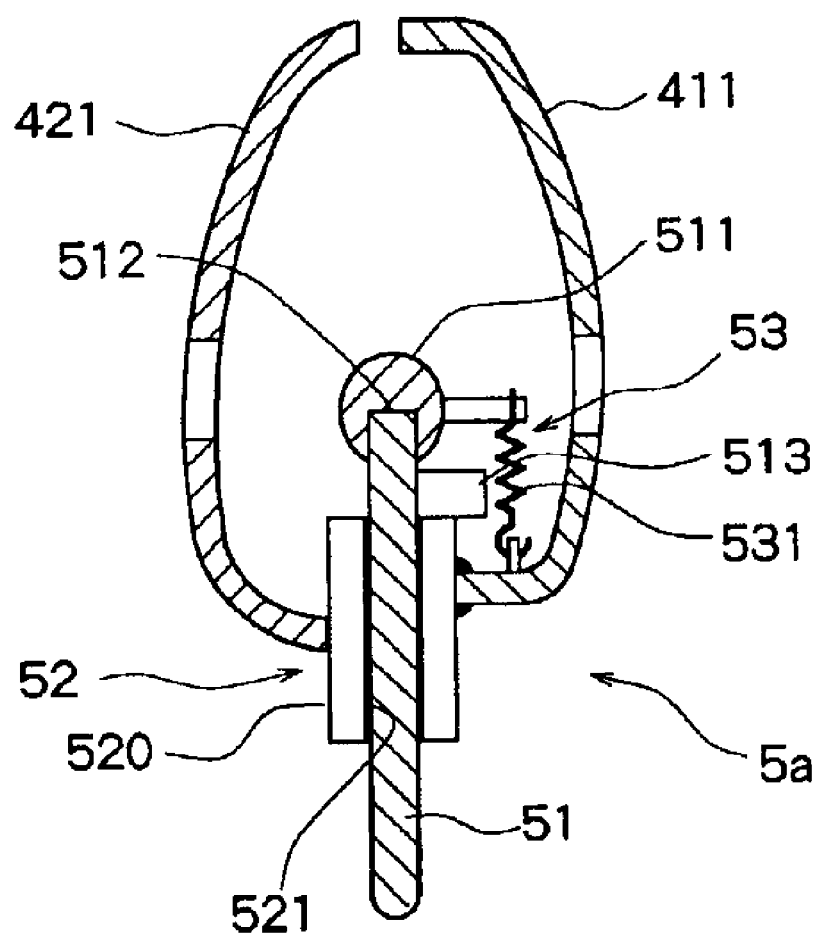
FIG. 8 is a sectional view illustrating, on an enlarged scale, a major portion of the fluid coupling shown in FIG. 6.
Figure 9:
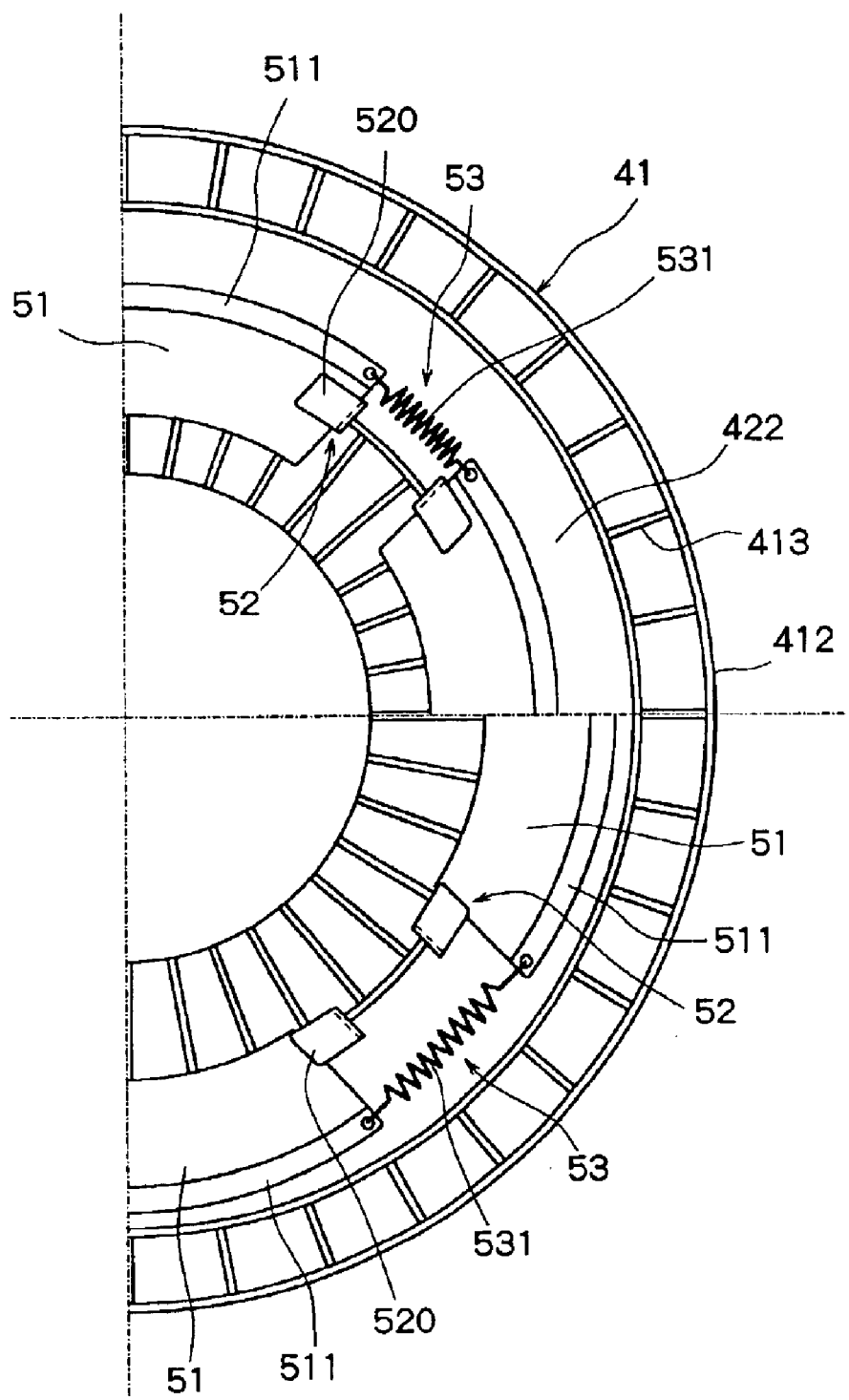
FIG. 9 is a sectional view illustrating the fourth embodiment of the fluid coupling constituted according to the present invention, which corresponds to FIG. 6.

The baffle mechanism 5r according to the eighteenth embodiment is constituted as described above, and the edges on the other side of the baffle plates 51 are brought to the central portion of the fluid circulatory passage 400 due to the spring forces of the tension coiled springs 531 as shown in the upper half portions of FIGS. 8 and 9 until the rotational speed of the turbine 42 reaches the predetermined value (e.g., 500 rpm which is an idling speed of a diesel engine). As the rotational speed of the turbine 42 becomes greater than the predetermined value, an increased centrifugal force acts on the weight members 511. As shown in the lower half portions of FIGS. 37 and 38, therefore, the baffle plates 51 turn toward inner peripheral side of the pump shell 412 on the support pins 57 as centers against the centrifugal force acting upon themselves and spring forces of the tension coiled springs 531 to thereby obtain the same action and effect as those of the baffle mechanism 5q of the above seventeenth embodiment. The baffle mechanism 5r according to the eighteenth embodiment 17 can be applied to the fluid coupling constituted by the pump and the turbine without having core rings.

The fluid coupling according to the present invention is constituted as described above, and exhibits action and effect as described below.

Namely, the fluid coupling according to the present invention is provided with a baffle mechanism which is so constituted as to retractably protrude into the fluid circulatory passage formed by the pump shell and the turbine shell, the baffle mechanism greatly protruding into the fluid circulatory passage in a state where the rotational speed is low and protruding little into the fluid circulatory passage in a state where the rotational speed is high. It is therefore made possible to effectively decrease the drag torque but without lowering the transmission of torque during the high-speed operation.

The fluid coupling according to the present invention is provided with a baffle mechanism which is so arranged as to move in the radial direction between the inner peripheral portion and the central portion in the radial direction of the fluid circulatory passage formed by the pump shell and the turbine shell, the baffle mechanism being positioned on the inner peripheral side of the fluid circulatory passage in a state where the rotational speed is low and moving toward the central portion of the fluid circulatory passage in a state where the rotational speed is high. It is therefore made possible to effectively decrease the drag torque but without lowering the transmission of torque during the high-speed operation.

The fluid coupling according to the present invention is provided with a baffle mechanism which is so constituted as to retractably protrude toward the outer peripheral portion in the radial direction of the fluid circulatory passage formed by the pump shell and the turbine shell, the baffle mechanism being positioned on the outer peripheral portion of the fluid circulatory passage in a state where the rotational speed is low and retracting from the outer peripheral portion of the fluid circulatory passage in a state where the rotational speed is high. It is therefore made possible to effectively decrease the drag torque but without lowering the transmission of torque during the high-speed operation.

The fluid coupling according to the present invention is provided with a baffle mechanism which comprises:

flap-like baffle plates which are arranged in a fluid circulatory passage formed by the pump shell and the turbine shell and turnably supported, at the edges on one side thereof, by the inner peripheral portion of the core ring of the pump shell or of the core ring of the turbine shell; and a limiting means which works, in response to the centrifugal force acting on the baffle plates, to bring the edges on the other side of the baffle plates to the central portion of the fluid circulatory passage in a state where the rotational speed of the pump or the turbine is low and to bring the edges on the other side of the baffle plates to the inner peripheral side of the core ring of the turbine shell or of the core ring of the pump shell in a state where the rotational speed of the pump or the turbine is high. It is therefore made possible to effectively decrease the drag torque but without lowering the transmission of torque during the high-speed operation.

The fluid coupling according to the present invention is provided with the baffle mechanism which comprises:

flap-like baffle plates which are arranged in a fluid circulatory passage formed by the pump shell and the turbine shell and turnably supported, at the edges on one side thereof, by the inner peripheral portion of the pump shell or the turbine shell;

weight members which are mounted on the baffle plates and bring the edges on the other side of the plurality of baffle plates to the inner peripheral side of the turbine shell or the pump shell by the action of the centrifugal force; and a limiting means which works, in response to the centrifugal force acting on the weight members, to bring the edges on the other side of the baffle plates to the central portion of the fluid circulatory passage in a state where the rotational speed of the pump or the turbine is low and to bring the edges on the other side of the baffle plates to the inner peripheral portion of said turbine shell or the pump shell in a state where the rotational speed of the pump or the turbine is high. It is therefore made possible to effectively decrease the drag torque but without lowering the transmission of torque during the high-speed operation.

What we claim is:

1. A fluid coupling, comprising:
  a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount, less than the first amount, when the rotational speed is high.

wherein said baffle mechanism comprises a plurality of baffle plates arranged between the core ring of said pump shell and the core ring of said turbine shell so as to move in the radial direction, a guide device mounted on the core ring of said turbine shell so as to guide the movement of said plurality of baffle plates, and a limiting device for limiting the movement of said plurality of baffle plates until the rotational speed of said turbine reaches a predetermined value.

2. A fluid coupling according to claim 1, wherein said baffle plates are arranged along said core ring of said turbine shell.

3. A fluid coupling according to claim 2, wherein said limiting device comprises spring members arranged among said baffle plates.

4. A fluid coupling according to claim 1, wherein said baffle plates are fitted with weight members.

5. A fluid coupling according to claim 1, wherein said limiting device comprises spring members arranged between said baffle plates and the core ring of said turbine shell.

6. A fluid coupling, comprising:

a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into said fluid circulatory passage by a first amount when the rotational speed is low, and protruding into the fluid circulatory passage by a second amount, less than the first amount, when the rotational speed is high, wherein:

said baffle mechanism comprises a plurality of baffle plates arranged between the core ring of said pump shell and the core ring of said turbine shell so as to move in a radial direction, a guide device mounted on the core ring of said pump shell so as to guide the movement of said baffle plates, and a limiting device for limiting the movement of said baffle plates until the rotational speed of said pump reaches a predetermined value, and said plurality of baffle plates are fitted with weight members.

7. A fluid coupling according to claim 6, wherein said baffle plates are arranged along the core ring of said pump shell.

8. A fluid coupling, comprising:

a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount less than the first amount, when the rotational speed is high, wherein:

said baffle mechanism comprises baffle plates arranged between the core ring of said pump shell and the core ring of said turbine shell so as to move in the radial direction, a guide device mounted on the core ring of said pump shell so as to guide the movement of said baffle plates, and a limiting device for limiting the movement of said baffle plates until the rotational speed of said pump reaches a predetermined value, and said limiting device comprises spring members arranged among said baffle plates.

9. A fluid coupling, comprising:

a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount, less than the first amount, when the rotational speed is high, wherein said baffle mechanism comprises a plurality of baffle plates arranged between the core ring of said pump shell and the core ring of said turbine shell, a support shaft mounted on the core ring of said turbine shell to rotatably support said baffle plates at the ends on one side thereof, and a limiting device for limiting the movement of said baffle plates until the rotational speed of said turbine reaches a predetermined value.

10. A fluid coupling according to claim 9, wherein said baffle plates are arranged along the core ring of said turbine shell.

11. A fluid coupling according to claim 10, wherein said limiting device comprises spring members arranged among said baffle plates.

12. A fluid coupling according to claim 9, wherein said baffle plates are fitted with weight members.

13. A fluid coupling, comprising:

a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount, less than the first amount, when the rotational speed is high, wherein:

said baffle mechanism comprises a plurality of baffle plates arranged between the core ring of said pump shell and the core ring of said turbine shell, a support shaft mounted on the core ring of said pump shell to rotatably support said baffle plates at the ends on one side thereof, and a limiting device for limiting the movement of said baffle plates until the rotational speed of said pump reaches a predetermined value, each of said baffle plates comprises a baffle portion, a support portion, and a coupling portion coupling said baffle portion and said support portion together, said support portion being rotatably supported by said support shaft, and said baffle portions of said baffle plates are fitted with weight members.

14. A fluid coupling according to claim 13, wherein said baffle plates are arranged along the core ring of said pump shell.

15. A fluid coupling, comprising:

a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount, less than the first amount, when the rotational speed is high, wherein:

said baffle mechanism comprises a plurality of baffle plates arranged between the core ring of said pump shell and the core ring of said turbine shell, a support shaft mounted on the core ring of said pump shell to rotatably support said baffle plates at the ends on one side thereof, and a limiting device for limiting the movement of said baffle plates until the rotational speed of said pump reaches a predetermined value, and said limiting device comprises spring members arranged among said baffle plates.

16. A fluid coupling, comprising a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount, less than the first amount, when the rotational speed is high, wherein said baffle mechanism comprises a plurality of baffle plates which are arranged between the core ring of said pump shell and the core ring of said turbine shell, and a support shaft mounted on the inner periphery of the turbine shell to rotatably support said baffle plates at the ends on one side thereof, and a limiting device for limiting the movement of said baffle plates until the rotational speed of said turbine reaches a predetermined value.

17. A fluid coupling according to claim 16, wherein said baffle plates are arranged along the core ring of said turbine shell.

18. A fluid coupling according to claim 17, wherein said limiting device comprises spring members arranged between said baffle plates and said core ring of said turbine shell.

19. A fluid coupling according to claim 16, wherein said baffle plates are fitted with weight members.

20. A fluid coupling, comprising:

a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount, less than the first amount, when the rotational speed is high, wherein:

said baffle mechanism comprises a plurality of baffle plates arranged between the core ring of said pump shell and the core ring of said turbine shell, and a support shaft mounted on the inner periphery of said pump shell to rotatably support said baffle plates at the ends on one side thereof, and a limiting device for limiting the movement of said baffle plates until the rotational speed of said pump reaches a predetermined value, and said baffle plates are fitted with weight members.

21. A fluid coupling according to claim 20, wherein said baffle plates are arranged along the core ring of said pump shell.

22. A fluid coupling, comprising:

a pump, comprising a pump shell, an annular core ring, and a plurality of impellers, said pump core ring and said impellers being arranged in said pump shell;

a turbine disposed opposite said pump and comprising a turbine shell, an annular core ring, and a plurality of runners, said turbine core ring and said runners being arranged in said turbine shell, said pump shell and said turbine shell forming a fluid circulatory passage; and a baffle mechanism retractably protruding into the fluid circulatory passage, said baffle mechanism protruding into the fluid circulatory passage by a first amount when the rotational speed is low, and protruding into the fluid circulatory passage by a second amount, less than the first amount, when the rotational speed is high, wherein:

said baffle mechanism comprises a plurality of baffle plates arranged between the core ring of said pump shell and the core ring of said turbine shell, and a support shaft mounted on the inner periphery of said pump shell to rotatably support said baffle plates at the ends on one side thereof, and a limiting device for limiting the movement of said baffle plates until the rotational speed of said pump reaches a predetermined value, and said limiting device comprises spring members arranged among said baffle plates.

23. A fluid coupling, comprising:

a pump comprising an annular pump shell, and a plurality of impellers arranged in said pump shell;

a turbine disposed opposite said pump and comprising an annular turbine shell, and a plurality of runners arranged in said turbine shell, said pump shell and said turbine shell forming a fluid circulatory passage; and a baffle mechanism movable in the radial direction between the inner peripheral side and the central portion of the fluid circulatory passage, said baffle mechanism being positioned on the inner peripheral side of the fluid circulatory passage when the rotational speed is low and moving toward the central portion of the fluid circulatory passage when the rotational speed is high, wherein said baffle mechanism comprises a plurality of baffle plates arranged between said pump and said turbine, a guide device mounted on said turbine so as to guide the movement of said baffle plates, and a limiting device for limiting the movement of said baffle plates until the rotational speed of said turbine reaches a predetermined value.

24. A fluid coupling according to claim 23, wherein said baffle plates are arranged along said turbine shell.

25. A fluid coupling according to claim 24, wherein said limiting device comprises spring members arranged among said baffle plates.

26. A fluid coupling according to claim 23, wherein said baffle plates are fitted with weight members.

27. A fluid coupling, comprising:

a pump comprising an annular pump shell, and a plurality of impellers arranged in said pump shell;

a turbine disposed opposite said pump and comprising an annular turbine shell, and a plurality of runners arranged in said turbine shell, said pump shell and said turbine shell forming a fluid circulatory passage; and a baffle mechanism movable in the radial direction between the inner peripheral side and the central portion of the fluid circulatory passage, said baffle mechanism being positioned on the inner peripheral side of the fluid circulatory passage when the rotational speed is low and moving toward the central portion of the fluid circulatory passage when the rotational speed is high, wherein:

said baffle mechanism comprises a plurality of baffle plates arranged between said pump and said turbine, a guide device mounted on said pump so as to guide the movement of said baffle plates, and a limiting device for limiting the movement of said baffle plates until the rotational speed of said pump reaches a predetermined value, and said baffle plates are fitted with weight members.

28. A fluid coupling according to claim 27, wherein said baffle plates are arranged along said pump shell.

29. A fluid coupling, comprising:

a pump comprising an annular pump shell, and a plurality of impellers arranged in said pump shell;

a turbine disposed opposite said pump and comprising an annular turbine shell, and a plurality of runners arranged in said turbine shell, said pump shell and said turbine shell forming a fluid circulatory passage; and a baffle mechanism movable in the radial direction between the inner peripheral side and the central portion of the fluid circulatory passage, said baffle mechanism being positioned on the inner peripheral side of the fluid circulatory passage when the rotational speed is low and moving toward the central portion of the fluid circulatory passage when the rotational speed is high, wherein:

said baffle mechanism comprises a plurality of baffle plates arranged between said pump and said turbine, a guide device mounted on said pump so as to guide the movement of said baffle plates, and a limiting device for limiting the movement of said baffle plates until the rotational speed of said pump reaches a predetermined value, and said limiting device comprises spring members arranged among said baffle plates.

30. A fluid coupling, comprising:

a pump comprising an annular pump shell, and a plurality of impellers arranged in said pump shell;

a turbine disposed opposite said pump and comprising an annular turbine shell, and a plurality of runners arranged in said turbine shell, said pump shell and said turbine shell forming a fluid circulatory passage; and a baffle mechanism movable in the radial direction between the inner peripheral side and the central portion of the fluid circulatory passage, said baffle mechanism being positioned on the inner peripheral side of the fluid circulatory passage when the rotational speed is low and moving toward the central portion of the fluid circulatory passage when the rotational speed is high, wherein said baffle mechanism comprises a plurality of baffle plates arranged between the core ring of said pump shell and the core ring of said turbine shell and a support shaft mounted on said turbine shell to rotatably support said baffle plates at the ends on one side thereof, and a limiting device for limiting the movement of said baffle plates until the rotational speed of said turbine reaches a predetermined value.

31. A fluid coupling according to claim 30, wherein said baffle plates are arranged along said turbine shell.

32. A fluid coupling according to claim 31, wherein said limiting device comprises spring members arranged among the said baffle plates.

33. A fluid coupling according to claim 30, wherein said baffle plates are fitted with weight members.

34. A fluid coupling, comprising:

a pump comprising an annular pump shell, and a plurality of impellers arranged in said pump shell;

a turbine disposed opposite said pump and comprising an annular turbine shell, and a plurality of runners arranged in said turbine shell, said pump shell and said turbine shell forming a fluid circulatory passage; and a baffle mechanism movable in the radial direction between the inner peripheral side and the central portion of the fluid circulatory passage, said baffle mechanism being positioned on the inner peripheral side of the fluid circulatory passage when the rotational speed is low and moving toward the central portion of the fluid circulatory passage when the rotational speed is high, wherein:

said baffle mechanism comprises a plurality of baffle plates arranged between the core ring of said pump shell and the core ring of said turbine shell, a support shaft mounted on the pump shell to rotatably support said baffle plates at the ends on one side thereof, and a limiting device for limiting the movement of said baffle plates until the rotational speed of said pump reaches a predetermined value, and said baffle plates are fitted with weight members.

35. A fluid coupling according to claim 34, wherein said baffle plates are arranged along said pump shell.

36. A fluid coupling, comprising:

a pump comprising an annular pump shell, and a plurality of impellers arranged in said pump shell;

a turbine disposed opposite said pump and comprising an annular turbine shell, and a plurality of runners arranged in said turbine shell, said pump shell and said turbine shell forming a fluid circulatory passage; and a baffle mechanism movable in the radial direction between the inner peripheral side and the central portion of the fluid circulatory passage, said baffle mechanism being positioned on the inner peripheral side of the fluid circulatory passage when the rotational speed is low and moving toward the central portion of the fluid circulatory passage when the rotational speed is high, wherein:

said baffle mechanism comprises a plurality of baffle plates which are arranged between the core ring of said pump shell and the core ring of said turbine shell and are rotatably supported, at the ends on one side thereof, by a support shaft mounted on the pump shell, and a limiting means for limiting the movement of the baffle plates until the rotational speed of said pump reaches a predetermined value, said baffle plates are arranged along said pump shell, and said limiting device comprises spring members arranged among said baffle plates.

37. A fluid coupling, comprising:

a pump comprising an annular pump shell, and a plurality of impellers arranged in said pump shell;

a turbine disposed opposite said pump and comprising an annular turbine shell and a plurality of runners arranged in said turbine shell, said pump shell and said turbine shell forming a fluid circulatory passage; and a baffle mechanism retractably protruding toward the outer peripheral portion in the radial direction of the fluid circulatory passage, said baffle mechanism being positioned on the outer peripheral portion of the fluid circulatory passage when the rotational speed is low and retracting from the outer peripheral portion of the fluid circulatory passage when the rotational speed is high, wherein said baffle mechanism comprises a plurality of baffle plates arranged between said pump and said turbine, a guide device mounted on said turbine so as to guide the movement of said baffle plates, and a limiting device for limiting the movement of said plurality of baffle plates until the rotational speed of said turbine reaches a predetermined value.

38. A fluid coupling according to claim 37, wherein said baffle plates are arranged along said turbine shell.

39. A fluid coupling according to claim 38, wherein said limiting device comprises spring members arranged among the said baffle plates.

40. A fluid coupling according to claim 37, wherein said baffle plates are fitted with weight members.

41. A fluid coupling, comprising:

a pump comprising an annular pump shell, and a plurality of impellers arranged in said pump shell;

a turbine disposed opposite said pump and comprising an annular turbine shell and a plurality of runners arranged in said turbine shell, said pump shell and said turbine shell forming a fluid circulatory passage; and a baffle mechanism retractably protruding toward the outer peripheral portion in the radial direction of the fluid circulatory passage, said baffle mechanism being positioned on the outer peripheral portion of the fluid circulatory passage when the rotational speed is low and retracting from the outer peripheral portion of the fluid circulatory passage when the rotational speed is high, wherein said baffle mechanism comprises a plurality of baffle plates between said pump and said turbine, a guide device mounted on said pump so as to guide the movement of said baffle plates, and a limiting device for limiting the movement of said baffle plates until the rotational speed of said pump reaches a predetermined value, and said baffle plates are fitted with weight members.

42. A fluid coupling according to claim 41, wherein said baffle plates are arranged along said pump shell.

43. A fluid coupling, comprising:

a pump comprising an annular pump shell, and a plurality of impellers arranged in said pump shell;

a turbine disposed opposite said pump and comprising an annular turbine shell and a plurality of runners arranged in said turbine shell, said pump shell and said turbine shell forming a fluid circulatory passage; and a baffle mechanism retractably protruding toward the outer peripheral portion in the radial direction of the fluid circulatory passage, said baffle mechanism being positioned on the outer peripheral portion of the fluid circulatory passage when the rotational speed is low and retracting from the outer peripheral portion of the fluid circulatory passage when the rotational speed is high, wherein said baffle mechanism comprises a plurality of baffle plates between said pump and said turbine, a guide device mounted on said pump so as to guide the movement of said baffle plates, and a limiting device for limiting the movement of said baffle plates until the rotational speed of said pump reaches a predetermined value, and said limiting device comprises spring members arranged among said baffle plates.

44. A fluid coupling, comprising:

a pump comprising an annular pump shell, and a plurality of impellers arranged in said pump shell;

a turbine disposed opposite said pump and comprising an annular turbine shell and a plurality of runners arranged in said turbine shell, said pump shell and said turbine shell forming a fluid circulatory passage; and a baffle mechanism retractably protruding toward the outer peripheral portion in the radial direction of the fluid circulatory passage, said baffle mechanism being positioned on the outer peripheral portion of the fluid circulatory passage when the rotational speed is low and retracting from the outer peripheral portion of the fluid circulatory passage when the rotational speed is high, wherein:

said baffle mechanism comprises a plurality of baffle plates arranged between the core ring of said pump shell and the core ring of said turbine shell, a support shaft mounted on the outer periphery of the pump shell to rotatably support said baffle plates at the ends on one side thereof, and a limiting device for limiting the movement of said baffle plates until the rotational speed of said pump reaches a predetermined value, and said baffle plates are fitted with weight members.

45. A fluid coupling according to claim 44, wherein said baffle plates are arranged along said pump shell.

46. A fluid coupling, comprising:

a pump comprising an annular pump shell, and a plurality of impellers arranged in said pump shell;

a turbine disposed opposite said pump and comprising an annular turbine shell and a plurality of runners arranged in said turbine shell, said pump shell and said turbine shell forming a fluid circulatory passage; and a baffle mechanism retractably protruding toward the outer peripheral portion in the radial direction of the fluid circulatory passage, said baffle mechanism being positioned on the outer peripheral portion of the fluid circulatory passage when the rotational speed is low and retracting from the outer peripheral portion of the fluid circulatory passage when the rotational speed is high, wherein:

said baffle mechanism comprises a plurality of baffle plates which are arranged between the core ring of said pump shell and the core ring of said turbine shell, and a support shaft mounted on the outer periphery of the pump shell to rotatably support said baffle plates at the ends on one side thereof, and a limiting device for limiting the movement of said baffle plates until the rotational speed of said pump reaches a predetermined value, said baffle plates are arranged in a plural number alone said pump shell, and said limiting device comprises spring members arranged among said baffle plates.

47. A fluid coupling comprising:

a pump comprising an annular pump shell, an annular core ring, and a plurality of impellers, said pump core ring and said impellers being within said pump shell; and a turbine disposed opposite said pump and comprising an annular turbine shell, an annular core ring, and a plurality of runners, said turbine core ring and said runners being within said turbine shell, said pump shell and said turbine shell forming a fluid circulatory passage; and a baffle mechanism, comprising:

a plurality of flap-like baffle plates arranged in the fluid circulatory passage and rotatably supported, at the edges on one side thereof, by an inner peripheral side of the core ring of said pump shell; and a limiting device, responsive to centrifugal force acting on said baffle plates, to bring the edges on the other side of said baffle plates to the central portion of the fluid circulatory passage when the rotational speed of said pump is low, and to bring the edges on said other side of said baffle plates to the inner peripheral side of said core ring of said turbine shell when the rotational speed of said pump is high, wherein said baffle plates are fitted at the other edge portions thereof with weight members.

48. A fluid coupling according to claim 47, wherein said baffle plates are arranged along the core ring of said pump shell.

49. A fluid coupling according to claim 47, wherein said limiting device comprises spring members arranged between said plurality of baffle plates and said pump shell.

50. A fluid coupling comprising: a pump comprising an annular pump shell, an annular core ring, and a plurality of impellers, said pump core ring and said impellers being arranged in said pump shell;

a turbine disposed facing said pump and comprising an annular turbine shell, an annular core ring, and a plurality of runners, said turbine core ring and said runners being arranged in said turbine shell, said pump shell and said turbine shell forming a fluid circulatory passage;

a baffle mechanism comprising:

a plurality of flap-like baffle plates arranged in the fluid circulatory passage rotatably supported, at the edges on one side thereof, by the inner peripheral portion of the core ring of said turbine shell; and a limiting device responsive to centrifugal force acting on said baffle plates, to bring the edges on the other side of said baffle plates to the central portion of the fluid circulatory passage when the rotational speed of said turbine is low, and to bring the edges on said other side of said baffle plates to the inner peripheral side of the core ring of said pump shell when the rotational speed of said turbine is high.

51. A fluid coupling according to claim 50, wherein said baffle plates are arranged along the core ring of said turbine shell.

52. A fluid coupling according to claim 51, wherein said limiting device comprises spring members arranged between the plurality of baffle plates and the turbine shell.

53. A fluid coupling according to claim 50, wherein said plurality of baffle plates are fitted at the other edge portions thereof with weight members.

54. A fluid coupling comprising:

a pump comprising an annular pump shell, and a plurality of impellers arranged in said pump shell;

a turbine disposed facing said pump and comprising an annular turbine shell, and a plurality of runners arranged in said turbine shell, said pump shell and said turbine shell forming a fluid circulatory passage; and a baffle mechanism, comprising:

a plurality of flap-like baffle plates in the fluid circulatory passage rotatably supported, at the edges on one side thereof, by the inner peripheral portion of said pump shell;

weight members mounted on said baffle plates to bring the edges on the other side of said plurality of baffle plates to the inner peripheral side of said turbine shell by centrifugal force; and a limiting device, responsive to the centrifugal force acting on said weight members, to bring the edges on the other side of said baffle plates to the central portion of the fluid circulatory passage when the rotational speed of said pump is low, and to bring the edges on said other side of said baffle plates to the inner peripheral portion of said turbine shell when the rotational speed of said pump is high.

55. A fluid coupling according to claim 54, wherein said baffle plates are arranged along said pump shell.

56. A fluid coupling according to claim 54, wherein said limiting device comprises spring members arranged between said baffle plates and said pump shell.

57. A fluid coupling comprising:

a pump comprising an annular pump shell, and a plurality of impellers arranged in said pump shell;

a turbine disposed facing said pump and comprising an annular turbine shell, and a plurality of runners within said turbine shell, said pump shell and said turbine shell forming a fluid circulatory passage; and baffle mechanism, comprising:

a plurality of flap-like baffle plates in the fluid circulatory passage and rotatably supported, at the edges on one side thereof, by the inner peripheral portion of said turbine shell;

weight members mounted on said baffle plates to bring the edges on the other side of said plurality of baffle plates to the inner peripheral side of said pump by centrifugal force; and a limiting device responsive to the centrifugal force acting on said weight members, to bring the edges on the other side of said baffle plates to the central portion of the fluid circulatory passage when the rotational speed of said turbine is low, and to bring the edges on said other side of said baffle plates to the inner peripheral portion of said pump shell when the rotational speed of said turbine is high.

58. A fluid coupling according to claim 57, wherein said baffle plates are arranged along said turbine shell.

59. A fluid coupling according to claim 57, wherein said limiting device comprises spring members arranged between said plurality of baffle plates and said turbine shell.

* * * * *